(12) United States Patent
Takahashi et al.

(10) Patent No.: US 8,649,434 B2
(45) Date of Patent: Feb. 11, 2014

(54) APPARATUS, METHOD AND PROGRAM ENABLING IMPROVEMENT OF ENCODING EFFICIENCY IN ENCODING IMAGES

(75) Inventors: Yoshitomo Takahashi, Kanagawa (JP); Junichi Tanaka, Kanagawa (JP); Teruhiko Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 12/890,757

(22) Filed: Sep. 27, 2010

(65) Prior Publication Data

US 2011/0080949 A1    Apr. 7, 2011

(30) Foreign Application Priority Data

Oct. 5, 2009   (JP) .................................. 2009-231752

(51) Int. Cl.
*H04N 7/50* (2006.01)
(52) U.S. Cl.
USPC ..... 375/240.12; 348/42; 348/43; 375/240.01; 375/E07.027; 375/E07.211; 382/236
(58) Field of Classification Search
None
See application file for complete search history.

(56) References Cited

U.S. PATENT DOCUMENTS

| | | | | |
|---|---|---|---|---|
| 8,089,507 B2* | 1/2012 | Ikeda et al. | | 348/43 |
| 2005/0031030 A1* | 2/2005 | Kadono et al. | | 375/240.01 |
| 2006/0083298 A1* | 4/2006 | Wang et al. | | 375/240.01 |
| 2006/0133770 A1* | 6/2006 | Shibata et al. | | 386/68 |
| 2007/0041443 A1* | 2/2007 | Ha et al. | | 375/240.15 |
| 2007/0291841 A1* | 12/2007 | Muraki et al. | | 375/240.12 |
| 2009/0003445 A1* | 1/2009 | Ying et al. | | 375/240.15 |
| 2009/0262804 A1* | 10/2009 | Pandit et al. | | 375/240.12 |
| 2010/0002761 A1* | 1/2010 | Pandit et al. | | 375/240.01 |
| 2010/0118944 A1* | 5/2010 | Tanaka et al. | | 375/240.12 |
| 2010/0150248 A1* | 6/2010 | Pandit et al. | | 375/240.25 |
| 2010/0189182 A1* | 7/2010 | Hannuksela | | 375/240.25 |
| 2010/0322311 A1* | 12/2010 | Vetro et al. | | 375/240.12 |
| 2011/0109721 A1* | 5/2011 | Hong et al. | | 348/43 |

FOREIGN PATENT DOCUMENTS

JP    2008-034892 A    2/2008

* cited by examiner

*Primary Examiner* — Christopher S Kelley
*Assistant Examiner* — Kaitlin A Retallick
(74) *Attorney, Agent, or Firm* — Wolf, Greenfield & Sacks, P.C.

(57) ABSTRACT

An image processing apparatus includes: a storage means for storing a decoded image in which pictures of a first image and a second image each having a disparity are alternately arranged, and performing local decoding, and a storage control means for performing storage control to control the storage of a reference picture in the storage means such that, from among the pictures which are encoded temporally earlier than a current picture in encoding process which is a picture to be encoded, and are capable of becoming reference pictures, a picture which is a picture of an image at the same viewpoint as the current picture in encoding process from among the first image and the second image and is closest to the current picture in encoding process in a display order is stored in the storage means.

8 Claims, 20 Drawing Sheets

FIG.10

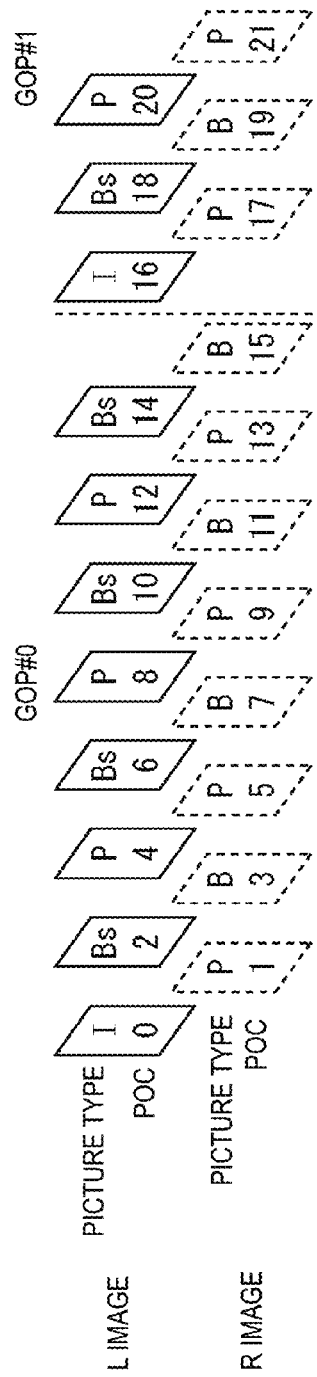

| POC%16 | MMCO COMMAND | DETAILS |
|---|---|---|
| 0 | 400 | SET max_long_term_frame_idx_plus1=0, AND DISCARD ALL LONG TERM PICTURES |
| 4 | 400 | SET max_long_term_frame_idx_plus1=0, AND DISCARD ALL LONG TERM PICTURES |
| 2 | 41600 | SET max_long_term_frame_idx_plus1=1, AND SET Bs2 AS long_term_frame_index=0 |
| 8 | 400 | SET max_long_term_frame_idx_plus1=0, AND DISCARD ALL LONG TERM PICTURES |
| 6 | 41600 | SET max_long_term_frame_idx_plus1=1, AND SET Bs6 AS long_term_frame_index=0 |
| 12 | 400 | SET max_long_term_frame_idx_plus1=0, AND DISCARD ALL LONG TERM PICTURES |
| 10 | 41600 | SET max_long_term_frame_idx_plus1=1, AND SET Bs10 AS long_term_frame_index=0 |
| 14 | 41600 | SET max_long_term_frame_idx_plus1=1, AND SET Bs14 AS long_term_frame_index=0 |

COMMAND==0 NAR_MMCO_END
COMMAND==1 NAR_MMCO_MARK_SHORT_TERM_PIC_UNUSED
COMMAND==2 NAR_MMCO_MARK_RONG_TERM_PIC_UNUSED
COMMAND==3 NAR_MMCO_ASSIGN_RONG_TERM_FRAME_INDEX
COMMAND==4 NAR_MMCO_SPECIFY_MAX_RONG_TERM_FRAME_INDEX
COMMAND==5 NAR_MMCO_RESET_ARR_REF_PIC
COMMAND==6 NAR_MMCO_ASSIGN_RONG_TERM_FRAME_INDEX_CURRENT

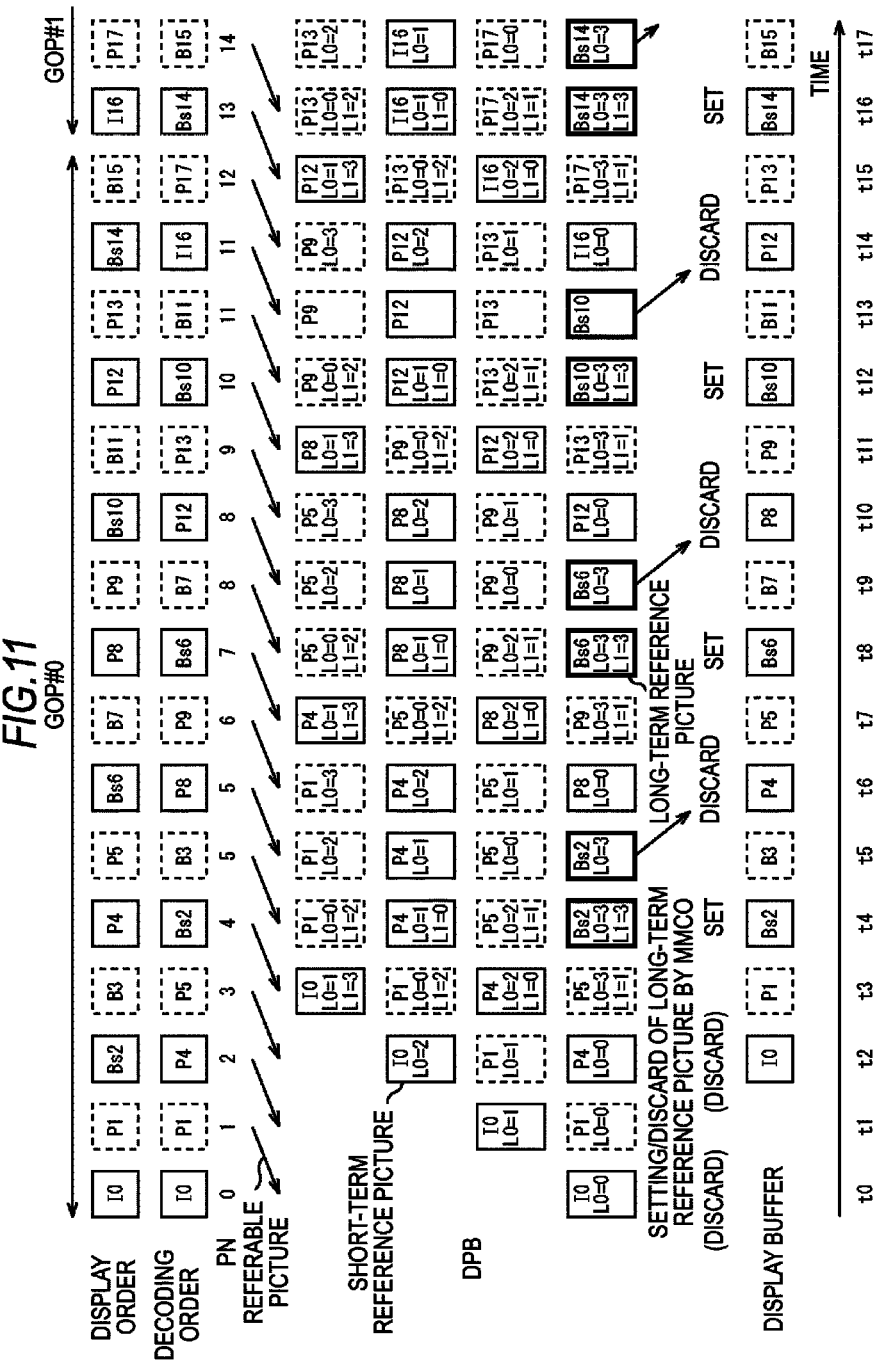

FIG.12

| POC%16 | LIST | ref_pic_list_reordering | DETAILS |
|---|---|---|---|
| 1 | 0 | 023 | SET L0[0]:P13 WITH abs_diff_pic_num_minus1=2 |
| 2 | 0 | 033 | SET L0[0]:I0 WITH abs_diff_pic_num_minus1=3 |
| 3 | 0 | 03 | SET L0[0]:P1 WITH abs_diff_pic_num_minus1=3 |
|   | 0 | 203 | SET L0[1]:Bs2 WITH long_term_pic_num=0 |
|   | 1 | 013 | SET L1[0]:I0 WITH abs_diff_pic_num_minus1=1 |
| 4 | 0 | 013 | SET L0[0]:P5 WITH abs_diff_pic_num_minus1=1 |
| 5 | 0 | 013 | SET L0[0]:I0 WITH abs_diff_pic_num_minus1=1 |
| 6 | 0 | 043 | SET L0[0]:P1 WITH abs_diff_pic_num_minus1=4 |
|   | 0 | 04 | SET L0[0]:P4 WITH abs_diff_pic_num_minus1=4 |
| 7 | 0 | 203 | SET L0[1]:P5 WITH long_term_pic_num=0 |
|   | 1 | 013 | SET L1[0]:Bs6 WITH abs_diff_pic_num_minus1=1 |
| 8 | 0 | 023 | SET L0[0]:P9 WITH abs_diff_pic_num_minus1=2 |
| 9 | 0 | 023 | SET L0[0]:P4 WITH abs_diff_pic_num_minus1=2 |
| 10 | 0 | 043 | SET L0[0]:P5 WITH abs_diff_pic_num_minus1=4 |
|   | 0 | 04 | SET L0[0]:P8 WITH abs_diff_pic_num_minus1=4 |
| 11 | 0 | 203 | SET L0[1]:P9 WITH abs_diff_pic_num_minus1=4 |
|   | 1 | 013 | SET L1[0]:Bs10 WITH long_term_pic_num=0 |
| 12 | 0 | 023 | SET L0[0]:P13 WITH abs_diff_pic_num_minus1=1 |
| 13 | 0 | 023 | SET L0[0]:P8 WITH abs_diff_pic_num_minus1=2 |
| 14 | 0 | 043 | SET L0[0]:P9 WITH abs_diff_pic_num_minus1=2 |
|   | 0 | 04 | SET L0[0]:P12 WITH abs_diff_pic_num_minus1=4 |
| 15 | 0 | 203 | SET L0[1]:Bs14 WITH long_term_pic_num=0 |
|   | 1 | 013 | SET L1[0]:P17 WITH abs_diff_pic_num_minus1=1 |

COMMAND==0 NAL_REORDERING_ABS_DIFF_PIC_NUM_NEGATIVE
COMMAND==1 NAL_REORDERING_ABS_DIFF_PIC_NUM_POSITIVE
COMMAND==2 NAL_REORDERING_LONG_TERM_PIC_NUM
COMMAND==3 NAL_REORDERING_END

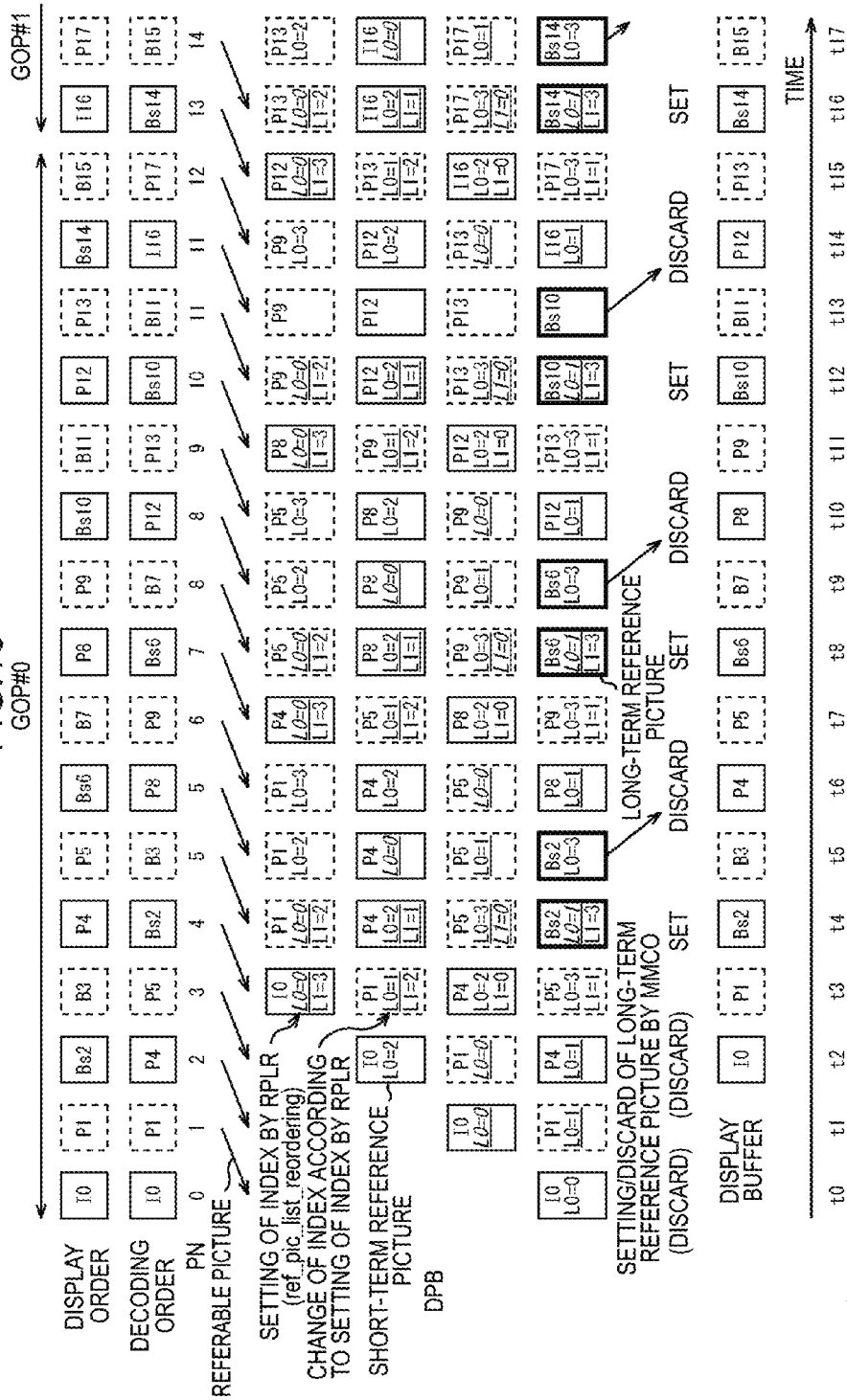

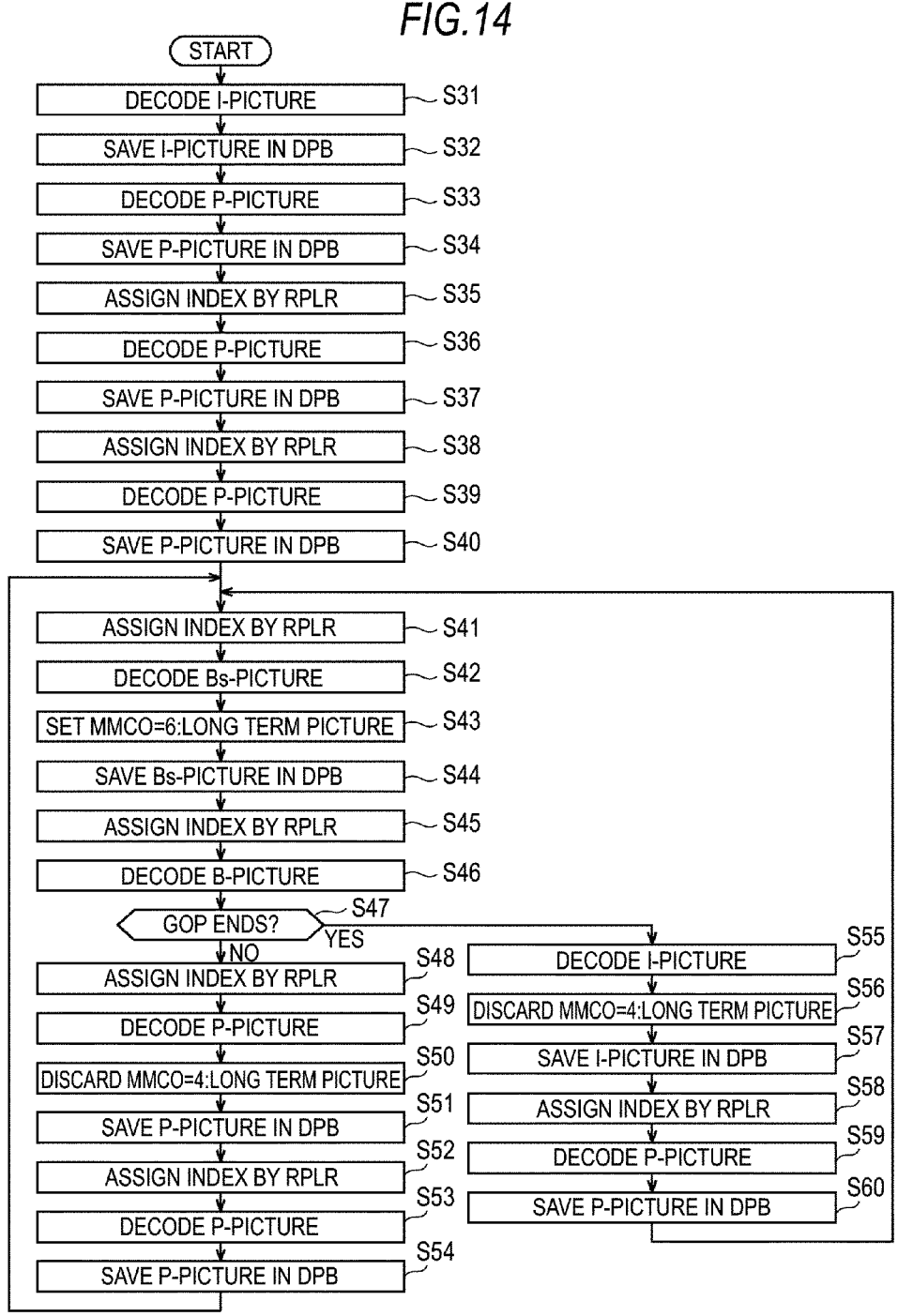

FIG.15
DPB STATE
| | | |
|---|---|---|
| S31. | | S48. P1 P4 P5 Bs2 |
| S32. I0 | | S49. P1 P4 P5 Bs2 |
| S33. I0 | | S50. P1 P4 P5 |
| S34. I0 P1 | | S51. P1 P4 P5 P8 |
| S35. I0 P1 | | S52. P1 P4 P5 P8 |
| S36. I0 P1 | | S53. P1 P4 P5 P8 |
| S37. I0 P1 P4 | | S54. P4 P5 P8 P9 |
| S38. I0 P1 P4 | | (S41) P4 P5 P8 P9 |
| S39. I0 P1 P4 | | (S42) P4 P5 P8 P9 |
| S40. I0 P1 P4 P5 | | (S43) P4 P5 P8 P9 |
| S41. I0 P1 P4 P5 | | (S44) P5 P8 P9 Bs6 |
| S42. I0 P1 P4 P5 | | (S45) P5 P8 P9 Bs6 |
| S43. I0 P1 P4 P5 | | (S46) P5 P8 P9 Bs6 |
| S44. P1 P4 P5 Bs2 | | (S47) P5 P8 P9 Bs6 |
| S45. P1 P4 P5 Bs2 | | (S48) P4 P5 P8 Bs6 |
| S46. P1 P4 P5 Bs2 | | (S49) P4 P5 P8 Bs6 |
| S47. P1 P4 P5 Bs2 | | |
 SHORT-TERM REFERENCE   LONG-TERM REFERENCE

FIG.16

| POC%16 | MMCO COMMAND | DETAILS |
|---|---|---|
| 0,4,8,12 | 100 | SET difference_of_pic_nums_minus1=0 AND RELEASE REFERENCE PICTURE WITH POC CORRESPONDING TO VALUE OBTAINED BY SUBTRACTING 6 FROM POC OF CURRENT PICTURE IN DECODING PROCESS |

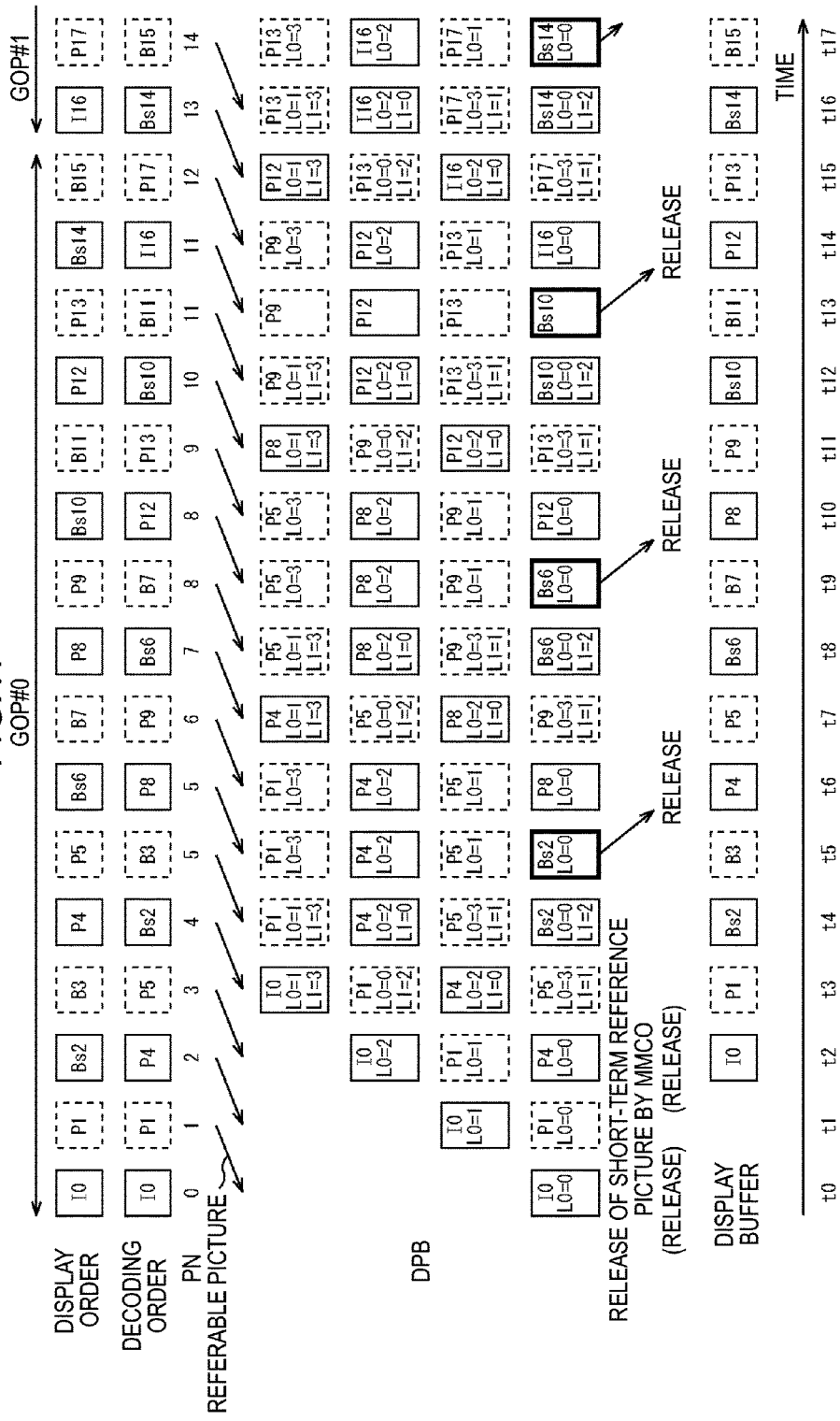

FIG. 18

| POC%16 | LIST | ref_pic_list_reordering | DETAILS |
|---|---|---|---|
| 1 | 0 | 023 | SET L0[0]:P13 WITH abs_diff_pic_num_minus1=2 |
| 2 | 0 | 033 | SET L0[0]:I0 WITH abs_diff_pic_num_minus1=3 |
| 3 | 0 | 033 | SET L0[0]:P1 WITH abs_diff_pic_num_minus1=3 |
| 4 | 1 | 013 | SET L1[0]:P5 WITH abs_diff_pic_num_minus1=1 |
| 4 | 0 | 013 | SET L0[0]:I0 WITH abs_diff_pic_num_minus1=1 |
| 5 | 0 | 013 | SET L0[0]:P1 WITH abs_diff_pic_num_minus1=1 |
| 6 | 0 | 043 | SET L0[0]:P4 WITH abs_diff_pic_num_minus1=4 |
| 7 | 0 | 043 | SET L0[0]:P5 WITH abs_diff_pic_num_minus1=4 |
| 7 | 1 | 013 | SET L1[0]:P9 WITH abs_diff_pic_num_minus1=1 |
| 8 | 0 | 023 | SET L0[0]:P4 WITH abs_diff_pic_num_minus1=2 |
| 9 | 0 | 023 | SET L0[0]:P5 WITH abs_diff_pic_num_minus1=2 |
| 10 | 0 | 043 | SET L0[0]:P8 WITH abs_diff_pic_num_minus1=4 |
| 11 | 0 | 043 | SET L0[0]:P9 WITH abs_diff_pic_num_minus1=4 |
| 11 | 1 | 013 | SET L1[0]:P13 WITH abs_diff_pic_num_minus1=1 |
| 12 | 0 | 023 | SET L0[0]:P8 WITH abs_diff_pic_num_minus1=2 |
| 13 | 0 | 023 | SET L0[0]:P9 WITH abs_diff_pic_num_minus1=2 |
| 14 | 0 | 043 | SET L0[0]:P12 WITH abs_diff_pic_num_minus1=4 |
| 15 | 0 | 043 | SET L0[0]:P13 WITH abs_diff_pic_num_minus1=4 |
| 15 | 1 | 013 | SET L1[0]:P17 WITH abs_diff_pic_num_minus1=1 |

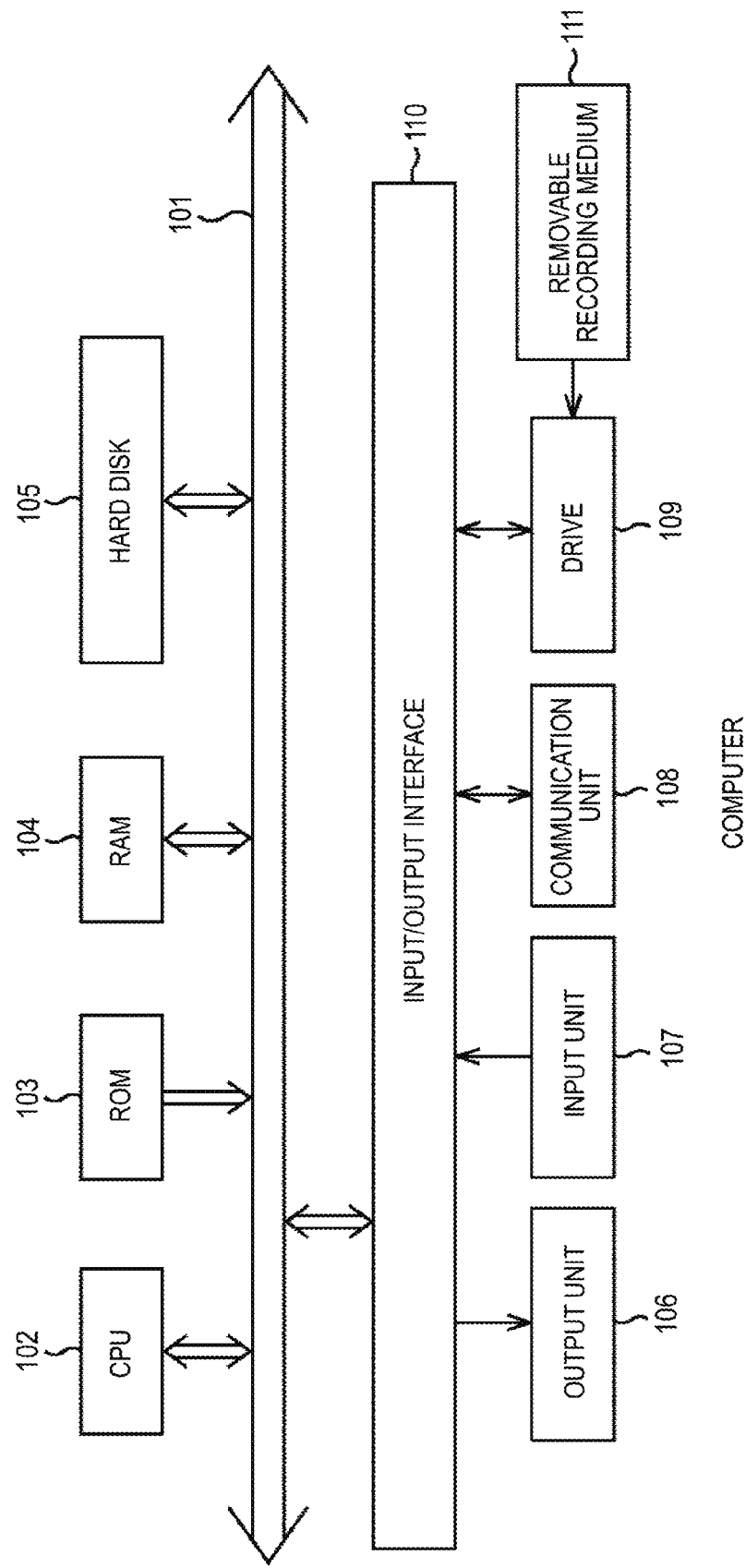

APPARATUS, METHOD AND PROGRAM ENABLING IMPROVEMENT OF ENCODING EFFICIENCY IN ENCODING IMAGES

CROSS REFERENCE TO RELATED APPLICATIONS

This application claims priority under 35 U.S.C. §119 to Japanese Priority Patent Application JP 2009-231752, filed in the Japan Patent Office on Oct. 5, 2009, the entire contents of which is hereby incorporated by reference.

BACKGROUND OF THE INVENTION

1. Field of the Invention

The present invention relates to an image processing apparatus, an image processing method, and a program, and in particular, to an image processing apparatus, an image processing method, and a program capable of enabling improvement of encoding efficiency in encoding images.

2. Description of the Related Art

In recent years, an encoding apparatus or a decoding apparatus which is based on MPEG (Moving Picture Expert Group) or the like, has come into widespread use for information distribution in a broadcasting station or the like and information reception in an average home. The encoding apparatus or the decoding apparatus treats image information as a digital signal, and, in the context of efficient transmission and accumulation of information at that time, compresses the image information through orthogonal transform, such as discrete cosine transform, and motion compensation by using redundancy peculiar to the image information.

That is, an encoding apparatus comes into widespread use which encodes image information through encoding, for example, MPEG, H.26x, or the like, using orthogonal transform, such as discrete cosine transform or Karhunen-Loeve transform, and motion compensation. Further, a decoding apparatus has come into widespread use which is used to receive encoded data (bit stream) obtained by an encoding apparatus through a network medium, such as satellite broadcasting, cable TV, or Internet, or is used to reproduce encoded data recorded on a recording medium, such as an optical disc, a magnetic disk, or a flash memory.

For example, MPEG2 (ISO/IEC 13818-2) is defined as general-use image encoding, and widely used at present in a wide range of professional and consumer applications as the standard of both interlaced scan images (interlaced images) and sequential scan images (progressive images), and standard-resolution images and high-definition images. With the use of MPEG2 compression, the code quantity (bit rate) of 4 to 8 Mbps is assigned to the standard-resolution interlaced images, for example, having horizontal 720×vertical 480 pixels, and the code quantity of 18 to 22 Mbps is assigned to the high-resolution interlaced scan images having 1920×1088 pixels, a high compression rate and satisfactory image quality may be realized.

MPEG2 is mainly used in high-quality encoding suitable for broadcasting, but is unable to cope with encoding with a code quantity (bit rate) lower than MPEG1, that is, with a compression rate higher than MPEG1. With the spread of mobile phones, in future, there will be a strong demand for such encoding, and accordingly the standardization of MPEG4 encoding has been made. With regard to image encoding, the specification is adopted as the international standard ISO/IEC 14496-2 in December, 1998.

In recent years, in the context of image encoding for videoconferencing, the H.26L (ITU-T Q6/16 VCEG) is being standardized. It is known that, with the use of H.264, the amount of arithmetic operations for encoding and decoding increases compared to the known encoding, such as MPEG2 or MPEG4, but higher encoding efficiency is realized.

As part of the activities of MPEG4, the standardization, in which H.26L is used as a base and a function not being supported by H.26L was incorporated, realizing higher encoding efficiency, is made as a Joint Model of Enhanced-Compression Video Coding, and is adopted as the international standard H.264 and MPEG-4 Part 10 (Advanced Video Coding) (hereinafter, simply referred to as H.264/AVC or AVC) in March, 2003.

According to the AVC, during motion compensation, when a predicted image is created, a plurality of pictures can be referenced as reference pictures.

In an AVC decoding apparatus, pictures after decoding (decoded pictures) including pictures as reference pictures are stored in a buffer which is called a DPB (Decoded Pictures Buffer).

In the DPB, a picture which is referenced over a short term is marked as a short-term reference picture (used for short-term reference), a picture which is referenced over a long term is marked as a long-term reference picture (used for long-term reference), and a picture which is not referenced is marked as a non-reference picture (unused for reference).

The pictures (decoded pictures) stored in the DPB are sorted in a display order and output (read) with a timing designated in advance.

The size of the DPB is defined by profile and level, and is defined with the bit quantity, not the number of pictures.

Thus, the number of pictures which can be stored in the DPB varies depending on the frames or the like of the pictures even at the same profile and level.

For example, at Main profile, level 4, the size MaxDPB of the DPB is defined with the expression MaxDPB=12288.0× 1024 bytes.

Thus, at Main profile, level 4, for example, when a picture in a YUV 4:2:0 format with horizontal 1440×vertical 1088 pixels is a picture to be encoded (current picture in encoding process), the DPB can store a maximum of five pictures.

Further, at Main profile, level 4, for example, when a picture in a YUV 4:2:0 format with horizontal 1920×vertical 1088 pixels is a current picture in encoding process, the DPB can store a maximum of four pictures.

In an AVC encoding apparatus, taking into consideration the size of the DPB in the decoding apparatus, encoding has to be performed in the output order in which the pictures are output from the DPB, or such that there is no contradiction in a picture which is referenced in creating a predicted image.

In managing the DPB, there are known two types of a sliding window memory control process and an adaptive memory control process (for example, Shinya Kakuno, Yoshihiro Kikuchi, and Teruhiko Suzuki, "Impress Standard Textbook Series Third Revised Edition H.264/AVC Textbook", Impress Corporation).

In the sliding window memory control process, the DPB is managed in a FIFO (First In First Out) manner, and the pictures stored in the DPB are released in ascending order of frame_num (become non-reference pictures).

That is, in the sliding window memory control process, an I (Intra) picture, a P (Predictive) picture, and a Bs picture which is a referable B (Bi-directional Predictive) picture are stored in the DPB as short-term reference pictures.

Then, after as many reference pictures are stored as can be stored in the DPB, the earliest (oldest) short-term reference picture from among the short-term reference pictures stored in the DPB is released.

When long-term reference pictures are stored in the DPB, the sliding window memory control process does not affect the long-term reference pictures stored in the DPB. That is, in the sliding window memory control process, only the short-term reference picture from among the reference pictures is managed in the FIFO manner.

In the adaptive memory control process, the pictures stored in the DPB are managed by using a command which is called an MMCO (Memory management control operation).

According to the MMCO command, for the reference pictures stored in the DPB, the short-term reference pictures are set as non-reference pictures, or a long-term frame index for managing a long-term reference picture is assigned to each of the short-term reference pictures. Thus, the short-term reference pictures can be set as long-term reference pictures, the maximum value of the long-term frame index can be set, or all the reference pictures can be set as non-reference pictures.

In the case of AVC, motion compensation of the reference pictures stored in the DPB is performed, such that inter prediction is performed to create a predicted image. Inter prediction of a B picture (including Bs picture) can use a maximum of two reference pictures. Inter predictions using the two reference pictures are respectively called L0 (List 0) prediction and L1 (List 1) prediction.

With regard to a B picture (including a Bs picture), as inter prediction, either L0 prediction or L1 prediction, or both of L0 prediction and L1 prediction are used. With regard to a P picture, as inter prediction, only L0 prediction is used.

In the inter prediction, the reference pictures which are referenced in creating a predicted image are managed by a reference picture list.

In the reference picture list, the reference picture number (Reference Index) for designating a reference picture which is referenced in creating a predicted image is assigned to each of the reference pictures stored in the DPB.

When a current picture in decoding process which is a picture to be decoded (and a current picture in encoding process) is a P picture, as described above, since only L0 prediction is used as inter prediction for a P picture, the assignment of the reference picture number is performed only for L0 prediction.

When the current picture in decoding process is a B picture (including a Bs picture), as described above, since both of L0 prediction and L1 prediction are used as inter prediction for the B picture, the assignment of the reference picture number is performed for both of L0 prediction and L1 prediction.

The reference picture number for L0 prediction is also referred to as an L0 index, and the reference picture number for L1 prediction is also referred to as an L1 index.

When the current picture in decoding process is a P picture, at the AVC default (preset value), for the reference pictures stored in the DPB, a smaller reference picture number (L0 index) is assigned to a later reference picture in the decoding order.

The reference picture number is an integer value equal to or greater than 0, and the minimum value thereof is 0. Thus, when the current picture in decoding process is a P picture, as the L0 index, 0 is assigned to a reference picture which is decoded immediately before the current picture in decoding process.

When the current picture in decoding process is a B picture (including a Bs picture), at the AVC default, for the reference pictures stored in the DPB, the reference picture number (L0 index and L1 index) is assigned in a POC (Picture Order Count) order, that is, in the display order.

That is, in the case of L0 prediction, with regard to the reference pictures temporally earlier than the current picture in decoding process in the display order, the L0 index having a smaller value is assigned to a reference picture closer to the current picture in decoding process. Thereafter, with regard to the reference pictures temporally later than the current picture in decoding process in the display order, the L0 index having a smaller value is assigned to a reference picture closer to the current picture in decoding process.

In the case of L1 prediction, with regard to the reference pictures temporally later than the current picture in decoding process in the display order, the L1 index having a smaller value is assigned to a reference picture closer to the current picture in decoding process. Thereafter, with regard to the reference pictures temporally earlier than the current picture in decoding process in the display order, the L1 index having a smaller value is assigned to a reference picture closer to the current picture in decoding process.

The assignment of the reference picture number (L0 index and L1 index) at the AVC default is performed for each of the short-term reference pictures. The assignment of the reference picture number to the long-term reference picture is performed after the reference picture number has been assigned to the short-term reference picture.

Thus, at the AVC default, the reference picture number having a greater value than the reference picture number assigned to each of the short-term reference pictures is assigned to each of the long-term reference pictures.

In the case of AVC, the assignment of the reference picture number may be performed arbitrarily using a command called Reference Picture List Reordering (hereinafter, also referred to as RPLR command), in addition to the above-described default method.

After the assignment of the reference picture number is performed using the RPLR command, when there is a reference picture assigned with no reference picture number, the reference picture number is assigned to the reference picture by the default method.

SUMMARY OF THE INVENTION

In recent years, contents of stereoscopic images which can be stereoscopically viewed have been produced, in addition to contents of two-dimensional images.

For display of stereoscopic images, an exclusive-use device (hereinafter, referred to as a stereoscopic device) is used. As such a stereoscopic device, for example, there is an IP (Integral Photography) stereoscopic image system which has been developed by NHK (Japan Broadcasting Corporation).

Image data of stereoscopic images is constituted by multiple-viewpoint image data (image data of images captured at multiple viewpoints). Thus, a so-called "multi-view television" can be realized in which, as the number of viewpoints is larger and the viewpoints are over a wider range, a subject can be viewed in various directions.

Of stereoscopic images, a stereoscopic image having the smallest number of viewpoints is a two-viewpoint 3D (Dimensional) image (stereo image). Image data of a 3D image includes image data of a left-eye image (hereinafter, also referred to as an L (Left) image) which is an image observed by a left eye, and image data of a right-eye image (hereinafter, also referred to as an R (Right) image) which is an image observed by a right eye.

A stream of stereoscopic images including a 3D image is constituted by a stream of multiple images when the same subject is viewed at multiple different viewpoints, that is, a stream of multiple-viewpoint images having a disparity. As a technique for encoding and decoding of a stream of stereoscopic images constituted by a stream of multiple-viewpoint images, there is known MVC (Multiview Video Coding), but an MVC decoding apparatus is not in widespread use.

At present, an AVC decoding apparatus is in widespread use which decodes contents of two-dimensional images. There is an increasing demand for an AVC decoding apparatus capable of decoding contents of 3D images, which will increase in the future.

Hence, a method is considered in which the pictures of an L image and an R image constituting a 3D image are alternately arranged to encode two streams of an L image stream and an R image stream as a single stream, called a frame sequential, using AVC.

In this case, encoded data which is obtained through encoding of a frame sequential using AVC can be decoded by the AVC decoding apparatus which is in widespread use.

Meanwhile, as described above, since the size of the DPB of the AVC decoding apparatus is defined by profile and level, a limited number of pictures can be stored in the DPB.

In the frame sequential, since the pictures of the L image and the R image are alternately arranged, a picture immediately before the current picture in decoding process (current picture in encoding process) is a picture at a viewpoint different from the current picture in decoding process in the POC order.

When a predicted image is created with a picture at a viewpoint different from the current picture in decoding process as a reference picture, prediction errors may increase and encoding efficiency may be deteriorated compared to a case where a predicted image is created with a picture at the same viewpoint as the current picture in decoding process as a reference picture.

Thus, in the case of the inter prediction, it is desirable that a picture which is at the same viewpoint as the current picture in decoding process and is closest to the current picture in decoding process in the POC order can be used as a reference picture.

However, from among the pictures which can be the reference pictures, a picture which is at the same viewpoint as the current picture in decoding process and is closest to the current picture in decoding process in the POC order is a picture before (or after) two pictures from the current picture in decoding process in the POC order even if the picture is not farthest from the current picture in decoding process.

For this reason, in the case of the sliding window memory control process where the DPB with a limited number of storable pictures is managed in the FIFO manner, from among the pictures which can be the reference pictures, a picture which is at the same viewpoint as the current picture in decoding process and is closest to the current picture in decoding process in the POC order has already been released from the DPB, thus the picture may not be referenced in creating the predicted image of the current picture in decoding process. In this case, encoding efficiency may be deteriorated.

Thus, it is desirable to facilitate improvement of encoding efficiency.

An embodiment of the invention provides an image processing apparatus or a program which causes a computer to function as an image processing apparatus. The image processing apparatus or a program includes a storage means for storing a decoded image, which is obtained by encoding pictures constituting a frame sequential, in which pictures of first image and a second images each having a disparity are alternately arranged, and performing local decoding, as a reference picture which is referenced when a predicted image is created for use in temporally later predictive encoding, and a storage control means for performing storage control to control the storage of the reference picture in the storage means such that, from among pictures which are encoded temporally earlier than a current picture in encoding process which is a picture to be encoded, and are capable of becoming reference pictures, a picture which is a picture of an image at the same viewpoint as the current picture in encoding process from among the first image and the second images and is closest to the current picture in encoding process in a display order is stored in the storage means.

Another embodiment of the invention provides an image processing method. The image processing method includes the steps of storing a decoded image obtained by encoding pictures constituting a frame sequential, in which pictures of a first image and a second image each having a disparity are alternately arranged, and performing local decoding in a storage means as a reference picture which is referenced when a predicted image is created for use in temporally later predictive encoding, and performing storage control to control the storage of the reference picture in the storage means such that, from among the pictures which are encoded temporally earlier than a current picture in encoding process which is a picture to be encoded, and are capable of becoming reference pictures, a picture which is a picture of an image at the same viewpoint as the current picture in encoding process from among the first and second images and is closest to the current picture in encoding process in a display order is stored in the storage means.

According to the above-described embodiments, the decoded image which is obtained by encoding the pictures constituting the frame sequential, in which the pictures of the first and second images having a disparity constituting a 3D (Dimensional) image are alternately arranged, and performing local decoding is stored in the storage means as the reference picture which is referenced in creating the predicted image for use in temporally later predictive encoding. The storage control to control the storage of the reference picture in the storage means is performed such that, from among the pictures which are encoded temporally earlier than the current picture in encoding process which is a picture to be encoded, and are capable of becoming reference pictures, the picture which is the picture of the image at the same viewpoint as the current picture in encoding process from among the first and second images and is closest to the current picture in encoding process in the display order is stored in the storage means.

The image processing apparatus may be a stand-alone apparatus or may be an internal block constituting a single apparatus.

The program may be transmitted through a transmission medium, or may be recorded in a recording medium and provided.

According to the embodiments of the invention, it is possible to improve encoding efficiency.

BRIEF DESCRIPTION OF THE DRAWINGS

FIG. 10 is diagram illustrating first storage control.

FIG. 11 is a diagram illustrating the state of a DPB when an MMCO command is issued, and a frame sequential is encoded/decoded through AVC.

FIG. 12 is a diagram illustrating the issuance of an RPLR command which is carried out along with the issuance of the MMCO command as the first storage control.

FIG. 13 is a diagram illustrating the state of a DPB when an MMCO command and an RPLR command are issued, and a frame sequential is encoded/decoded through AVC.

FIG. 14 is a flowchart illustrating processing for decoding encoded data output from the encoding apparatus.

FIG. 15 is a diagram showing the state of a frame memory 49 corresponding to a DPB when processing is performed for decoding encoded data.

FIG. 16 is a diagram illustrating second storage control.

FIG. 17 is a diagram illustrating the state of a DPB when an MMCO command is issued, and a frame sequential is encoded/decoded through AVC.

FIG. 18 is a diagram illustrating the issuance of an RPLR command which is carried out along with the issuance of the MMCO command as the second storage control.

FIG. 20 is a block diagram showing a configuration example of an embodiment of a computer to which the invention is applied.

DESCRIPTION OF PREFERRED EMBODIMENTS

Hereinafter, a case where an embodiment of the invention is applied to AVC will be described subsequent to an explanation on AVC as a preliminary step.

[AVC Encoding Apparatus]

Figure 1:
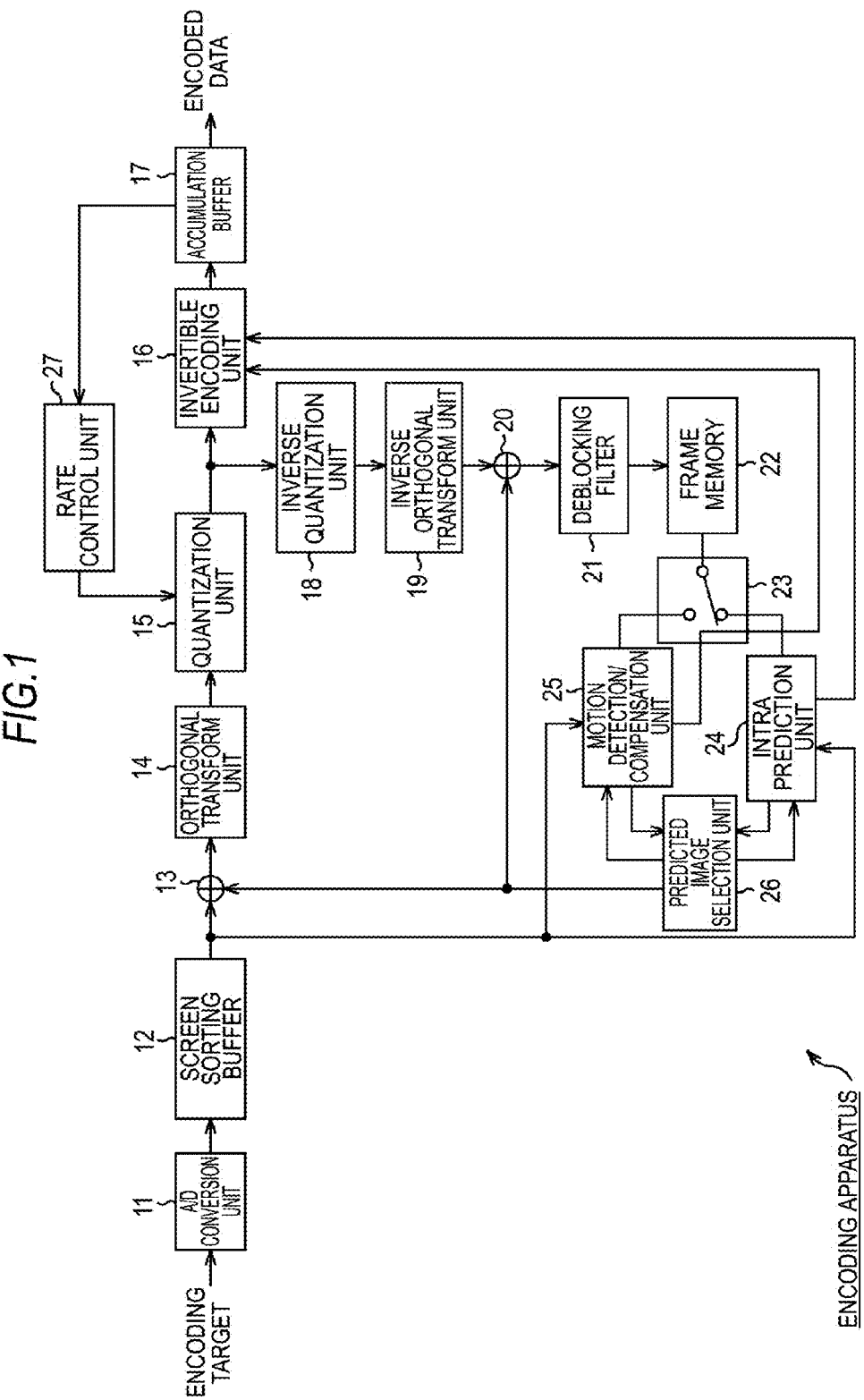
FIG. 1 is a block diagram showing a configuration example of an AVC encoding apparatus.

FIG. 1 is a block diagram showing a configuration example of an AVC encoding apparatus.

Referring to FIG. 1, an encoding apparatus includes an A/D (Analog/Digital) conversion unit 11, a screen sorting buffer 12, an arithmetic unit 13, an orthogonal transform unit 14, a quantization unit 15, an invertible encoding unit 16, an accumulation buffer 17, an inverse quantization unit 18, an inverse orthogonal transform unit 19, an arithmetic unit 20, a deblocking filter 21, a frame memory 22, a switch 23, an intra prediction unit 24, a motion detection/compensation unit 25, a predicted image selection unit 26, and a rate control unit 27.

The pictures of an encoding-target image (motion image) are supplied sequentially to the A/D conversion unit 11 in the display order.

When a picture to be supplied is an analog signal, the A/D conversion unit 11 A/D-converts the analog signal and supplies the digital signal to the screen sorting buffer 12.

The screen sorting buffer 12 temporarily stores the pictures from the A/D conversion unit 11, and reads the pictures in accordance with the structure of a GOP (Group of Pictures) determined in advance to sort the pictures, which are arranged in the display order, in the encoding order (decoding order).

The pictures read from the screen sorting buffer 12 are supplied to the arithmetic unit 13, the intra prediction unit 24, and the motion detection/compensation unit 25.

The arithmetic unit 13 is supplied with the pictures from the screen sorting buffer 12, and is also supplied with the predicted image created by the intra prediction unit 24 or the motion detection/compensation unit 25 from the predicted image selection unit 26.

With each picture read from the screen sorting buffer 12 as a current picture in encoding process, as necessary, the arithmetic unit 13 calculates the pixel value of the predicted image supplied from the predicted image selection unit 26 from the pixel value of (each block constituting) the current picture in encoding process, and supplies the pixel value to the orthogonal transform unit 14.

The orthogonal transform unit 14 performs orthogonal transform, such as discrete cosine transform or Karhunen-Loeve transform, for (the pixel value or the subtracted value obtained by subtracting the predicted image of) the current picture in encoding process from the arithmetic unit 13, and supplies the resultant transform coefficient to the quantization unit 15.

The quantization unit 15 quantizes the transform coefficient supplied from the orthogonal transform unit 14 and supplies the resultant quantized value to the invertible encoding unit 16.

The invertible encoding unit 16 performs invertible encoding, such as variable length encoding (for example, CAVLC (Context-Adaptive Variable Length Coding) or the like) or arithmetic encoding (for example, CABAC (Context-Adaptive Binary Arithmetic Coding) or the like), for the quantized value from the quantization unit 15 and supplies resultant encoded data to the accumulation buffer 17.

The invertible encoding unit 16 is supplied with the quantized value from the quantization unit 15, and is also supplied with information indicating intra prediction having been performed from the intra prediction unit 24 in blocks or macroblocks as necessary, and the motion vector and information indicating the mode of inter prediction in blocks or macroblocks from the motion detection/compensation unit 25 as necessary.

The invertible encoding unit 16 encodes the information indicating intra prediction having been performed from the intra prediction unit 24 or the motion vector and the information or the like indicating the mode of inter prediction from the motion detection/compensation unit 25 so as to be included in the header or the like of encoded data.

The information indicating intra prediction having been performed and the information indicating the mode of inter prediction are also collectively referred to as a prediction mode.

The accumulation buffer 17 temporarily stores encoded data from the invertible encoding unit 16 and outputs encoded data at a predetermined rate.

Encoded data output from the accumulation buffer 17 is transmitted through a transmission path or recorded in a recording medium.

The quantized value obtained by the quantization unit 15 is supplied to the invertible encoding unit 16 and also to the inverse quantization unit 18, and undergoes local decoding in the inverse quantization unit 18, the inverse orthogonal transform unit 19, and the arithmetic unit 20.

That is, the inverse quantization unit 18 inversely quantizes the quantized value from the quantization unit 15 to the transform coefficient, and supplies the transform coefficient to the inverse orthogonal transform unit 19.

The inverse orthogonal transform unit 19 performs inverse orthogonal transform for the transform coefficient from the inverse quantization unit 18, and supplies resultant data to the arithmetic unit 20.

The arithmetic unit 20 adds the pixel value of the predicted image supplied from the predicted image selection unit 26 to data supplied from the inverse orthogonal transform unit 19 as necessary, obtains a decoded image by decoding a portion (block) of the current picture in encoding process to be processed by the arithmetic unit 13, the orthogonal transform unit 14, and the quantization unit 15, and supplies the decoded image to the deblocking filter 21.

The deblocking filter 21 filters the decoded image from the arithmetic unit 20 to remove (reduce) block distortion generated in the decoded image, and supplies the resultant decoded image to the frame memory 22.

The frame memory 22 stores the decoded image from the deblocking filter 21 as (a part of) a reference picture which is referenced in creating a predicted image for use in temporally later predictive encoding (encoding in which the predicted image is subtracted by the arithmetic unit 13).

Local decoding by the inverse quantization unit 18, the inverse orthogonal transform unit 19, and the arithmetic unit 20 is performed for an I picture, a P picture, and a Bs picture which are referable pictures capable of becoming reference pictures. The frame memory 22 stores the decoded images of the I picture, the P picture, and the Bs picture.

The switch 23 selects the intra prediction unit 24 or the motion detection/compensation unit 25. The reference picture stored in the frame memory 22 is supplied to one of the intra prediction unit 24 and the motion detection/compensation unit 25 selected by the switch 23.

When the current picture in encoding process is an I picture, a P picture or a B picture (including a Bs picture) which can be intra-predicted, the intra prediction unit 24 reads a decoded image, which is a reference picture and a portion of the current picture in encoding process already subjected to local decoding, from the frame memory 22 through the switch 23. Then, the intra prediction unit 24 creates a predicted image from the pixels in the vicinity of the portion (block) of the decoded image to be processed by the arithmetic unit 13, and supplies the predicted image to the predicted image selection unit 26.

The intra prediction unit 24 calculates a prediction error of the predicted image created from the decoded image with respect to the current picture in encoding process from the screen sorting buffer 12, and supplies the prediction error to the predicted image selection unit 26 along with the predicted image.

When the current picture in encoding process is a P picture or a B picture (including a Bs picture) which can be inter-predicted, the motion detection/compensation unit 25 reads a picture, which is a reference picture and is encoded earlier than the current picture in encoding process and subjected to local decoding, from the frame memory 22 through the switch 23.

The motion detection/compensation unit 25 detects the motion vector between the current picture in encoding process and the reference picture from the frame memory 22 through, for example, block matching using the pictures from the screen sorting buffer 12.

The motion detection/compensation unit 25 performs motion compensation for the reference picture from the frame memory 22 in accordance with the motion vector for the current picture in encoding process to create a predicted image, and then supplies the predicted image to the predicted image selection unit 26.

The motion detection/compensation unit 25 calculates a prediction error of the predicted image created from the reference picture with respect to the current picture in encoding process from the screen sorting buffer 12, and supplies the prediction error to the predicted image selection unit 26 along with the predicted image.

The predicted image selection unit 26 selects one with a smaller prediction error from among the predicted images from the intra prediction unit 24 and the motion detection/compensation unit 25, and supplies the selected predicted image to the arithmetic units 13 and 20.

The predicted image selection unit 26 supplies a message indicating the predicted image having been selected to one of the intra prediction unit 24 and the motion detection/compensation unit 25 from which the predicted image is selected.

When a message is supplied from the predicted image selection unit 26, the intra prediction unit 24 supplies information indicating intra prediction having been performed to the invertible encoding unit 16.

When a message is supplied from the predicted image selection unit 26, the motion detection/compensation unit 25 supplies the motion vector and information indicating the mode of inter prediction to the invertible encoding unit 16.

The rate control unit 27 monitors the accumulated amount of encoded data in the accumulation buffer 17, and controls the behavior of the quantization unit 15, such as the quantization step of the quantization unit 15, on the basis of the accumulated amount.

[AVC Decoding Apparatus]

Figure 2:
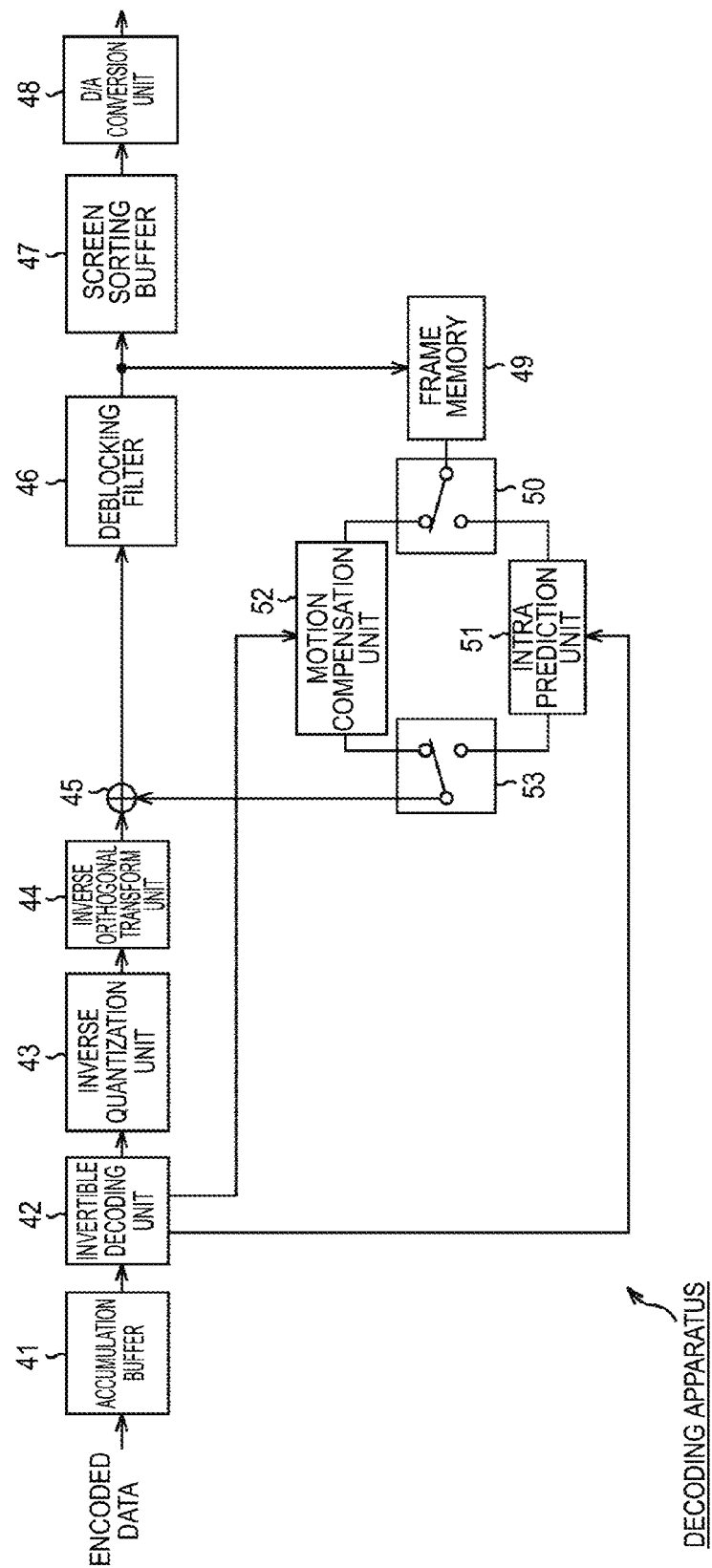
FIG. 2 is a block diagram showing a configuration example of an AVC decoding apparatus.

FIG. 2 is a block diagram showing a configuration example of an AVC decoding apparatus.

Referring to FIG. 2, the decoding apparatus includes an accumulation buffer 41, an invertible decoding unit 42, an inverse quantization unit 43, an inverse orthogonal transform unit 44, an arithmetic unit 45, a deblocking filter 46, a screen sorting buffer 47, a D/A conversion unit 48, a frame memory 49, a switch 50, an intra prediction unit 51, a motion compensation unit 52, and a switch 53.

The accumulation buffer 41 is supplied with encoded data obtained by encoding an image (motion image) through AVC in the encoding apparatus of FIG. 1 or the like.

The accumulation buffer 41 temporarily stores encoded data supplied thereto and supplies encoded data to the invertible decoding unit 42.

The invertible decoding unit 42 performs processing, such as variable length decoding or arithmetic decoding, for encoded data from the accumulation buffer 41 on the basis of the format of encoded data, and decodes information necessary for decoding the image, such as a quantized value and a prediction mode or a motion vector included in the header or the like of encoded data.

The quantized value obtained by the invertible decoding unit 42 is supplied to the inverse quantization unit 43, and the prediction mode is supplied to the intra prediction unit 51 and the motion compensation unit 52. The motion vector obtained by the invertible decoding unit 42 is supplied to the motion compensation unit 52. Other information necessary for decoding the image obtained by the invertible decoding unit 42 is supplied to necessary blocks.

The inverse quantization unit 43 inversely quantizes the quantized value from the invertible decoding unit 42 to a transform coefficient, and supplies the transform coefficient to the inverse orthogonal transform unit 44.

The inverse orthogonal transform unit 44 performs inverse orthogonal transform for the transform coefficient from the inverse quantization unit 43, and supplies resultant data to the arithmetic unit 45.

The arithmetic unit 45 adds a predicted image of intra prediction or a predicted image of inter prediction supplied from the switch 53 for data supplied from the inverse orthogonal transform unit 44 as necessary to calculate a decoded image, and supplies the decoded image to the deblocking filter 46.

The deblocking filter 46 performs, for example, the same filtering as in the deblocking filter 21 of FIG. 1 for the decoded image from the arithmetic unit 45, and supplies the decoded image after filtering to the screen sorting buffer 47.

The deblocking filter 46 supplies (decoded images constituting) of an I picture, a P picture, and a Bs picture, which are referable pictures, from among the decoded images after filtering to the frame memory 49.

The screen sorting buffer 47 temporarily stores and reads a picture (decoded picture) constituted by the decoded images from the arithmetic unit 45, sorts the decoded picture in the original order (display order), and supplies the decoded picture to the D/A (Digital/Analog) conversion unit 48.

When the decoded picture from the screen sorting buffer 47 has to be output as an analog signal, the D/A conversion unit 48 D/A-converts the decoded picture and outputs resultant data.

The frame memory 49 stores the decoded images supplied from the arithmetic unit 45 as (a portion of) a reference picture which is referenced in creating a predicted image.

When a current picture in decoding process, that is, a picture which is to be processed in the inverse quantization unit 43, the inverse orthogonal transform unit 44, and the arithmetic unit 45 is intra-predicted, the switch 50 selects the intra prediction unit 51 from among the intra prediction unit 51 and the motion compensation unit 52. When the current picture in decoding process is inter-predicted, the switch 50 selects the motion compensation unit 52 from among the intra prediction unit 51 and the motion compensation unit 52.

A reference picture which is used in creating a predicted image at the time of encoding from among the reference pictures stored in the frame memory 49 is supplied to one of the intra prediction unit 51 and the motion compensation unit 52 selected by the switch 50.

The intra prediction unit 51 creates the predicted image of intra prediction from the reference picture supplied from the frame memory 49 through the switch 50, and supplies the predicted image to the switch 53.

The motion compensation unit 52 performs motion compensation for the reference picture supplied from the frame memory 49 through the switch 50 in accordance with the motion vector from the invertible decoding unit 42 to create the predicted image of inter prediction, and supplies to the predicted image to the switch 53.

The intra prediction unit 51 and the motion compensation unit 52 recognize whether the current picture in decoding process is intra-predicted or inter-predicted on the basis of the prediction mode from the invertible decoding unit 43.

The switch 53 selects one of the intra prediction unit 51 and the motion compensation unit 52 selected by the switch 50, and supplies the predicted image supplied from the selected unit to the arithmetic unit 45.

In the decoding apparatus of FIG. 2, the screen sorting buffer 47 and the frame memory 49 correspond to a DPB. That is, the screen sorting buffer 47 corresponds to a storage area of the DPB where a non-reference picture is stored, and the frame memory 49 corresponds to a storage area of the DPB where a reference picture is stored.

[Frame Sequential]

Figure 3:
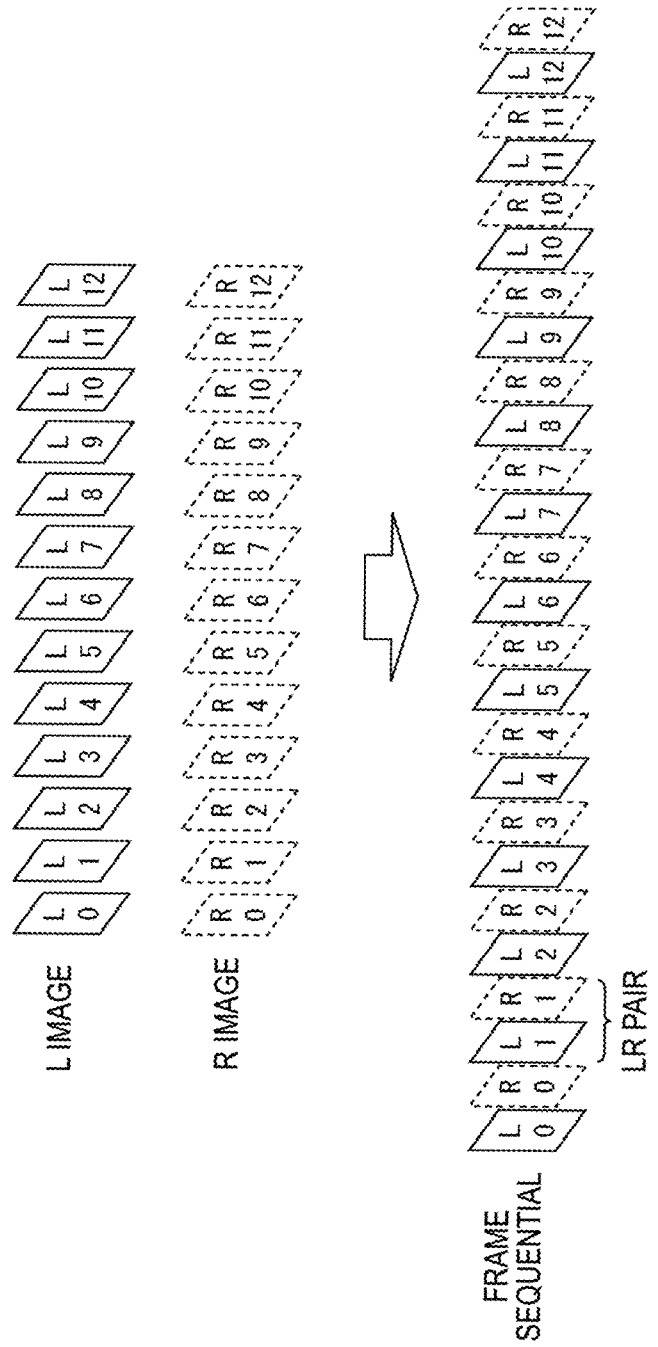
FIG. 3 is a diagram illustrating a frame sequential.

FIG. 3 is a diagram illustrating a frame sequential.

A 3D image is constituted by the streams of L and R images (motion image) as first and second images having a disparity.

In FIG. 3, L#i indicates an (i+1)th picture from the head of the L image (Left image), and R#i indicates an (i+1)th picture from the head of the R image (Right image) (where i=0, 1, ... ).

The pictures L#i and R#i are images when the same subject (scene) is viewed at different viewpoints. A set of pictures L#i and R#i is also referred to as an LR pair.

It is difficult for the AVC encoding apparatus of FIG. 1 and the AVC decoding apparatus of FIG. 2 to directly treat the 3D image having the two streams of an L image stream and an R image stream.

That is, in order that the AVC encoding apparatus of FIG. 1 and the AVC decoding apparatus of FIG. 2 treat the 3D image, it is necessary to make the two streams of the L image stream and the R image stream as a single stream.

As the method of making the two streams of the L image stream and the R image stream as a single stream, as shown in FIG. 3, a method is known in which the pictures of the L image and the R image constituting the 3D image are alternately arranged.

As described above, a single image stream obtained by alternately arranging the pictures of the L image and the R image constituting the 3D image is called a frame sequential.

If a 3D image is made as a frame sequential, the 3D image which is the frame sequential can be handled in the AVC encoding apparatus of FIG. 1 and the AVC decoding apparatus of FIG. 2.

With regard to the frame sequential of FIG. 3, in the LR pair, the picture L#i of the L image is arranged temporally earlier than the picture R#i of the R image. In contrast, the picture R#i of the R image may be arranged temporally earlier than the picture L#i of the L image.

Hereinafter, appropriately, the pictures of the L image are indicated by solid lines, and the pictures of the R image are indicated by dotted lines.

Figure 4:
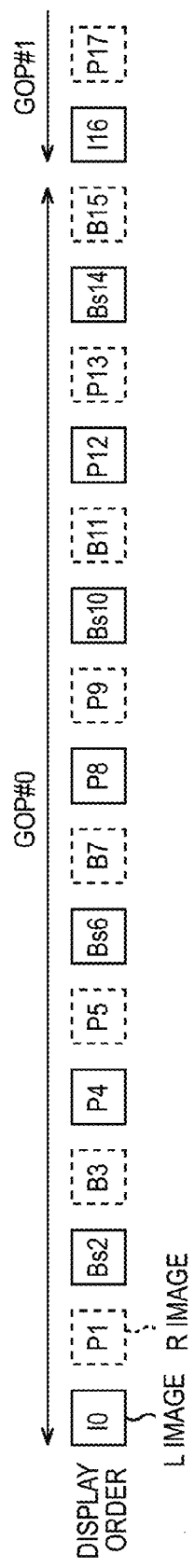
FIG. 4 is a diagram showing an example of the structure of a GOP.

FIG. 4 is a diagram showing an example of the structure of the GOP when the frame sequential of FIG. 3 is encoded/decoded through AVC.

In FIG. 4, one GOP includes 16 pictures of I, P, Bs, B, P, P, Bs, B, P, P, Bs, B, P, P, Bs, and B pictures in the POC order.

According to FIG. 4, 16 pictures of pictures L#(8j+0), R#(8j+0), L#(8j+1), R#(8j+1), ... , L#(8j+7), and R#(8j+7) constituting the frame sequential of FIG. 3 constitute one GOP, and are respectively encoded/decoded as I, P, Bs, B, P, P, Bs, B, P, P, Bs, B, P, P, Bs, and B pictures (where j=0, 1, ... ).

A (j+1)th GOP from the head of the frame sequential is also expressed as GOP#j.

A (k+1)th picture from the head of GOP#j is expressed by a character string with the picture type of the relevant picture and a variable k expressing the display order arranged. In this case, the 16 pictures of I, P, Bs, B, P, P, Bs, B, P, P, Bs, B, P, P, Bs, and B picture constituting one GOP are respectively expressed as I0, P1, Bs2, B3, P4, P5, Bs6, B7, P8, P9, Bs10, B11, P12, P13, Bs14, and B15 pictures.

However, the pictures of GOP#j+1 next to GOP#j may be expressed by a character string of the picture type and a numeral representing the display order from the head of GOP#j for discrimination from the pictures of GOP#j.

In this case, the 16 pictures of I, P, Bs, B, P, P, Bs, B, P, P, Bs, B, P, P, Bs, and B pictures constituting GOP#j+1 are respectively expressed by I16, P17, Bs18, B19, P20, P21, Bs22, B23, P24, P25, Bs26, B27, P28, P29, Bs30, and B31 picture.

When a (k+1)th picture from the head of GOP#j is expressed by a character string of the picture type of the relevant picture and a variable k, the variable k corresponds to the POC. The POC is reset to 0 with a predetermined timing, such as the timing of an IDR (Instantaneous Decoding Refresh) picture.

[Encoding/Decoding of Frame Sequential Through AVC]

Figure 5:
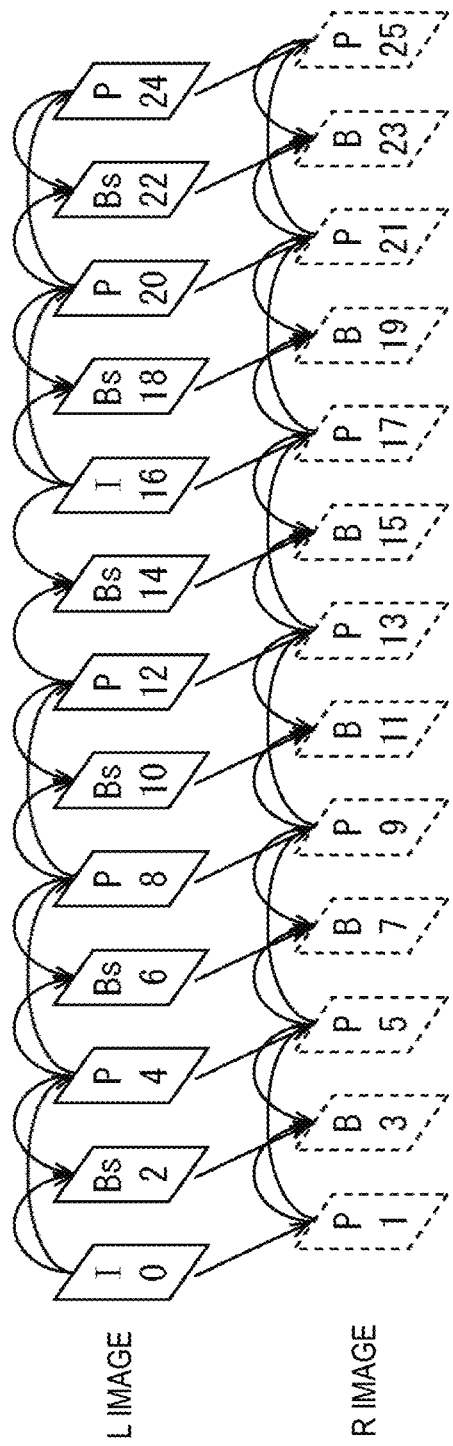
FIG. 5 is a diagram showing an example of a reference relationship.

FIG. 5 is a diagram showing an example of a reference relationship for improving encoding efficiency when the frame sequential having the structure of the GOP shown in FIG. 4 is encoded/decoded through AVC.

In FIG. 5 (the same is applied to FIG. 7 which will be described below), an arrow indicates a reference relationship. A picture at the start point of the arrow is a referable picture when a picture at the end point of the arrow is a current picture in encoding process (current picture in decoding process).

For example, with regard to the Bs6 picture of the L image, the P4 picture and the P8 picture closest to the Bs6 picture in the display order from among the pictures of the L image which is an image at the same viewpoint are made to be referable (can be made as reference pictures which are referenced in creating a predicted image), thus encoding efficiency may be improved.

For example, with regard to the B7 picture of the R image, the P5 picture and the P9 picture closest to the B7 picture in the display order from among the pictures of the R image which is an image at the same viewpoint, and the Bs6 picture of the L image constituting the LR pair with the B7 picture of the R image are made to be referable, thus encoding efficiency may be improved.

For example, with regard to the Bs10 picture of the L image, the P8 picture and the P12 picture closest to the Bs10 picture in the display order from among the pictures of the L image which is an image at the same viewpoint are made to be referable, thus encoding efficiency may be improved.

For example, with regard to the B11 picture of the R image, the P9 picture and the P13 picture closest to the B11 picture in the display order from among the pictures of the R image which is an image at the same viewpoint and the Bs10 picture of the L image constituting the LR pair with the B11 picture of the R image are made to be referable, thus encoding efficiency may be improved.

For example, with regard to the Bs14 picture of the L image, the P12 picture and the I16 picture (the I0 picture of the next GOP) closest to the Bs14 picture in the display order from among the pictures of the L image which is an image at the same viewpoint are made to be referable, thus encoding efficiency may be improved.

For example, with regard to the B15 picture of the R image, the P13 picture and the P17 picture (the P1 picture of the next GOP) closest to the B15 picture in the display order from among the pictures of the R image which is an image at the same viewpoint and the Bs14 picture of the L image constituting the LR pair with the B15 picture of the R image are made to be referable, thus encoding efficiency may be improved.

Although through AVC, a Bs picture can be referenced from P and B pictures, in FIG. 5, a Bs picture can be referenced only from a B picture, not being referenced from a P picture.

In FIG. 5, from among the pictures constituting the LR pair of the L image and the R image constituting the frame sequential, the pictures of the L image can be referenced only from the pictures of the R image, but the pictures of the R image are not referenced from the pictures of the L image.

However, a Bs picture can be referenced from a P picture, and the pictures of the R image can be referenced from the pictures of the L image.

With regard to the frame sequential of FIG. 4, as understood from FIG. 5, I, Bs, P, Bs, P, Bs, P, Bs, I, Bs, P, . . . pictures are arranged in the L image, and P, B, P, B, P, . . . pictures are arranged in the R image.

[Encoding/Decoding Through AVC when MMCO Command and RPLR Command are not Issued]

Figure 6:
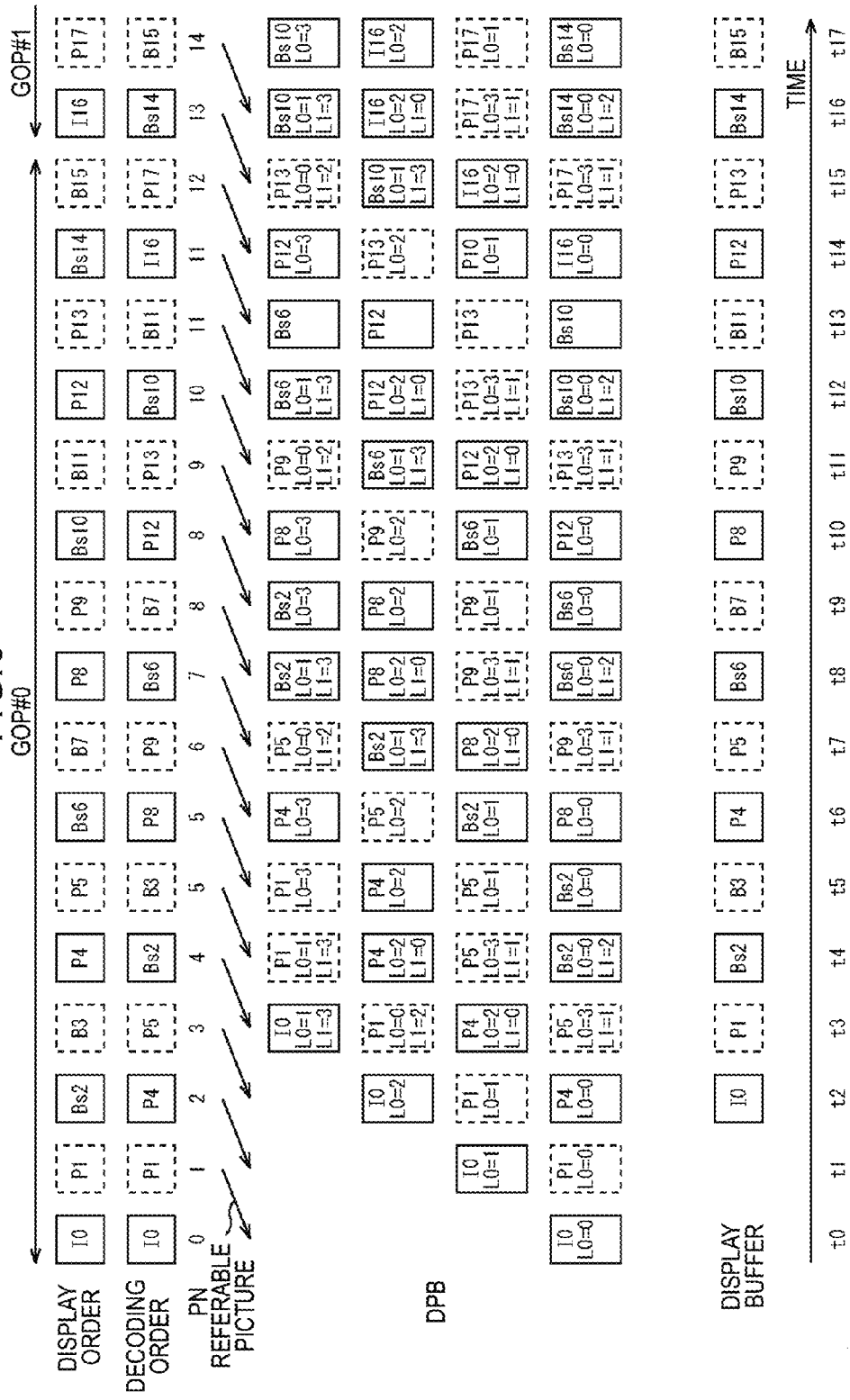
FIG. 6 is a diagram illustrating the state of a DPB when a frame sequential is encoded/decoded through AVC.

FIG. 6 is a diagram illustrating the state of a DPB when a frame sequential is encoded/decoded through AVC without issuing an MMCO command and an RPLR command.

Hereinafter, it is assumed that max_dec_frame_buffering and num_ref_frames are set, for example, as max_dec_frame_buffering=4 and num_ref_frames=3. However, max_dec_frame_buffering is not limited to 4, and num_ref_frames is not limited to 3.

Here, "max_dec_frame_buffering=4" indicates that the DPB can store a maximum of four reference pictures. Further, "num_ref_frames=3" indicates that the maximum value of the reference picture number is 3, that is, the reference picture number is assigned to a maximum of four pictures.

FIG. 6 shows the display order of pictures constituting a frame sequential, the encoding/decoding order (Decode order), the PN (Picture Number), the storage state of a DPB, and the storage state of a display buffer.

Referring to FIG. 6, in the frame sequential, as described with reference to FIG. 4, I0, P1, Bs2, B3, P4, P5, Bs6, B7, P8, P9, Bs10, B11, P12, P13, Bs14, B15, I16 (I0)), P17 (P1), Bs18 (Bs2), B19 (B3), P20 (P4), P21 (P5), . . . pictures are arranged in the display order, and 16 pictures constitute the GOP.

The frame sequential is encoded/decoded, for example, in order of I, P, Bs, B, P, P, Bs, B, P, P, Bs, B, P, P, Bs, B, I, P, Bs, B, P, P, Bs, B, P, . . . pictures.

Only GOP#0 at the head of the frame sequential is encoded/decoded in order of I, P, P, P, Bs, B, P, P, Bs, B, P, . . . pictures, not in order of I, P, Bs, B, P, P, Bs, B, P, P, Bs, . . . pictures. Thus, as shown in FIG. 6, frame sequential is encoded/decoded in order of I0, P1, P4, P5, Bs2, B3, P8, P9, Bs6, B7, P12, P13, Bs10, B11, I16 (I0)), P17 (P1), Bs14, B15, . . . pictures.

FIG. 6 shows the PN below the encoding/decoding order of the frame sequential. The PN is an integer equal to or greater than 0. A value which is incremented by 1 is attached as PN to the current picture in decoding process in the decoding order.

When a picture one picture before in the decoding order is a non-reference picture (a picture which does not become a reference picture), the PN is not incremented, and the PN of the same value as the picture one picture before the current picture in decoding process is attached to the current picture in decoding process.

Thus, the PNs of 0, 1, 2, 3, 4, 5, 5, 6, 7, 8, 8, 9, 10, 11, 11, 12, 13, 14, . . . are attached to the I0, P1, P4, P5, Bs2, B3, P8, P9, Bs6, B7, P12, P13, Bs10, B11, I16 (I0)), P17 (P1), Bs14, B15, . . . pictures in the decoding order of FIG. 6.

The PN is reset to 0 with a predetermined timing, for example, the timing of the IDR picture.

If the frame sequential is encoded in the encoding order of FIG. 6 in the AVC encoding apparatus of FIG. 1, encoded data obtained through encoding is decoded in the decoding order of FIG. 6 in the AVC decoding apparatus of FIG. 2.

Here, it is assumed that encoded data does not include an MMCO command and an RPLR command (not encoded (multiplexed)) (not signalized).

In this case, in the AVC decoding apparatus of FIG. 2, in decoding encoded data, the DPB is managed only by the sliding window memory control process. In the decoding apparatus, as the reference picture number (L0 index) for L0 prediction and the reference picture number (L1 index) for L1 prediction, the values (preset values) at the AVC default are assigned to the reference pictures stored in the DPB.

That is, the decoding apparatus picks up the I0 picture of GOP#0 at the time t0 as a current picture in decoding process and decodes the I0 picture.

The I0 picture is a reference picture and, as shown in FIG. 6, the I0 picture after decoding is stored in the DPB.

At the time t1 next to the time t0, the decoding apparatus picks up the P1 picture of GOP#0 as a current picture in decoding process and decodes the P1 picture.

When the P1 picture is decoded, as shown in FIG. 6, the I0 picture is stored in the DPB, and the P1 picture is decoded with reference to the I0 picture stored in the DPB as necessary so as to create the predicted image of L0 prediction.

As described above, when the current picture in decoding process is a P picture, at the AVC default, the L0 index which is a smaller reference picture number is assigned to a later reference picture in the decoding order.

Thus, when the P1 picture is decoded, as shown in FIG. 6, the L0 index having a value of 0 is assigned to the I0 picture stored in the DPB (L0=0).

The P1 picture is a reference picture and, as shown in FIG. 6, the P1 picture after decoding is stored in the DPB as a reference picture.

At the time t2 next to the time t1, the decoding apparatus picks up the P4 picture of GOP#0 as a current picture in decoding process and decodes the P4 picture.

When the P4 picture is decoded, as shown in FIG. 6, the I0 and P1 pictures are stored in the DPB, and the P4 picture is decoded with reference to the I0 or P1 picture stored in the DPB as necessary so as to create the predicted image of L0 prediction.

At the AVC default, when the P4 picture is decoded, with regard to the I0 and P1 pictures stored in the DPB, as shown in FIG. 6, the assignment is made as follows: the L0 index having a value of 0 is assigned to the P1 picture first closest to the P4 picture in the decoding order; and the L0 index having a value of 1 is assigned to the I0 picture second closest to the P4 picture in the decoding order (L0=1).

The P4 picture is a reference picture and, as shown in FIG. 6, the P4 picture after decoding is stored in the DPB.

When the P4 picture is decoded, the I0 picture stored in the DPB is read and supplied to a display (not shown). As shown in FIG. 6, in the display, the I0 picture is stored in a display buffer (not shown) which is an internal buffer and displayed with a necessary timing.

At the time t3 next to the time t2, the decoding apparatus picks up the P5 picture of GOP#0 as a current picture in decoding process and decodes the P5 picture.

When the P5 picture is decoded, as shown in FIG. 6, the I0, P1, and P4 pictures are stored in the DPB, and the P5 picture is decoded with reference to the I0 or P1 and P4 pictures stored in the DPB as necessary so as to create the predicted image of L0 prediction.

At the AVC default, when the P5 picture is decoded, with regard to the I0, P1, and P4 pictures stored in the DPB, as shown in FIG. 6, the assignment is made as follows: the L0 index having a value of 0 is assigned to the P4 picture first closest to the P5 picture in the decoding order; the L0 index having a value of 1 is assigned to the P1 picture second closest to the P5 picture in the decoding order; and the L0 index having a value of 2 is assigned to the I0 picture second closest to the P5 picture in the decoding order (L0=2).

The P5 picture is a reference picture and, as shown in FIG. 6, the P5 picture after decoding is stored in the DPB.

When the P5 picture is decoded, the P1 picture stored in the DPB is read and supplied to the display. As shown in FIG. 6, in the display, the P1 picture is stored in the display buffer and displayed with a necessary timing.

At the time t4 next to the time t3, the decoding apparatus picks up the Bs2 picture of GOP#0 as a current picture in decoding process and decodes the Bs2 picture.

When the Bs2 picture is decoded, as shown in FIG. 6, the I0, P1, P4, and P5 pictures are stored in the DPB, and the Bs2 picture is decoded with reference to the I0 or P1, P4, and P5 pictures stored in the DPB as necessary so as to create the predicted image of L0 prediction or L1 prediction.

As described above, when the current picture in decoding process is a B picture (including a Bs picture), at the AVC default, the L0 index and the L1 index are assigned in the POC order.

That is, in the case of L0 prediction, with regard to the reference pictures temporally earlier than the current picture in decoding process in the POC order, the L0 index having a smaller value is assigned to a reference picture closer to the current picture in decoding process. Thereafter, with regard to the reference pictures temporally later than the current picture in decoding process in the POC order, the L0 index having a smaller value is assigned to a reference picture closer to the current picture in decoding process.

In the case of L1 prediction, with regard to the reference pictures temporally later than the current picture in decoding process in the POC order, the L1 index having a smaller value is assigned to a reference picture closer to the current picture in decoding process. Thereafter, with regard to the reference pictures temporally earlier than the current picture in decoding process in the POC order, the L1 index having a smaller value is assigned to a reference picture closer to the current picture in decoding process.

Thus, at the AVC default, when the Bs2 picture is decoded, with regard to the I0, P1, P4, and P5 pictures stored in the DPB, as shown in FIG. 6, the assignment is made as follows: the L0 index having a value of 0 is assigned to the P1 picture first closest to the Bs2 picture before the Bs2 picture in the POC order; and the L0 index having a value of 1 is assigned to the I0 picture second closest to the Bs2 picture before the Bs2 picture in the POC order.

At the AVC default, with regard to the I0, P1, P4, and P5 pictures stored in the DPB, as shown in FIG. 6, the assignment is made as follows: the L0 index having a value of 2 is assigned to the P4 picture first closest to the Bs2 picture after the Bs2 picture in the POC order; and the L0 index having a value of 3 is assigned to the P5 picture second closest to the Bs2 picture after the Bs2 picture in the POC order (L0=3).

At the AVC default, with regard to the I0, P1, P4, and P5 pictures stored in the DPB, as shown in FIG. 6, the assignment is made as follows: the L1 index having a value of 0 is assigned to the P4 picture first closest to the Bs2 picture after the Bs2 picture in the POC order (L1=0); and the L0 index having a value of 1 is assigned to the P5 picture second closest to the Bs2 picture after the Bs2 picture in the POC order (L1=1).

At the AVC default, with regard to the I0, P1, P4, and P5 pictures stored in the DPB, as shown in FIG. 6, the assignment is made as follows: the L1 index having a value of 2 is assigned to the P1 picture first closest to the Bs2 picture before the Bs2 picture in the POC order (L1=2); and the L1 index having a value of 1 is assigned to the I0 picture second closest to the Bs2 picture before the Bs2 picture in the POC order (L1=3).

In the AVC encoding apparatus, a reference picture number assigned to a picture (reference picture) used in creating a predicted image of a picture are included in encoded data.

The AVC decoding apparatus references a picture, to which a reference picture number which coincides with a reference picture number (L0 index, L1 index) included in encoded data is assigned, as a reference picture in creating a predicted image.

That is, for example, with regard to the Bs2 picture, when L0=0 as the L0 index is included in encoded data, the decoding apparatus performs L0 prediction with the P1 picture assigned with the L0 index 0 from among the I0, P1, P4, and P5 pictures stored in the DPB as the reference picture so as to create the predicted image of the Bs2 picture.

For example, with regard to the Bs2 picture, when L1=0 as the L1 index is included in encoded data, the decoding apparatus performs L1 prediction with the P4 picture assigned with the L1 index 0 from among the I0, P1, P4, and P5 pictures stored in the DPB as the reference picture so as to create the predicted image of the Bs2 picture.

For example, with regard to the Bs2 picture, when L0=1 as the L0 index is included in encoded data and L1=1 as the L1 index is included in encoded data, the decoding apparatus performs L0 prediction with the I0 picture assigned with the L0 index 1 from among the I0, P1, P4, and P5 pictures stored in the DPB as the reference picture and also performs L1 prediction with the P5 picture assigned with the L1 index 1 as the reference picture so as to create the predicted image of the Bs2 picture.

When the current picture in decoding process is a P picture, similarly, a picture to which a reference picture number which coincides with a reference picture number (L0 index) included in encoded data is assigned is referenced as a reference picture in creating a predicted image.

The Bs2 picture is a reference picture and the Bs2 picture after decoding is stored in the DPB.

When the Bs2 picture is stored in the DPB, the four pictures of the I0, P1, P4, and P5 pictures are stored in the DPB as much as the storage capacity allows. For this reason, in the decoding apparatus, the oldest (temporally previously stored) I0 picture from among the I0, P1, P4, and P5 pictures stored in the DPB is released through the sliding window memory control process and deleted (discarded) from the DPB.

Thereafter, the Bs2 picture after decoding is stored in the DPB, and as a result, as shown in FIG. 6, the P1, P4, P5, and Bs2 pictures are stored in the DPB.

The Bs2 picture is stored in the DPB after decoding and also supplied to the display. As shown in FIG. 6, in the display, the Bs2 picture is stored in the display buffer and displayed with a necessary timing.

At the time t5 next to the time t4, the decoding apparatus picks up the B3 picture of GOP#0 as a current picture in decoding process and decodes the B3 picture.

When the B3 picture is decoded, as shown in FIG. 6, the P1, P4, P5, and Bs2 pictures are stored in the DPB, and the B3 picture is decoded with reference to the P1 or P4, P5, and Bs2 pictures stored in the DPB as necessary so as to create the predicted image of L0 prediction or L1 prediction.

At the AVC default, when the B3 picture is decoded, with regard to the P1, P4, P5, and Bs2 pictures stored in the DPB, as shown in FIG. 6, the assignment is made as follows: the L0 index having a value of 0 is assigned to the Bs2 picture first closest to the B3 picture before the B3 picture in the POC order; and the L0 index having a value of 1 is assigned to the P1 picture second closest to the B3 picture before the B3 picture in the POC order.

At the AVC default, with regard to the P1, P4, P5, and Bs2 pictures stored in the DPB, as shown in FIG. 6, the assignment is made as follows: the L0 index having a value of 2 is assigned to the P4 picture first closest to the B3 picture after the B3 picture in the POC order; and the L0 index having a value of 3 is assigned to the P5 picture second closest to the B3 picture after the B3 picture in the POC order.

At the AVC default, with regard to the P1, P4, P5, and Bs2 pictures stored in the DPB, as shown in FIG. 6, the assignment is made as follows: the L1 index having a value of 0 is assigned to the P4 picture first closest to the B3 picture after the B3 picture in the POC order; and the L0 index having a value of 1 is assigned to the P5 picture second closest to the B3 picture after the B3 picture in the POC order.

At the AVC default, with regard to the P1, P4, P5, and Bs2 pictures stored in the DPB, as shown in FIG. 6, the assignment is made as follows: the L1 index having a value of 2 is assigned to the Bs2 picture first closest to the B3 picture before the B3 picture in the POC order; and the L1 index having a value of 3 is assigned to the P1 picture second closest to the B3 picture before the B3 picture in the POC order.

Thus, for example, with regard to the B3 picture, when L0=0 as the L0 index is included in encoded data, the decoding apparatus performs L0 prediction with the Bs2 picture assigned with the L0 index 0 from among the P1, P4, P5, and Bs2 pictures stored in the DPB as a reference picture so as to create the predicted image of the B3 picture.

For example, with regard to the B3 picture, when L1=0 as the L1 index is included in encoded data, the decoding apparatus performs L1 prediction with the P4 picture assigned with the L1 index 0 from among the P1, P4, P5, and Bs2 pictures stored in the DPB as a reference picture so as to create the predicted image of the B3 picture.

For example, with regard to the B3 picture, when L0=1 as the L0 index is included in encoded data and L1=1 as L1 index is included in encoded data, the decoding apparatus performs L0 prediction with the P1 picture assigned with the L0 index 1 from among the P1, P4, P5, and Bs2 pictures stored in the DPB as a reference picture, and performs L1 prediction with the P5 picture assigned with the L1 index 1 as a reference picture so as to create the predicted image of the B3 picture.

The B3 picture is not a reference picture, thus the B3 picture is not stored in the DPB after decoding.

Thus, as shown in FIG. 6, similarly to after the Bs2 picture one picture before the B3 picture in the decoding order has been decoded, the P1, P4, P5, and Bs2 pictures are still stored in the DPB.

The B3 picture is supplied to the display after decoding. As shown in FIG. 6, in the display, the B3 picture is stored in the display buffer and displayed with a necessary timing.

At the time t6 next to the time t5, the decoding apparatus picks up the P8 picture of GOP#0 as a current picture in decoding process and decodes the P8 picture.

When the P8 picture is decoded, as shown in FIG. 6, the P1, P4, P5, and Bs2 pictures are stored in the DPB, and the P8 picture is decoded with reference to the P1 or P4, P5, and Bs2 pictures stored in the DPB as necessary so as to create the predicted image of L0 prediction.

At the AVC default, when the P8 picture is decoded, with regard to the P1, P4, P5, and Bs2 pictures stored in the DPB, as shown in FIG. 6, the assignment is made as follows: the L0 index having a value of 0 is assigned to the Bs2 picture first closest to the P8 picture in the decoding order; and the L0 index having a value of 1 is assigned to the P5 picture second closest to the P8 picture in the decoding order.

At the AVC default, with regard to the P1, P4, P5, and Bs2 pictures stored in the DPB, as shown in FIG. 6, the assignment is made as follows: the L0 index having a value of 2 is assigned to the P4 picture third closest to the P8 picture in the decoding order; and the L0 index having a value of 3 is assigned to the P1 picture fourth closest to the P8 picture in the decoding order.

Thus, for example, with regard to the P8 picture, when L0=0 as the L0 index is included in encoded data, the decoding apparatus performs L0 prediction with the Bs2 picture assigned with the L0 index 0 from among the P1, P4, P5, and Bs2 pictures stored in the DPB as a reference picture so as to create the predicted image of the P8 picture.

For example, with regard to the P8 picture, when L0=1 as the L0 index is included in encoded data, the decoding apparatus performs L0 prediction with the P5 picture assigned with the L0 index 1 from among the P1, P4, P5, and Bs2 pictures stored in the DPB as a reference picture so as to create the predicted image of the P8 picture.

The P8 picture is a reference picture and the P8 picture after decoding is stored in the DPB.

When the P8 picture is stored in the DPB, the four pictures of the P1, P4, P5, and Bs2 pictures are stored in the DPB as much as the storage capacity allows. For this reason, in the decoding apparatus, the oldest P1 picture from among the P1, P4, P5, and Bs2 pictures stored in the DPB is released through the sliding window memory control process and discarded from the DPB.

Thereafter, the P8 picture after decoding is stored in the DPB, and as a result, as shown in FIG. 6, the P4, P5, Bs2, and P8 pictures are stored in the DPB.

When the P8 picture is decoded, the P4 picture stored in the DPB is read and supplied to the display. As shown in FIG. 6, in the display, the P4 picture is stored in the display buffer and displayed with a necessary timing.

At the time t7 next to the time t6, the decoding apparatus picks up the P9 picture of GOP#0 as a current picture in decoding process and decodes the P9 picture.

When the P9 picture is decoded, as shown in FIG. 6, the P4, P5, Bs2, and P8 pictures are stored in the DPB, and the P9 picture is decoded with reference to the P4 or P5, Bs2, and P8 pictures stored in the DPB as necessary so as to create the predicted image of L0 prediction.

At the AVC default, when the P9 picture is decoded, with regard to the P4, P5, Bs2, and P8 pictures stored in the DPB, as shown in FIG. 6, the assignment is made as follows: the L0 index having a value of 0 is assigned to the P8 picture first closest to the P9 picture in the decoding order; and the L0 index having a value of 1 is assigned to the Bs2 picture second closest to the P9 picture in the decoding order.

At the AVC default, with regard to the P4, P5, Bs2, and P8 pictures stored in the DPB, as shown in FIG. 6, the assignment is made as follows: the L0 index having a value of 2 is assigned to the P5 picture third closest to the P9 picture in the decoding order; and the L0 index having a value of 3 is assigned to the P4 picture fourth closest to the P9 picture in the decoding order.

The P9 picture is a reference picture and the P9 picture after decoding is stored in the DPB.

When the P9 picture is stored in the DPB, the four pictures of the P4, P5, Bs2, and P8 pictures are stored in the DPB as much as the storage capacity allows. For this reason, in the decoding apparatus, the oldest P4 picture from among the P4, P5, Bs2, and P8 pictures stored in the DPB is released through the sliding window memory control process and discarded from the DPB.

Thereafter, the P9 picture after decoding is stored in the DPB, and as a result, as shown in FIG. 6, the P5, Bs2, P8, and P9 pictures are stored in the DPB.

When the P9 picture is decoded, the P5 picture stored in the DPB is read and supplied to the display. As shown in FIG. 6, in the display, the P5 picture is stored in the display buffer and displayed with a necessary timing.

At the time t8 next to the time t7, the decoding apparatus picks up the Bs6 picture of GOP#0 as a current picture in decoding process and decodes the Bs6 picture.

When the Bs6 picture is decoded, as shown in FIG. 6, the P5, Bs2, P8, and P9 pictures are stored in the DPB, and the Bs6 picture is decoded with reference to the P5 or Bs2, P8, and P9 pictures stored in the DPB as necessary so as to create the predicted image of L0 prediction or L1 prediction.

The Bs6 picture is a reference picture and the Bs6 picture after decoding is stored in the DPB.

When the Bs6 picture is stored in the DPB, the four pictures of the P5, Bs2, P8, and P9 pictures are stored in the DPB as much as the storage capacity allows. For this reason, in the decoding apparatus, the oldest P5 picture from among the P5, Bs2, P8, and P9 pictures stored in the DPB is released through the sliding window memory control process and discarded from the DPB.

Thereafter, the Bs6 picture after decoding is stored in the DPB, and as a result, as shown in FIG. 6, the Bs2, P8, P9, and Bs6 pictures are stored in the DPB.

The Bs6 picture is stored in the DPB after decoding and also supplied to the display. As shown in FIG. 6, in the display, the Bs6 picture is stored in the display buffer and displayed with a necessary timing.

At the time t9 next to the time t8, the decoding apparatus picks up the B7 picture of GOP#0 as a current picture in decoding process and decodes the B7 picture.

When the B7 picture is decoded, as shown in FIG. 6, the Bs2, P8, P9, and Bs6 pictures are stored in the DPB, and the B7 picture is decoded with reference to the Bs2 or P8, P9, and Bs6 pictures stored in the DPB as necessary so as to create the predicted image of L0 prediction or L1 prediction.

The B7 picture is not a reference picture, thus the B7 picture is not stored in the DPB after decoding.

Thus, as shown in FIG. 6, similarly to after the Bs6 picture one picture before the B7 picture in the decoding order has been decoded, the Bs2, P8, P9, and Bs6 pictures are still stored in the DPB.

The B7 picture is supplied to the display after decoding. As shown in FIG. 6, in the display, the B7 picture is stored in the display buffer and displayed with a necessary timing.

In the decoding apparatus of FIG. 2, similarly, the DPB is managed through the sliding window memory control process, and encoded data is decoded while assigning the value (preset value) at the AVC default to each of the reference pictures stored in the DPB as the L0 index for L0 prediction or the L1 index for L1 prediction.

Figure 7:
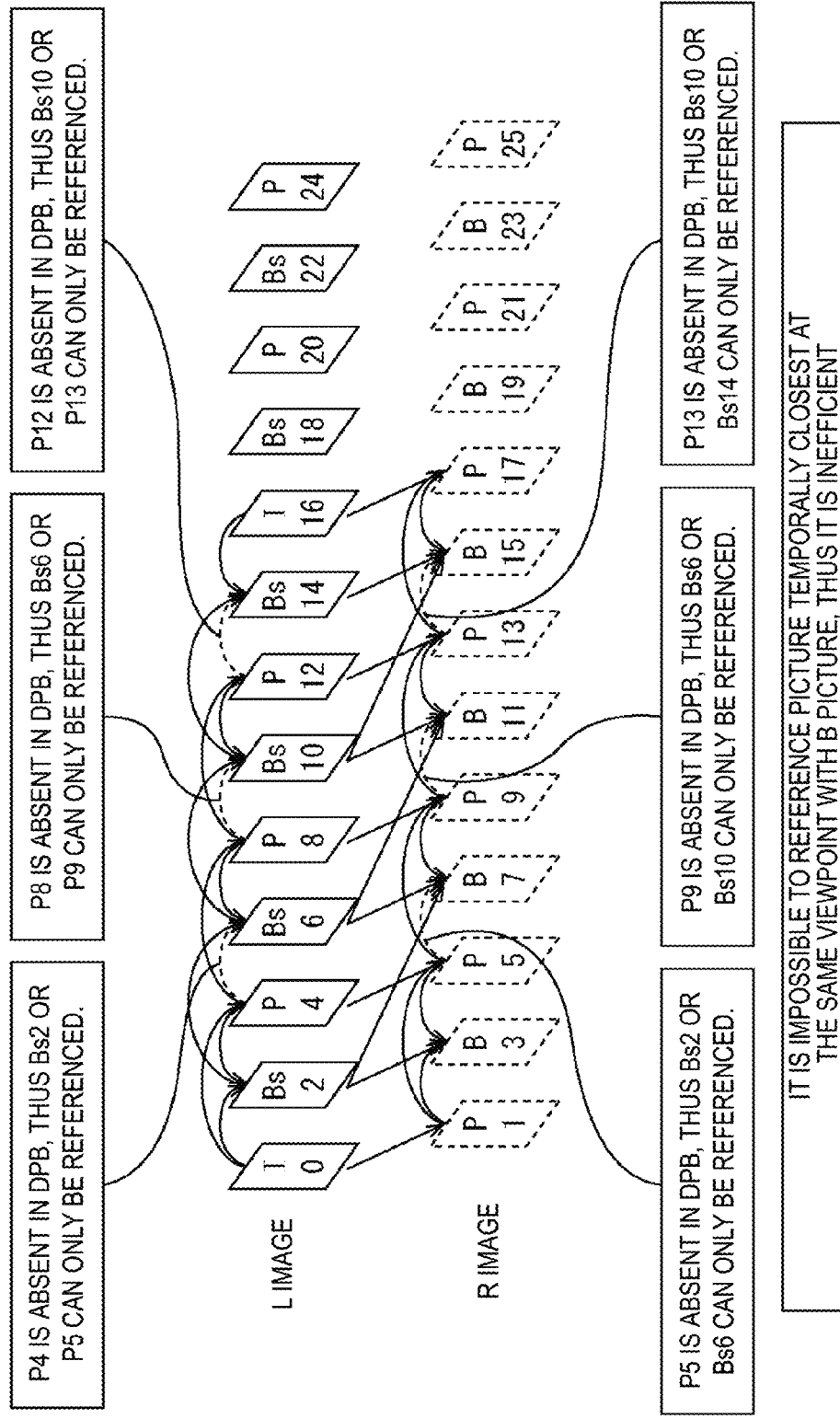
FIG. 7 is a diagram illustrating a case where encoding efficiency is deteriorated when a DPB is managed by only a sliding window memory control process.

FIG. 7 is a diagram illustrating deterioration of encoding efficiency when the DPB is managed only through the sliding window memory control process in the AVC decoding apparatus of FIG. 2 (the same is applied to the AVC encoding apparatus of FIG. 1).

That is, FIG. 7 shows a reference relationship when the DPB is managed only through the sliding window memory control process.

In FIG. 7, in order to prevent complexity, an arrow indicating the reference of a Bs picture from a P picture and an arrow indicating the reference of a picture of the R image from a picture of the L image are not shown.

Focusing only on L0 prediction in which forward prediction is performed for creating a predicted image of a current picture in decoding process with reference to a picture before the current picture in decoding process (current picture in encoding process) in the display order, for example, with regard to the Bs6 picture of the L image, the P4 picture closest to the Bs6 picture in the display order from among the pictures of the L image, which is an image at the same viewpoint, can be referenced as indicated by a dotted-line narrow in FIG. 7, thus encoding efficiency may be improved.

However, as shown in FIG. 6, when the Bs6 picture is decoded at the time t8, the P5, Bs2, P8, and P9 pictures are stored in the DPB having a storage capacity for four pictures, and the P4 picture is already discarded from the DPB.

Thus, in the case of forward prediction as L0 prediction when the Bs6 picture is decoded, only the Bs2 or P5 picture before the Bs6 picture in the display order from among the P5, Bs2, P8, and P9 pictures stored in the DPB can be referenced.

The Bs2 picture is the picture of the L image at the same viewpoint as the Bs6 picture as the current picture in decoding process, but is temporally farther away from the Bs6 picture than the P4 picture. For this reason, with regard to the Bs6 picture as the current picture in decoding process, when the Bs2 picture is referenced, a prediction error increases compared to a case where the P4 picture is referenced.

The P5 picture is the picture of the R image at a different viewpoint from the Bs6 picture which is the picture of the L image, and is not the picture which constitutes an LR pair along with the Bs6 picture. For this reason, with regard to the Bs6 picture as the current picture in decoding process, when the P5 picture is referenced, in many cases, a prediction error increases compared with a case where the P4 picture is referenced.

As described above, in the case of forward prediction of the Bs6 picture, when the P4 picture which is the picture of the L image at the same viewpoint as the Bs6 picture and closest to the Bs6 picture in the display order is unable to be referenced, and only the Bs2 or P5 picture can be referenced, a prediction error increases, thus encoding efficiency may be deteriorated.

For example, with regard to the B7 picture of the R image, the P5 picture which is the picture of the R image at the same viewpoint and closest to the B7 picture in the display order from among the pictures of the R image can be referenced as indicated by a dotted-line arrow of FIG. 7, thus encoding efficiency may be improved.

However, as shown in FIG. 6, when the B7 picture is decoded at the time t9, the Bs2, P8, P9, and Bs6 pictures are stored in the DPB having a storage capacity for four pictures, and the P5 picture is already discarded from the DPB.

Thus, in the case of forward prediction as L0 prediction when the B7 picture is decoded, only the Bs2 or Bs6 picture before the B7 picture in the display order from among the Bs2, P8, P9, and Bs6 pictures stored in the DPB can be referenced.

The Bs2 picture is the picture of the L image at a different viewpoint from the B7 picture which is the picture of the R image, and is not the picture which constitutes an LR pair along with the B7 picture. For this reason, with regard to the B7 picture as the current picture in decoding process, when the Bs2 picture is referenced, in many cases, a prediction error increases compared to a case where the P5 picture is referenced.

The Bs6 picture is the picture which constitutes an LR pair along with the B7 picture, but is the picture of the L image at a different viewpoint from the B7 picture which is the picture of the R image. For this reason, with regard to the B7 picture as the current picture in decoding process, when the Bs6 picture is referenced, in many cases, a prediction error increases compared to a case where the P5 picture is referenced, though not to the extent of a prediction error when the Bs2 picture which is the picture of the L image at a different viewpoint and does not constitute an LR pair.

As described above, in the case of forward prediction of the B7 picture, when the P5 picture which is the picture of the R image at the same viewpoint as the B7 picture and closest to the B7 picture in the display order is unable to be referenced, and only the Bs2 or Bs6 picture can be referenced, a prediction error increases, thus encoding efficiency may be deteriorated.

Similarly, with regard to the Bs10 picture of the L image, the P8 picture which is closest to the Bs10 picture in the display order from among the pictures of the L image at the same viewpoint can be referenced. With regard to the B11 picture of the R image, the P9 picture which is closest to the B11 picture in the display order from among the pictures of the R image at the same viewpoint can be referenced. With regard to the Bs14 picture of the L image, the P12 picture which is closest to the Bs14 picture in the display order from among the pictures of the L image at the same viewpoint can be referenced. With regard to the B15 picture of the R image, the P13 picture which is closest to the B15 picture in the display order from among the pictures of the R image at the same viewpoint can be referenced. In this way, encoding efficiency can be improved.

However, as shown in FIG. 6, when the Bs10 picture is decoded (encoded), the P8 picture is discarded from the DPB, and only the P9, Bs6, P12, and P13 pictures are stored in the DPB. When the B11 picture is decoded, the P9 picture is discarded from the DPB, and only the Bs6, P12, P13, and Bs10 pictures are stored in the DPB. When the Bs14 picture is decoded, the P12 picture is discarded from the DPB, and only the P13, Bs10, I16 (I0), and P17 (P1) pictures are stored in the DPB. When the B15 picture is decoded, the P13 picture is discarded from the DPB, and only the Bs10, I16, P17, and Bs14 pictures are stored in the DPB.

For this reason, when the Bs10 picture of the L image is decoded, only the Bs6 picture which is the picture of the L image at the same viewpoint but away from the P8 picture in the display order, or the P9 picture which is the picture of the R image at a different viewpoint and does not constitute an LR pair can be reference. When the B11 picture is decoded, only the Bs6 picture which is the picture of the R image at a different viewpoint and does not constitute an LR pair, or the Bs10 picture which is the picture of the R image at a different viewpoint and constitutes an LR pair can be reference. When the Bs14 picture is decoded, only the Bs10 picture which is the picture of the L image at the same viewpoint but away from the P12 picture in the display order, or the P13 picture which is the picture of the R image at a different viewpoint and does not constitute an LR pair can be referenced. When the B15 picture is decoded, only the Bs10 picture which is the picture of the R image at a different viewpoint and does not constitute an LR pair, or the Bs14 picture which is the picture of the R image at a different viewpoint and constitutes an LR pair can be referenced.

In this case, there are many cases where the prediction error increases, encoding efficiency may be deteriorated.

[Configuration Example of Embodiment of Encoding Apparatus to which the Invention is Applied]

Figure 8:
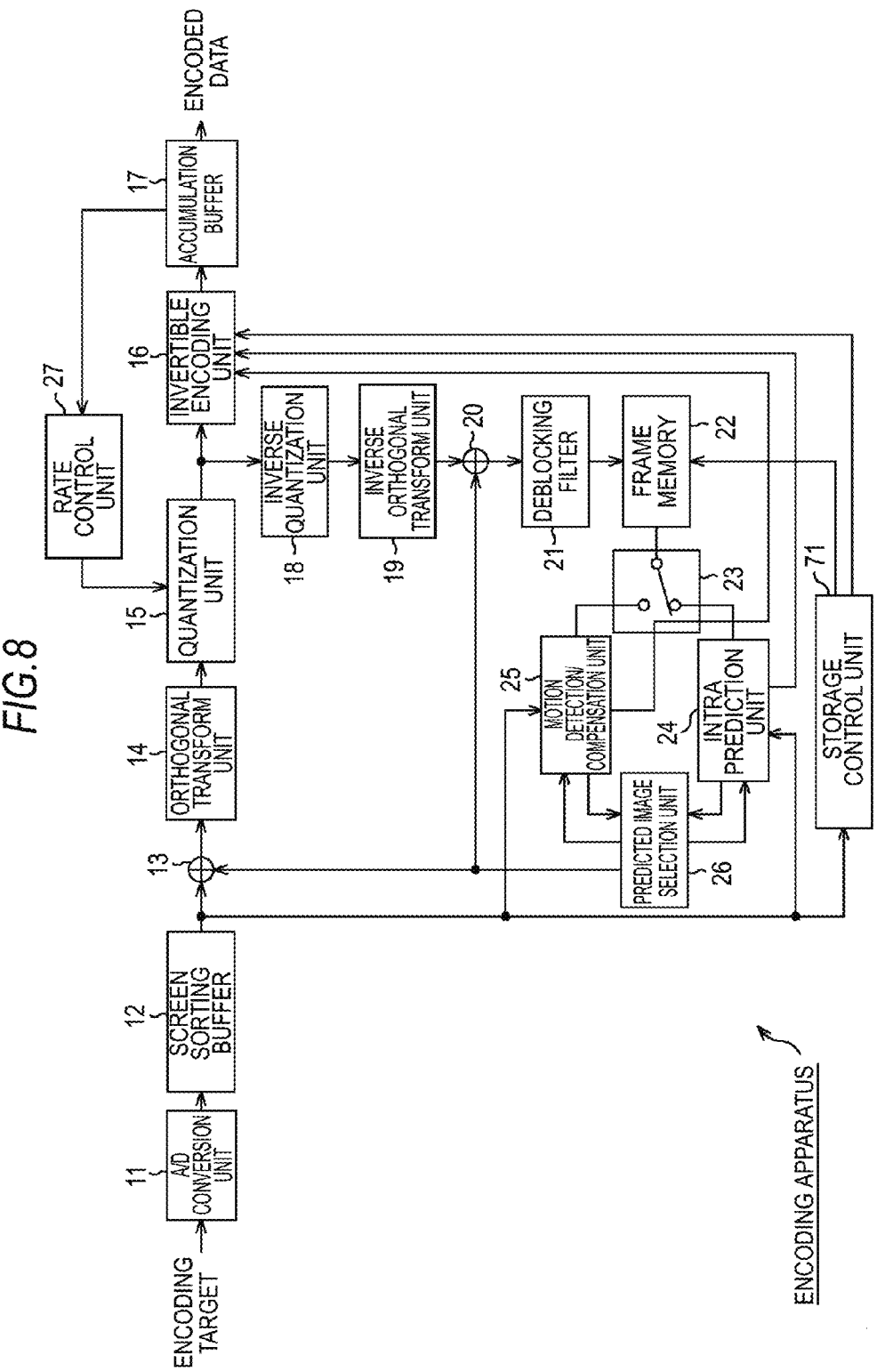
FIG. 8 is a block diagram showing a configuration example of an embodiment of an encoding apparatus to which the invention is applied.

FIG. 8 is a block diagram showing a configuration example of an embodiment of an encoding apparatus to which the image processing apparatus of the invention is applied.

In FIG. 8, the portions corresponding to the encoding apparatus of FIG. 1 are represented by the same reference numerals, and description thereof will be hereinafter omitted appropriately.

The encoding apparatus of FIG. 8 is configured the same as the encoding apparatus of FIG. 1, except that a storage control unit 71 is newly provided.

The storage control unit 71 controls storage of a reference picture by the frame memory 22 which stores a decoded image obtained by encoding pictures constituting a frame sequential and performing local decoding as a reference picture which is referenced in creating a predicted image for use in temporally later predictive encoding.

That is, the storage control unit 71 monitors a current picture in encoding process which is supplied from the screen sorting buffer 12 to the arithmetic unit 13, and performs storage control of the frame memory 22 such that a picture which is encoded temporally earlier than the current picture in encoding process and is a picture which is a picture of an image at the same viewpoint as the current picture in encoding process from among the L image and the R image and closest to the current picture in encoding process in the display order from among the pictures capable of becoming reference pictures is stored in the frame memory 22.

The storage control by the storage control unit 71 is performed by issuing an MMCO command to control storage of a picture in the DPB on the basis of the POC of the current picture in encoding process such that a picture which is decoded temporally earlier than the current picture in decoding process and is a picture of an image at the same viewpoint as the current picture in decoding process from among the L image and the R image and closest to the current picture in decoding process in the display order from among the pictures capable of becoming reference pictures is stored in the DPB of the AVC decoding apparatus of FIG. 2.

The MMCO command which is issued as storage control by the storage control unit 71 is supplied to the frame memory 22 and the invertible encoding unit 16.

The storage control unit 71 supplies a necessary argument to the frame memory 22 and the invertible encoding unit 16, in addition to the MMCO command.

When the MMCO command is supplied from the storage control unit 71, the frame memory 22 stores the decoded image from the deblocking filter 21 as (a portion of) a reference picture through the adaptive memory control process according to the MMCO command (and the necessary argument) from the storage control unit 71, instead of the sliding window memory control process.

When the MMCO command is supplied from the storage control unit 71, the invertible encoding unit 16 includes the MMCO command (and the necessary argument) in encoded data.

Specifically, the MMCO command is included in the slice header of encoded data as Decoded Reference Picture Marking Syntax.

[Processing of Encoding Apparatus]

Figure 9:
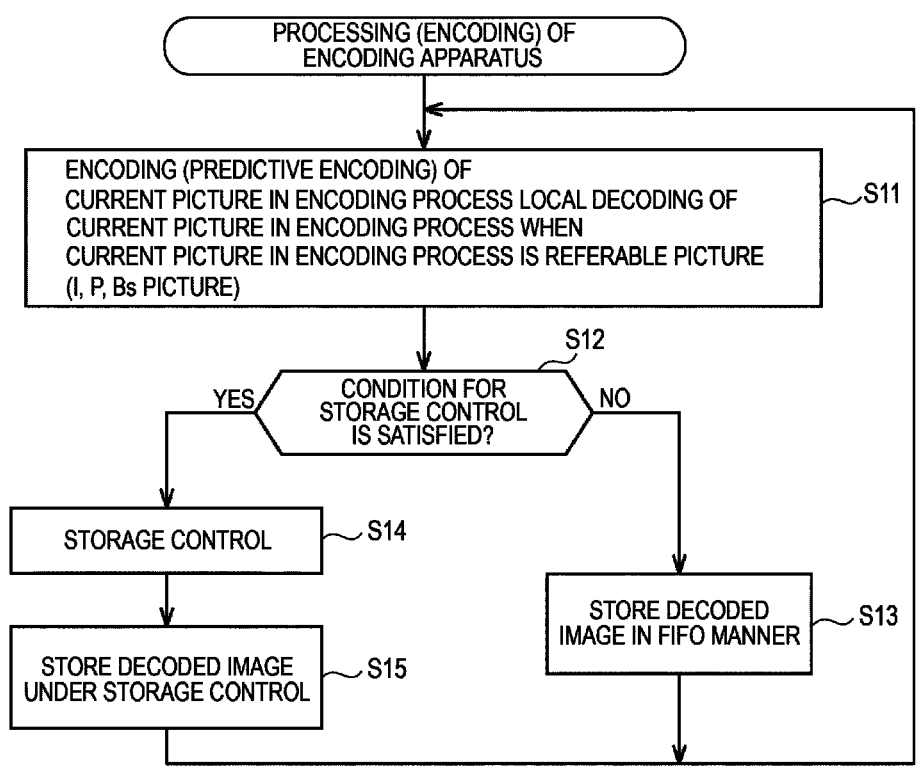
FIG. 9 is a flowchart illustrating processing of the encoding apparatus.

FIG. 9 is a flowchart illustrating processing (encoding processing) of the encoding apparatus of FIG. 8.

In the encoding apparatus of FIG. 8, if a picture as a current picture in encoding process is supplied from the screen sorting buffer 12 to the arithmetic unit 13, the intra prediction unit 24, the motion detection/compensation unit 25, and the storage control unit 71, in Step S11, the current picture in encoding process is encoded.

That is, the arithmetic unit 13 calculates the pixel value of a predicted image supplied from the predicted image selection unit 26 and created by the intra prediction unit 24 or the motion detection/compensation unit 25 from the pixel value of (each block constituting) the current picture in encoding process, which is a picture from the screen sorting buffer 12, as necessary, and supplies the pixel value to the orthogonal transform unit 14.

The orthogonal transform unit 14 performs orthogonal transform for (the pixel value or the subtracted value obtained by subtracting the predicted image of) the current picture in encoding process from the arithmetic unit 13, and supplies the resultant transform coefficient to the quantization unit 15.

The quantization unit 15 quantizes the transform coefficient supplied from the orthogonal transform unit 14 and supplies the resultant quantized value to the invertible encoding unit 16.

The invertible encoding unit 16 performs invertible encoding for the quantized value from the quantization unit 15. The invertible encoding unit 16 encodes the prediction mode supplied from the intra prediction unit 24 or the motion vector supplied from the motion detection/compensation unit 25 and the prediction mode or the MMCO command (and the necessary argument) supplied from the storage control unit 71, includes resultant data in the header or the like of encoded data, and outputs encoded data through the accumulation buffer 17.

In Step S11, when the current picture in encoding process is a referable picture which is capable of becoming a reference picture, that is, when the current picture in encoding process is one of I, P, and Bs pictures, the quantized value obtained by encoding the current picture in encoding process undergoes local decoding in the inverse quantization unit 18, the inverse orthogonal transform unit 19, and the arithmetic unit 20.

That is, the quantized value obtained by the quantization unit 15 is supplied to the invertible encoding unit 16 and also to the inverse quantization unit 18.

The inverse quantization unit 18 inversely quantizes the quantized value from the quantization unit 15 to the transform coefficient and supplies the transform coefficient to the inverse orthogonal transform unit 19.

The inverse orthogonal transform unit 19 performs inverse orthogonal transform for the transform coefficient from the inverse quantization unit 18, and supplies resultant data to the arithmetic unit 20.

The arithmetic unit 20 adds the pixel value of the predicted image supplied from the predicted image selection unit 26 to data supplied from the inverse orthogonal transform unit 19 as necessary to obtain a decoded image in which the portions (blocks) of the current picture in encoding process, which are to be processed in the arithmetic unit 13, the orthogonal transform unit 14, and the quantization unit 15 are decoded, and supplies the decoded image to the deblocking filter 21.

The deblocking filter 21 filters the decoded image from the arithmetic unit 20 to remove block distortion generated in the decoded image and supplies the resultant decoded image to the frame memory 22.

Thereafter, the process progresses from Step S11 to Step S12, and the storage control unit 71 determines whether the condition under which storage control has to be performed to control the storage of a reference picture in the frame memory 22 is satisfied or not on the basis of the POC of the current picture in encoding process.

The condition under which the storage control has to be performed is the condition using the POC of the current picture in encoding process, and a specific example thereof will be described below.

In Step S12, when it is determined that the condition under which the storage control has to be performed is not satisfied, the storage control unit 71 does not issue an MMCO command, and the process progresses to Step S13.

In Step S13, the frame memory 22 stores the decoded image from the deblocking filter 21 as (a portion of) a reference picture in the FIFO manner through the sliding window memory control process.

Meanwhile, in Step S12, when it is determined that the condition under which the storage control has to be performed is satisfied, the process progresses to Step S14, and the storage control unit 71 issues the MMCO command on the basis of the POC of the current picture in encoding process and supplies the MMCO command to the frame memory 22 to perform the storage control of the frame memory 22 through the adaptive memory control process. Next, the process progresses to Step S15.

The storage control unit 71 supplies the MMCO command to the frame memory 22 and also to the invertible encoding unit 16. In the invertible encoding unit 16, the MMCO command from the storage control unit 71 is included in encoded data.

In Step S15, the frame memory 22 stores the decoded image from the deblocking filter 21 as a reference picture or operates the previously stored reference picture in accordance with the storage control from the storage control unit 71.

After Steps S13 and S15, it waits until a picture as the next current picture in encoding process is supplied from the screen sorting buffer 12 to the arithmetic unit 13, the intra prediction unit 24, the motion detection/compensation unit 25, and the storage control unit 71, and the process returns to Step S11.

[First Storage Control]

FIG. 10 is a diagram illustrating first storage control which is an example of the storage control by the storage control unit 71 (FIG. 8).

In the first storage control, as described with reference to FIG. 4, with regard to the frame sequential in which one GOP is constituted by the 16 pictures of the I0, P1, Bs2, B3, P4, P5, Bs6, B7, P8, P9, Bs10, B11, P12, P13, Bs14, and B15 pictures, the storage control unit 71 issues an MMCO command which, when the Bs picture (Bs2, BS6, Bs10, or Bs14 picture) of the L image, which is one image from among the L image and the R image, for example, is decoded (local decoding), defines the Bs picture as a long-term reference picture, and when the I or P picture (I0, P4, P8, or P12 picture) of the L image as the one image is decoded, releases the Bs picture which becomes a long-term reference picture immediately before that and defines the Bs picture as a non-reference picture.

FIG. 10 shows a list of MMCO commands which are issued as the first storage control by the storage control unit 71.

When an MMCO command and a necessary argument issued by the storage control unit 71 are included in encoded data, in the decoding apparatus of FIG. 2 which decodes encoded data, the same operation as the operation in the encoding apparatus of FIG. 8 to store (manage) a reference picture in the frame memory 22 according to the MMCO command and the necessary argument issued by the storage control unit 71 is carried out as an operation to store (manage) a reference picture in the frame memory 49 corresponding to the DPB.

Hereinafter, description will be provided appropriately replacing the operation in the encoding apparatus of FIG. 8 to store a reference picture in the frame memory 22 according to the first storage control by the storage control unit 71 with the operation to store a reference picture in (the frame memory 49 corresponding to) the DPB in the decoding apparatus of FIG. 2.

In the list of FIG. 10, the value in the column "POC" represents a value obtained by dividing the POC of the current picture in encoding process (current picture in decoding process) by 16. The column "MMCO command" represents an MMCO command and a necessary argument issued when a remainder POC corresponds to the value in the column "POC". The column "details" represents the content of processing (operation) according to an MMCO command and necessary argument in the column "MMCO command".

Referring to FIG. 10, when the remainder POC is 0, 4, 2, 8, 6, 12, 10, or 14, an MMCO command as the first storage control is issued.

With regard to the first storage control, the condition that the remainder POC is 0, 4, 2, 8, 6, 12, 10, or 14 becomes the condition for determination in Step S12 of FIG. 9 under which the storage control is performed.

As described with reference to FIG. 4, with regard to the frame sequential in which one GOP is constituted by the 16 pictures of the I0, P1, Bs2, B3, P4, P5, Bs6, B7, P8, P9, Bs10, B11, P12, P13, Bs14, and B15 pictures, the condition that the remainder POC is 0, 4, 2, 8, 6, 12, 10, or 14 means that the current picture in encoding process is the Bs picture (Bs2, BS6, Bs10, or Bs14 picture) of the L image or the I or P picture (I0, P4, P8, or P12 picture) of the L image.

The storage control unit 71 issues, as an MMCO command (and a necessary argument), "400" when the remainder POC is 0, "400" when the remainder POC is 4, "41600" when the remainder POC is 2, "400" when the remainder POC is 8, "41600" when the remainder POC is 6, "400" when the remainder POC is 12, "41600" when the remainder POC is 10, and "41600" when the remainder POC is 14.

As shown in the lower part of FIG. 10, the MMCO command can have seven values of #COMMAND==0, 1, 2, 3, 4, 5, and 6.

When the MMCO command is 1, 2, 3, 4, or 6, the MMCO command is accompanied by an argument subsequent to the MMCO command.

When the MMCO command is 0 (#COMMAND==0), the AVC decoding apparatus interprets the MMCO command as NAR_MMCO_END, and ends the operation (processing) for the DPB through the adaptive memory control process in accordance with the interpretation.

When the MMCO command is 1 (#COMMAND==1), the decoding apparatus interprets the MMCO command as NAR_MMCO_MARK_SHORT_TERM_PIC_UNUSED, releases a short-term reference picture stored in the DPB, which is designated by using the argument subsequent to the MMCO command in encoded data, in accordance with the interpretation, and defines the short-term reference picture as a non-reference picture.

When the MMCO command is 2 (#COMMAND==2), the decoding apparatus interprets the MMCO command as NAR_MMCO_MARK_RONG_TERM_PIC_UNUSED, releases a long-term reference picture stored in the DPB, which is designated by using the argument subsequent to the MMCO command in encoded data, in accordance with the interpretation, and defines the long-term reference picture as a non-reference picture.

When the MMCO command is 3 (#COMMAND==3), the decoding apparatus interprets the MMCO command as NAR_MMCO_ASSIGN_RONG_TERM_FRAME_INDE, and changes a short-term reference picture stored in the DPB, which is designated by using the argument subsequent to the MMCO command in encoded data, to a long-term reference picture in accordance with the interpretation.

When the MMCO command is 4 (#COMMAND==4), the decoding apparatus interprets the MMCO command as NAR_MMCO_SPECIFY_MAX_RONG_TERM_FRAME_INDEX, and changes an upper limit value MaxLongTermFrameIdx (Maximum long-term frame index) of an index LongFrameIdx for a long-term reference picture, which is assigned to a long-term reference picture stored in the DPB, to a value designated by using the argument subsequent to the MMCO command in encoded data in accordance with the interpretation.

After the upper limit value MaxLongTermFrameIdx has been changed, a long-term reference picture to which an index LongFrameIdx exceeding MaxLongTermFrameIdx after change is assigned is released.

When the MMCO command is 5 (#COMMAND==5), the decoding apparatus interprets the MMCO command as NAR_MMCO_RESET_ARR_REF_PIC, and releases all reference pictures stored in the DPB in accordance with the interpretation.

When the MMCO command is 6 (#COMMAND==6), the decoding apparatus interprets the MMCO command as NAR_MMCO_ASSIGN_RONG_TERM_FRAME_INDEX_CURRENT, defines the current picture in decoding process as a long-term reference picture and assigns an index LongFrameIdx according to the argument subsequent to the MMCO command in encoded data to the long-term reference picture in accordance with the interpretation, and stores the long-term reference picture in the DPB.

The MMCO command and the necessary argument can be consecutively described, and the decoding apparatus carries out the operation for the DPB through the adaptive memory control process sequentially from the initial MMCO command from consecutive description of one or more MMCO commands and necessary arguments. When the MMCO command 0 appears (#COMMAND==0), the operation for the DPB through the adaptive memory control process ends.

Although as described with reference to FIG. 8, the MMCO command is described in the slice header of encoded data as Decoded Reference Picture Marking Syntax, when "memory_management_control_operation=1" is described in Decoded Reference Picture Marking Syntax, the decoding apparatus carries out the MMCO command.

In the list of FIG. 10, when the remainder POC is 0, "400" is issued as the MMCO command and the necessary argument. "4" at the first place from the head in "400" represents an MMCO command #COMMAND==4, and "0" at the second place is the argument of the MMCO command #COMMAND==4. "0" at the third place in "400" represents an MMCO command #COMMAND==0.

According to the MMCO command #COMMAND==4 at the first place and the subsequent argument "0" in "400", in the decoding apparatus, a variable Max_long_term_frame_idx_plus1 corresponding to the upper limit value MaxLongTermFrameIdx of the index LongFrameIdx for a long-term reference picture is set to 0 which is the argument.

In the decoding apparatus, since the upper limit value MaxLongTermFrameIdx is set to Max_long_term_frame_idx_plus1−1, if the variable Max_long_term_frame_idx_plus1 is set to 0, the upper limit value MaxLongTermFrameIdx is set to Max_long_term_frame_idx_plus1−1=−1 (="no long-term frame indices").

A sequential integer having a minimum value of 0 is used as the index LongFrameIdx for a long-term reference picture.

Thus, if the upper limit value MaxLongTermFrameIdx of the index LongFrameIdx for a long-term reference picture is set to −1, the indices LongFrameIdx for a long-term reference picture which are an integer value equal to or greater than 0 all become invalid, so to speak, and the long-term reference pictures (Long term pictures) stored in the DPB are all released (discarded (deleted) from the DPB in this embodiment).

Thereafter, in the decoding apparatus, the operation for the DPB through the adaptive memory control process ends in accordance with the MMCO command #COMMAND==0 at the third place in "400".

When the remainder POC is 4, 8, or 12, similarly to a case where the remainder POC is 0, "400" is issued as the MMCO command and the necessary argument. Thus, the variable Max_long_term_frame_idx_plus1 is set to 0, and as a result, the long-term reference pictures stored in the DPB are all released.

In the list of FIG. 10, when the remainder POC is 2, "41600" is issued as the MMCO command and the necessary argument.

"4" at the first place from the head in "41600" represents the MMCO command #COMMAND==4, and "1" at the second place is the argument of the MMCO command #COMMAND==4. "6" at the third place in "41600" represents an MMCO command #COMMAND==6, and "0" at the fourth place is the argument of the MMCO command #COMMAND==6. "0" at the fifth place in "41600" represents the MMCO command #COMMAND==0.

According to the MMCO command #COMMAND==4 at the first place in "41600" and the subsequent argument "1", in the decoding apparatus, the variable Max_long_term_frame_idx_plus1 corresponding to the upper limit value MaxLongTermFrameIdx of the index LongFrameIdx for a long-term reference picture is set to 1 which is the argument.

In the decoding apparatus, as described above, since the upper limit value MaxLongTermFrameIdx is set to Max_long_term_frame_idx_plus1−1, if the variable Max_long_term_frame_idx_plus1 is set to 1, the upper limit value MaxLongTermFrameIdx is set to Max_long_term_frame_idx_plus1−1=0.

As described above, a sequential integer having a minimum value of 0 is used as the index LongFrameIdx for a long-term reference picture.

Thus, when the upper limit value MaxLongTermFrameIdx of the index LongFrameIdx for a long-term reference picture is set to 0, only a single value of 0 can be used as the index LongFrameIdx for a long-term reference picture.

Hence, only one picture can be stored in the DPB as a long-term reference picture.

According to the MMCO command #COMMAND==6 at the third place in "41600" and the subsequent argument "0", in the decoding apparatus, the current picture in decoding process is stored in the DPB as a long-term reference picture, and 0 which is the argument is assigned to the long-term reference picture as the index LongFrameIdx for a long-term reference picture.

Thereafter, in the decoding apparatus, the operation for the DPB through the adaptive memory control process ends in accordance with the MMCO command #COMMAND==0 at the fifth place in "41600".

When the remainder POC is 6, 10, or 14, similarly to a case where the remainder POC is 2, "41600" is issued as the MMCO command and the necessary argument. Thus, the variable Max_long_term_frame_idx_plus1 is set to 1, the current picture in decoding process is stored in the DPB as a long-term reference picture, and 0 is as signed to the long-term reference picture as the index LongFrameIdx for a long-term reference picture.

According to the list of FIG. 10, as described above, when the remainder POC is 2, 6, 10, or 14, "41600" is issued as the MMCO command and the necessary argument.

The case where the remainder POC is 2, 6, 10, or 14 refers to a case where the current picture in decoding process is the Bs2, Bs6, Bs10, or Bs14 picture in one GOP, which is the Bs picture of the L image. Thus, the Bs2, Bs6, Bs10, or Bs14 picture is stored in the DPB as a long-term reference picture after having been decoded as the current picture in decoding process.

According to the list of FIG. 10, as described above, when the remainder POC is 0, 4, 8, or 12, "400" is issued as the MMCO command and the necessary argument.

The case where the remainder POC is 0, 4, 8, or 12 refers to a case where the current picture in decoding process is the I0, P4, P8, or P12 picture in one GOP, which is the I or P picture of the L image. Thus, after the I0, P4, P8, or P12 picture has been decoded as the current picture in decoding process, the long-term reference picture stored in the DPB is released (discarded).

When the I0 picture (a picture with the remainder POC=0) of a certain GOP becomes the current picture in decoding process, the Bs14 picture (a picture with the remainder POC=14) of a GOP one GOP before the relevant GOP is stored in the DPB as the long-term reference picture. Thus, after the I0 picture as the current picture in decoding process has been decoded, the Bs14 picture stored in the DPB as the current picture in decoding process (of the GOP one GOP before the GOP of the I0 picture as the current picture in decoding process) is released.

When the P4 picture (a picture with the remainder POC=4) of a certain GOP becomes the current picture in decoding process, the Bs2 picture (a picture with the remainder POC=2) of the relevant GOP is stored in the DPB as the long-term reference picture. Thus, after the P4 picture as the current picture in decoding process has been decoded, the Bs2 picture stored in the DPB as the long-term reference picture is released from the DPB.

When the P8 picture (a picture with the remainder POC=8) of a certain GOP becomes the current picture in decoding process, the Bs6 picture (a picture with the remainder POC=6) of the relevant GOP is stored in the DPB as the long-term reference picture. Thus, after the P8 picture as the current picture in decoding process has been decoded, the Bs6 picture stored in the DPB as the long-term reference picture is released from the DPB.

When the P12 picture (a picture with the remainder POC=12) of a certain GOP becomes the current picture in decoding process, the Bs10 picture (a picture with the remainder POC=10) of the relevant GOP is stored in the DPB as the long-term reference picture. Thus, after the P12 picture as the current picture in decoding process has been decoded, the Bs10 picture stored in the DPB as the long-term reference picture is released from the DPB.

As described above, according to the list of FIG. 10, when the Bs picture (Bs2, BS6, Bs10, or Bs14 picture) of the L image is decoded, the Bs picture is stored in the DPB as the long-term reference picture. When the P picture (I0, P4, P8, or P12 picture) of the L image is decoded, the Bs picture which becomes the long-term reference picture immediately before that is released from the DPB.

[Encoding/Decoding when MMCO Command is Issued]

FIG. 11 is a diagram illustrating the state of the DPB when the MMCO command and the necessary argument of FIG. 10 are issued to encode/decode the frame sequential through AVC.

FIG. 11 shows the display order of the pictures constituting the frame sequential, the encoding/decoding order, the PN, the storage state of the DPB, and the storage state of the display buffer.

The display order of the pictures constituting the frame sequential, the encoding/decoding order, the PN, and the storage state of the display buffer are the same as those in FIG. 6, thus description thereof will be omitted.

If it is assumed that the frame sequential is encoded in the encoding order of FIG. 11 in the encoding apparatus of FIG. 8, encoded data obtained as a result of encoding is decoded in the decoding order of FIG. 11 in the AVC decoding apparatus of FIG. 2.

It is also assumed that, in the encoding apparatus of FIG. 8, the MMCO command (and the necessary argument) of FIG. 10 is issued, and the MMCO command is included in encoded data.

Here, however, it is assumed that no RPLR command is included in encoded data.

In this case, in the AVC decoding apparatus of FIG. 2, in decoding encoded data, the DPB is managed through the adaptive memory control process at the time of decoding of a picture with an MMCO command issued. The DPB is managed through the sliding window memory control process at the time of decoding of a picture with no MMCO command issued.

In the decoding apparatus, the values (preset values) at the AVC default are assigned to the reference pictures stored in the DPB as the reference picture number (L0 index) for L0 prediction and the reference picture number (L1 index) for L1 prediction.

At the time t0, the decoding apparatus picks up the I0 picture of GOP#0 as a current picture in decoding process and decodes the I0 picture.

The I0 picture is a reference picture and, as shown in FIG. 11, the I0 picture after decoding is stored in the DPB.

Since the POC of the I0 picture is 0 and hence the remainder POC is 0, according to the first storage control of FIG. 10, the MMCO command (and the necessary argument) "400" is issued. As a result, the long-term reference picture stored in the DPB is discarded (released). Meanwhile, when the I0 picture of the first GOP#0 is decoded, the long-term reference picture is not yet stored in the DPB.

For this reason, when the I0 picture is decoded, only for the first GOP#0, exceptionally, the discarding of the long-term reference picture is not carried out (is unable to be carried out).

At the time t1 next to the time t0, the decoding apparatus picks up the P1 picture of GOP#0 as a current picture in decoding process and decodes the P1 picture.

When the P1 picture is decoded, as shown in FIG. 11, the I0 picture is stored in the DPB, and the P1 picture is decoded with reference to the I0 picture stored in the DPB as necessary so as to create the predicted image of L0 prediction.

As described above, when the current picture in decoding process is a P picture, at the AVC default, the L0 index which is a smaller reference picture number is assigned to a later reference picture in the decoding order, that is, closer to the current picture in decoding process in the display order.

Thus, when the P1 picture is decoded, as shown in FIG. 11, the L0 index having a value of 0 is assigned to the I0 picture stored in the DPB.

The P1 picture is a reference picture and, as shown in FIG. 11, the P1 picture after decoding is stored in the DPB as a reference picture.

At the time t2 next to the time t1, the decoding apparatus picks up the P4 picture of GOP#0 as a current picture in decoding process and decodes the P4 picture.

When the P4 picture is decoded, as shown in FIG. 11, the I0 and P1 pictures are stored in the DPB, and the P4 picture is decoded with reference to the I0 or P1 picture stored in the DPB as necessary so as to create the predicted image of L0 prediction.

At the AVC default, when the P4 picture is decoded, with regard to the I0 and P1 pictures stored in the DPB, as shown in FIG. 11, the assignment is made as follows: the L0 index having a value of 0 is assigned to the P1 picture first closest to the P4 picture in the decoding order; and the L0 index having a value of 1 is assigned to the I0 picture second closest to the P4 picture in the decoding order.

The P4 picture is a reference picture and, as shown in FIG. 11, the P4 picture after decoding is stored in the DPB.

Since the POC of the P4 picture is 4 and hence the remainder POC is 4, according to the first storage control of FIG. 10, the MMCO command "400" is issued. As a result, the long-term reference picture stored in the DPB is discarded.

Meanwhile, when the P4 picture of the first GOP#0 is decoded, the long-term reference picture is not yet stored in the DPB.

For this reason, when the P4 picture is decoded, only for the first GOP#0, exceptionally, the discarding of the long-term reference picture is not carried out.

At the time t3 next to the time t2, the decoding apparatus picks up the P5 picture of GOP#0 as a current picture in decoding process and decodes the P5 picture.

When the P5 picture is decoded, as shown in FIG. 11, the I0, P1, and P4 pictures are stored in the DPB, and the P5 picture is decoded with reference to the I0 or P1 and P4 pictures stored in the DPB as necessary so as to create the predicted image of L0 prediction.

At the AVC default, when the P5 picture is decoded, with regard to the I0, P1, and P4 pictures stored in the DPB, as shown in FIG. 11, the assignment is made as follows: the L0 index having a value of 0 is assigned to the P4 picture first closest to the P5 picture in the decoding order; the L0 index having a value of 1 is assigned to the P1 picture second closest to the P5 picture in the decoding order; and the L0 index having a value of 2 is assigned to the I0 picture second closest to the P5 picture in the decoding order.

The P5 picture is a reference picture and, as shown in FIG. 11, the P5 picture after decoding is stored in the DPB.

At the time t4 next to the time t3, the decoding apparatus picks up the Bs2 picture of GOP#0 as a current picture in decoding process and decodes the Bs2 picture.

When the Bs2 picture is decoded, as shown in FIG. 11, the I0, P1, P4, and P5 pictures are stored in the DPB, and the Bs2 picture is decoded with reference to the I0 or P1, P4, and P5 pictures stored in the DPB as necessary so as to create the predicted image of L0 prediction or L1 prediction.

As described above, when the current picture in decoding process is a B picture (including a Bs picture), at the AVC default, the L0 index and the L1 index are assigned in the POC order.

That is, in the case of L0 prediction, with regard to the reference pictures temporally earlier than the current picture in decoding process in the POC order, the L0 index having a smaller value is assigned to a reference picture closer to the current picture in decoding process. Thereafter, with regard to the reference pictures temporally later than the current picture in decoding process in the POC order, the L0 index having a smaller value is assigned to a reference picture closer to the current picture in decoding process.

In the case of L1 prediction, with regard to the reference pictures temporally earlier than the current picture in decoding process in the POC order, the L1 index having a smaller value is assigned to a reference picture closer to the current picture in decoding process. Thereafter, with regard to the reference pictures temporally later than the current picture in decoding process in the POC order, the L1 index having a smaller value is assigned to a reference picture closer to the current picture in decoding process.

Thus, at the AVC default, when the Bs2 picture is decoded, with regard to the I0, P1, P4, and P5 pictures stored in the DPB, as shown in FIG. 11, the assignment is made as follows: the L0 index having a value of 0 is assigned to the P1 picture first closest to the Bs2 picture before the Bs2 picture in the POC order; and the L0 index having a value of 1 is assigned to the I0 picture second closest to the Bs2 picture before the Bs2 picture in the POC order.

At the AVC default, with regard to the I0, P1, P4, and P5 pictures stored in the DPB, as shown in FIG. 11, the assignment is made as follows: the L0 index having a value of 2 is assigned to the P4 picture first closest to the Bs2 picture after the Bs2 picture in the POC order; and the L0 index having a value of 3 is assigned to the P5 picture second closest to the Bs2 picture after the Bs2 picture in the POC order.

At the AVC default, with regard to the I0, P1, P4, and P5 pictures stored in the DPB, as shown in FIG. 11, the assignment is made as follows: the L1 index having a value of 0 is assigned to the P4 picture first closest to the Bs2 picture after the Bs2 picture in the POC order; and the L0 index having a value of 1 is assigned to the P5 picture second closest to the Bs2 picture after the Bs2 picture in the POC order.

At the AVC default, with regard to the I0, P1, P4, and P5 pictures stored in the DPB, as shown in FIG. 11, the assignment is made as follows: the L1 index having a value of 2 is assigned to the P1 picture first closest to the Bs2 picture before the Bs2 picture in the POC order; and the L1 index having a value of 3 is assigned to the I0 picture second closest to the Bs2 picture before the Bs2 picture in the POC order.

The Bs2 picture is a reference picture and the Bs2 picture after decoding is stored in the DPB.

When the Bs2 picture is stored in the DPB, the four pictures of the I0, P1, P4, and P5 pictures are stored in the DPB as much as the storage capacity allows. For this reason, in the decoding apparatus, the oldest I0 picture from among the I0, P1, P4, and P5 pictures stored in the DPB is released (discarded from the DPB) through the sliding window memory control process.

Thereafter, the Bs2 picture after decoding is stored in the DPB, and as a result, as shown in FIG. 11, the P1, P4, P5, and Bs2 pictures are stored in the DPB.

Since the POC of the Bs2 picture is 2 and hence the remainder POC is 2, according to the first storage control of FIG. 10, the MMCO command "41600" is issued. As a result, the Bs2 picture as the current picture in decoding process is set as a long-term reference picture as indicated by a bold-line rectangle of FIG. 11 and stored in the DPB through the adaptive memory control process.

At the time t5 next to the time t4, the decoding apparatus picks up the B3 picture of GOP#0 as a current picture in decoding process and decodes the B3 picture.

When the B3 picture is decoded, as shown in FIG. 11, the P1, P4, P5, and Bs2 pictures are stored in the DPB, and the B3 picture is decoded with reference to the P1 or P4, P5, and Bs2 pictures stored in the DPB as necessary so as to create the predicted image of L0 prediction or L1 prediction.

At the AVC default, when the B3 picture is decoded, from among the P1, P4, P5, and Bs2 pictures stored in the DPB, with regard to the pictures which are not a long-term reference picture, that is, the P1, P4, and P5 pictures as a short-term reference picture, as shown in FIG. 11, the L0 index having a value of 0 is assigned to the P1 picture first closest to the B3 picture before the B3 picture in the POC order.

At the AVC default, with regard to the P1, P4, and P5 pictures as a short-term reference picture stored in the DPB, as shown in FIG. 11, the assignment is made as follows: the L0 index having a value of 1 is assigned to the P4 picture first closest to the B3 picture after the B3 picture in the POC order; and the L0 index having a value of 2 is assigned to the P5 picture second closest to the B3 picture after the B3 picture in the POC order.

At the AVC default, the assignment of the reference picture number to the long-term reference picture is performed after the reference picture number has been assigned to the short-term reference picture. Thus, after the L0 index has been assigned to the P1, P4, and P5 pictures as a short-term reference picture stored in the DPB, the L0 index having a value of 3 is assigned to the Bs2 picture as a long-term reference picture from among the P1, P4, P5, and Bs2 pictures stored in the DPB.

At the AVC default, from among the P1, P4, P5, and Bs2 pictures stored in the DPB, with regard to the P1, P4, and P5 pictures as a short-term reference picture, as shown in FIG. 11, the assignment is made as follows: the L1 index having a value of 0 is assigned to the P4 picture first closest to the B3 picture after the B3 picture in the POC order; and the L0 index having a value of 1 is assigned to the P5 picture second closest to the B3 picture after the B3 picture in the POC order.

At the AVC default, with regard to the P1, P4, and P5 pictures as a short-term reference picture stored in the DPB, as shown in FIG. 11, the L1 index having a value of 2 is assigned to the P1 picture first closest to the B3 picture before the B3 picture in the POC order.

At the AVC default, after the L1 index has been assigned to the P1, P4, and P5 pictures as a short-term reference picture stored in the DPB, the L1 index having a value of 3 is assigned to the Bs2 picture as a long-term reference picture from among the P1, P4, P5, and Bs2 pictures stored in the DPB.

The B3 picture is not a reference picture, thus the B3 picture is not stored in the DPB after decoding.

Thus, as shown in FIG. 11, similarly to after the Bs2 picture one picture before the B3 picture in the decoding order has been decoded, the P1, P4, P5, and Bs2 pictures are still stored in the DPB.

At the time t6 next to the time t5, the decoding apparatus picks up the P8 picture of GOP#0 as a current picture in decoding process and decodes the P8 picture.

When the P8 picture is decoded, as shown in FIG. 11, the P1, P4, P5, and Bs2 pictures are stored in the DPB, and the P8 picture is decoded with reference to the P1 or P4, P5, and Bs2 pictures stored in the DPB as necessary so as to create the predicted image of L0 prediction.

At the AVC default, when the P8 picture is decoded, from among the P1, P4, P5, and Bs2 pictures stored in the DPB, with regard to the P1, P4, and P5 pictures as a short-term reference picture, as shown in FIG. 11, the assignment is made as follows: the L0 index having a value of 0 is assigned to the P5 picture first closest to the P8 picture in the decoding order; the L0 index having a value of 1 is assigned to the P4 picture second closest to the P8 picture in the decoding order; and the L0 index having a value of 2 is assigned to the P1 picture third closest to the P8 picture in the decoding order.

At the AVC default, after the L0 index has been assigned to the P1, P4, and P5 pictures as a short-term reference picture stored in the DPB, the L0 index having a value of 3 is assigned to the Bs2 picture as a long-term reference picture from among the P1, P4, P5, and Bs2 pictures stored in the DPB.

Since the POC of the P8 picture is 8 and hence the remainder POC is 8, according to the first storage control of FIG. 10, the MMCO command "400" is issued. As a result, the Bs2 picture as a long-term reference picture from among the P1, P4, P5, and Bs2 pictures stored in the DPB is discarded from the DPB through the adaptive memory control process.

The P8 picture is a reference picture, and the P8 picture after decoding is stored in the DPB after the Bs2 picture as a long-term reference picture has been discarded.

As a result, as shown in FIG. 11, the P1, P4, P5, and P8 pictures are stored in the DPB.

At the time t7 next to the time t6, the decoding apparatus picks up the P9 picture of GOP#0 as a current picture in decoding process and decodes the P9 picture.

When the P9 picture is decoded, as shown in FIG. 11, the P1, P4, P5, and P8 pictures are stored in the DPB, and the P9 picture is decoded with reference to the P1, P4, P5, and P8 pictures stored in the DPB as necessary so as to create the predicted image of L0 prediction.

At the AVC default, when the P9 picture is decoded, with regard to the P1, P4, P5, and P8 pictures stored in the DPB, as shown in FIG. 11, the assignment is made as follows: the L0 index having a value of 0 is assigned to the P8 picture first closest to the P9 picture in the decoding order; and the L0 index having a value of 1 is assigned to the P5 picture second closest to the P9 picture in the decoding order.

At the AVC default, with regard to the P1, P4, P5, and P8 pictures stored in the DPB, as shown in FIG. 11, the assignment is made as follows: the L0 index having a value of 2 is assigned to the P4 picture third closest to the P9 picture in the decoding order; and the L0 index having a value of 3 is assigned to the P1 picture fourth closest to the P9 picture in the decoding order.

The P9 picture is a reference picture and the P9 picture after decoding is stored in the DPB.

When the P9 picture is stored in the DPB, the four pictures of the P1, P4, P5, and P8 pictures are stored in the DPB as much as the storage capacity allows. For this reason, in the decoding apparatus, the oldest P1 picture from among the P1, P4, P5, and P8 pictures stored in the DPB is released (becomes a non-reference picture) through the sliding window memory control process.

Thereafter, the P9 picture after decoding is stored in the DPB, and as a result, as shown in FIG. 11, the P4, P5, P8, and P9 pictures are stored in the DPB.

At the time t8 next to the time t7, the decoding apparatus picks up the Bs6 picture of GOP#0 as a current picture in decoding process and decodes the Bs6 picture.

When the Bs6 picture is decoded, as shown in FIG. 11, the P4, P5, P8, and P9 pictures are stored in the DPB, and the Bs6 picture is decoded with reference to the P4, P5, P8, and P9 pictures stored in the DPB as necessary so as to create the predicted image of L0 prediction or L1 prediction.

Referring to FIG. 11, when the Bs6 picture of the L image is decoded at the time t8, the P4 picture which is the picture of the L image and is closest to and temporally earlier than the Bs6 picture in the display order is stored in the DPB.

Thus, in the case of forward prediction as L0 prediction of the Bs6 picture, the P4 picture stored in the DPB can be referenced, thus encoding efficiency can be improved compared to a case where the P4 picture is unable to be referenced, as described in FIGS. 6 and 7.

When the Bs6 picture is decoded, at the AVC default, with regard to the P4, P5, P8, and P9 pictures as a short-term reference picture stored in the DPB, as shown in FIG. 11, the assignment is made as follows: the L0 index having a value of 0 is assigned to the P5 picture first closest to the Bs6 picture before the Bs6 picture in the POC order; the L0 index having a value of 1 is assigned to the P4 picture second closest to the Bs6 picture before the Bs6 picture in the POC order; the L0 index having a value of 2 is assigned to the P8 picture first closest to the Bs6 picture after the Bs6 picture in the POC order; and the L0 index having a value of 3 is assigned to the P9 picture second closest to the Bs6 picture after the Bs6 picture in the POC order.

At the AVC default, with regard to the P4, P5, P8, and P9 pictures as a short-term reference picture stored in the DPB, as shown in FIG. 11, the assignment is made as follows: the L1 index having a value of 0 is assigned to the P8 picture first closest to the Bs6 picture after the Bs6 picture in the POC order; the L1 index having a value of 1 is assigned to the P9 picture second closest to the Bs6 picture after the Bs6 picture in the POC order; the L1 index having a value of 2 is assigned to the P5 picture first closest to the Bs6 picture before the Bs6 picture in the POC order; and the L1 index having a value of 3 is assigned to the P4 picture second closest to the Bs6 picture before the Bs6 picture in the POC order.

The Bs6 picture is a reference picture and the Bs6 picture after decoding is stored in the DPB.

When the Bs6 picture is stored in the DPB, the four pictures of the P4, P5, P8, and P9 pictures are stored in the DPB as much as the storage capacity allows. For this reason, in the decoding apparatus, the oldest P4 picture from among the P4, P5, P8, and P9 pictures stored in the DPB is released through the sliding window memory control process.

Thereafter, the Bs6 picture after decoding is stored in the DPB, and as a result, as shown in FIG. 11, the P5, P8, P9, and Bs6 pictures are stored in the DPB.

Since the POC of the Bs6 picture is 6 and hence the remainder POC is 6, according to the first storage control of FIG. 10, the MMCO command "41600" is issued. As a result, the Bs6 picture as the current picture in decoding process is set as a long-term reference picture as indicated by a bold-line rectangle of FIG. 11 and stored in the DPB through the adaptive memory control process.

At the time t9 next to the time t8, the decoding apparatus picks up the B7 picture of GOP#0 as a current picture in decoding process and decodes the B7 picture.

When the B7 picture is decoded, as shown in FIG. 11, the P5, P8, P9, and Bs6 pictures are stored in the DPB, and the B7 picture is decoded with reference to the P5, P8, P9, and Bs6 pictures stored in the DPB as necessary so as to create the predicted image of L0 prediction or L1 prediction.

Referring to FIG. 11, when the B7 picture of the R image is decoded at the time t9, the P5 picture which is the picture of the R image and is closest to and temporally earlier than the B7 picture in the display order is stored in the DPB.

Thus, in the case of forward prediction as L0 prediction of the B7 picture, the P5 picture stored in the DPB can be referenced, thus encoding efficiency can be improved compared to a case where the P5 picture is unable to be referenced, as described in FIGS. 6 and 7.

At the AVC default, when the B7 picture is decoded, from among the P5, P8, P9, and Bs6 pictures stored in the DPB, with regard to the pictures which are not a long-term reference picture, that is, the P5, P8, and P9 pictures as a short-term reference picture, as shown in FIG. 11, the assignment is made as follows: the L0 index having a value of 0 is assigned to the P5 picture first closest to the B7 picture before the B7 picture in the POC order; the L0 index having a value of 1 is assigned to the P8 picture first closest to the B7 picture after the B7 picture in the POC order; and the L0 index having a value of 2 is assigned to the P9 picture second closest to the B7 picture after the B7 picture in the POC order.

At the AVC default, thereafter, the L0 index having a value of 3 is assigned to the Bs6 picture as a long-term reference picture from among the P5, P8, P9, and Bs6 pictures stored in the DPB.

At the AVC default, from among the P5, P8, P9, and Bs6 pictures stored in the DPB, with regard to the P5, P8, and P9 pictures as a short-term reference picture, as shown in FIG. 11, the assignment is made as follows: the L1 index having a value of 0 is assigned to the P8 picture first closest to the B7 picture after the B7 picture in the POC order; the L0 index having a value of 1 is assigned to the P9 picture second closest to the B7 picture after the B7 picture in the POC order; and the L1 index having a value of 2 is assigned to the P5 picture first closest to the B7 picture before the B7 picture in the POC order.

At the AVC default, thereafter, the L1 index having a value of 3 is assigned to the Bs6 picture as a long-term reference picture from among the P5, P8, P9, and Bs6 pictures stored in the DPB.

The B7 picture is not a reference picture, thus the B7 picture is not stored in the DPB after decoding.

Thus, as shown in FIG. 11, similarly to after the Bs6 picture one picture before the B7 picture in the decoding order has been decoded, the P5, P8, P9, and Bs6 pictures are still stored in the DPB.

At the time t10 next to the time t9, the decoding apparatus picks up the P12 picture of GOP#0 as a current picture in decoding process and decodes the P12 picture.

When the P12 picture is decoded, as shown in FIG. 11, the P5, P8, P9, and Bs6 pictures are stored in the DPB, and the P12 picture is decoded with reference to the P5, P8, P9, and Bs6 pictures stored in the DPB as necessary so as to create the predicted image of L0 prediction.

In FIG. 11, description of the assignment of the reference picture number (L0 index, L1 index) at the AVC default will be hereinafter omitted.

Since the POC of the P12 picture is 12 and hence the remainder POC is 12, according to the first storage control of FIG. 10, the MMCO command "400" is issued. As a result, the Bs6 picture as a long-term reference picture from among the P5, P8, P9, and Bs6 pictures stored in the DPB is discarded from the DPB through the adaptive memory control process.

The P12 picture is a reference picture, and the P12 picture after decoding is stored in the DPB after the Bs6 picture as a long-term reference picture has been discarded.

As a result, as shown in FIG. 11, the P5, P8, P9, and P12 pictures are stored in the DPB.

At the time t11 next to the time t10, the decoding apparatus picks up the P13 picture of GOP#0 as a current picture in decoding process and decodes the P13 picture.

When the P13 picture is decoded, as shown in FIG. 11, the P5, P8, P9, and P12 pictures are stored in the DPB, and the P13 picture is decoded with reference to the P5, P8, P9, and P12 pictures stored in the DPB as necessary so as to create the predicted image of L0 prediction.

The P13 picture is a reference picture and the P13 picture after decoding is stored in the DPB.

When the P13 picture is stored in the DPB, the four pictures of the P5, P8, P9, and P12 pictures are stored in the DPB as much as the storage capacity allows. For this reason, in the decoding apparatus, the oldest P5 picture from among the P5, P8, P9, and P12 pictures stored in the DPB is released through the sliding window memory control process.

Thereafter, the P13 picture after decoding is stored in the DPB, and as a result, as shown in FIG. 11, the P8, P9, P12, and P13 pictures are stored in the DPB.

At the time t12 next to the time t11, the decoding apparatus picks up the Bs10 picture of GOP#0 as a current picture in decoding process and decodes the Bs10 picture.

When the Bs10 picture is decoded, as shown in FIG. 11, the P8, P9, P12, and P13 pictures are stored in the DPB, and the Bs10 picture is decoded with reference to the P8, P9, P12, and P13 pictures stored in the DPB as necessary so as to create the predicted image of L0 prediction or L1 prediction.

Referring to FIG. 11, when the Bs10 picture of the L image is decoded at the time t12, the P8 picture which is the picture of the L image and is closest to and temporally earlier than the Bs10 picture in the display order is stored in the DPB.

Thus, in the case of forward prediction as L0 prediction of the Bs10 picture, the P8 picture stored in the DPB can be referenced, thus encoding efficiency can be improved compared to a case where the P8 picture is unable to be referenced, as described in FIGS. 6 and 7.

The Bs10 picture is a reference picture and the Bs10 picture after decoding is stored in the DPB.

When the Bs10 picture is stored in the DPB, the four pictures of the P8, P9, P12, and P13 pictures are stored in the DPB as much as the storage capacity allows. For this reason, in the decoding apparatus, the oldest P8 picture from among the P8, P9, P12, and P13 pictures stored in the DPB is released through the sliding window memory control process.

Thereafter, the Bs10 picture after decoding is stored in the DPB, and as a result, as shown in FIG. 11, the P9, P12, P13, and Bs10 pictures are stored in the DPB.

Since the POC of the Bs10 picture is 10 and hence the remainder POC is 10, according to the first storage control of FIG. 10, the MMCO command "41600" is issued. As a result, the Bs10 picture as the current picture in decoding process is set as a long-term reference picture as indicated by a bold-line rectangle of FIG. 11 and stored in the DPB through the adaptive memory control process.

At the time t13 next to the time t12, the decoding apparatus picks up the B11 picture of GOP#0 as a current picture in decoding process and decodes the B11 picture.

When the B11 picture is decoded, as shown in FIG. 11, the P9, P12, P13, and Bs10 pictures are stored in the DPB, and the B11 picture is decoded with reference to the P9, P12, P13, and Bs10 pictures stored in the DPB as necessary so as to create the predicted image of L0 prediction or L1 prediction.

Referring to FIG. 11, when the B11 picture of the R image is decoded at the time t13, the P9 picture which is the picture of the R image and is closest to and temporally earlier than the B11 picture in the display order is stored in the DPB.

Thus, in the case of forward prediction as L0 prediction of the B11 picture, the P9 picture stored in the DPB can be referenced, thus encoding efficiency can be improved compared to a case where the P9 picture is unable to be referenced, as described in FIGS. 6 and 7.

The B11 picture is not a reference picture, thus the B11 picture is not stored in the DPB after decoding.

Thus, as shown in FIG. 11, similarly to after the Bs10 picture one picture before the B11 picture in the decoding order has been decoded, the P9, P12, P13, and Bs10 pictures are still stored in the DPB.

At the time t14 next to the time t13, the decoding apparatus picks up the I16 (I0) picture of GOP#1 as a current picture in decoding process and decodes the I16 picture with no inter prediction.

That is, when the I16 picture is decoded, as shown in FIG. 11, the P9, P12, P13, and Bs10 pictures are stored in the DPB, and the I16 picture is decoded without reference to the P9, P12, P13, and Bs10 pictures stored in the DPB.

Since the POC of the I16 picture is 0 and hence the remainder POC is 0, according to the first storage control of FIG. 10, the MMCO command "400" is issued after the I16 picture has been decoded. As a result, the Bs10 picture as a long-term reference picture from among the P9, P12, P13, and Bs10 pictures stored in the DPB is discarded from the DPB through the adaptive memory control process.

The I16 picture is a reference picture, and the I16 picture after decoding is stored in the DPB after the Bs10 picture as a long-term reference picture has been discarded.

As a result, as shown in FIG. 11, the P9, P12, P13, and I16 pictures are stored in the DPB.

At the time t15 next to the time t14, the decoding apparatus picks up the P17 (P1) picture of GOP#1 as a current picture in decoding process and decodes the P17 picture.

When the P17 picture is decoded, as shown in FIG. 11, the P9, P12, P13, and I16 pictures are stored in the DPB, and the P17 picture is decoded with reference to the P9, P12, P13, and I16 pictures stored in the DPB as necessary so as to create the predicted image of L0 prediction.

The P17 picture is a reference picture and the P17 picture after decoding is stored in the DPB.

When the P17 picture is stored in the DPB, the four pictures of the P9, P12, P13, and I16 pictures are stored in the DPB as much as the storage capacity allows. For this reason, in the decoding apparatus, the oldest P9 picture from among the P9, P12, P13, and I16 pictures stored in the DPB is released through the sliding window memory control process.

Thereafter, the P17 picture after decoding is stored in the DPB, and as a result, as shown in FIG. 11, the P12, P13, I16, and P17 pictures are stored in the DPB.

At the time t16 next to the time t15, the decoding apparatus picks up the Bs14 picture of GOP#0 as a current picture in decoding process and decodes the Bs14 picture.

When the Bs14 picture is decoded, as shown in FIG. 11, the P12, P13, I16, and P17 pictures are stored in the DPB, and the Bs14 picture is decoded with reference to the P12, P13, I16, and P17 pictures stored in the DPB as necessary so as to create the predicted image of L0 prediction or L1 prediction.

Referring to FIG. 11, when the Bs14 picture of the L image is decoded at the time t16, the P12 picture which is the picture of the L image and is closest to and temporally earlier than the Bs14 picture in the display order is stored in the DPB.

Thus, in the case of forward prediction as L0 prediction of the Bs14 picture, the P12 picture stored in the DPB can be referenced, thus encoding efficiency can be improved compared to a case where the P12 picture is unable to be referenced, as described in FIGS. 6 and 7.

The Bs14 picture is a reference picture and the Bs14 picture after decoding is stored in the DPB.

When the Bs14 picture is stored in the DPB, the four pictures of the P12, P13, I16, and P17 pictures are stored in the DPB as much as the storage capacity allows. For this reason, in the decoding apparatus, the oldest P12 picture from among the P12, P13, I16, and P17 pictures stored in the DPB is released through the sliding window memory control process.

Thereafter, the Bs14 picture is stored in the DPB, and as a result, as shown in FIG. 11, the P13, I16, P17, and Bs14 pictures are stored in the DPB.

Since the POC of the Bs14 picture is 14 and hence the remainder POC is 14, according to the first storage control of FIG. 10, the MMCO command "41600" is issued. As a result, the Bs14 picture as the current picture in decoding process is set as a long-term reference picture as indicated by a bold-line rectangle of FIG. 11 and stored in the DPB through the adaptive memory control process.

At the time t17 next to the time t16, the decoding apparatus picks up the B15 picture of GOP#0 as a current picture in decoding process and decodes the B15 picture.

When the B15 picture is decoded, as shown in FIG. 11, the P13, I16, P17, and Bs14 pictures are stored in the DPB, and the B15 picture is decoded with reference to the P13, I16, P17, and Bs14 pictures stored in the DPB as necessary so as to create the predicted image of L0 prediction or L1 prediction.

Referring to FIG. 11, when the B15 picture of the R image is decoded at the time t17, the P13 picture which is the picture of the R image and is closest to and temporally earlier than the B15 picture in the display order is stored in the DPB.

Thus, in the case of forward prediction as L0 prediction of the B15 picture, the P13 picture stored in the DPB can be referenced, thus encoding efficiency can be improved compared to a case where the P13 picture is unable to be referenced, as described in FIGS. 6 and 7.

The B15 picture is not a reference picture, thus the B15 picture is not stored in the DPB after decoding.

Thus, as shown in FIG. 11, similarly to after the Bs14 picture one picture before the B15 picture in the decoding order has been decoded, the P13, I16, P17, and Bs14 pictures are still stored in the DPB.

Though not shown in FIG. 11, at the time next to the time t17, the decoding apparatus picks up the P20 (P4) picture of GOP#1 as a current picture in decoding process and decodes the P20 picture.

With regard to the P20 picture, since the remainder POC is 4, according to the first storage control of FIG. 10, the MMCO command "400" is issued after the P20 picture has been decoded. As a result, the Bs14 picture as a long-term reference picture from among the P13, I16, P17, and Bs14 pictures stored in the DPB is discarded from the DPB through the adaptive memory control process.

As described above, according to the first storage control, in the decoding apparatus, from among the pictures which are decoded temporally earlier than the current picture in decoding process and capable of becoming reference pictures, a picture which is a picture of an image at the same viewpoint as the current picture in decoding process from among the L image and the R image and closest to the current picture in decoding process in the display order is stored in the DPB. That is, in the encoding apparatus, from among the pictures which are encoded temporally earlier than the current picture in encoding process and capable of becoming reference pictures, a picture which is a picture of an image at the same viewpoint as the current picture in encoding process from among the L image and the R image and closest to the current picture in encoding process in the display order is stored in the frame memory 22. Therefore, encoding efficiency can be improved.

Specifically, when the Bs6 picture of the L image is inter-predicted, the P4 picture which is the picture of the L image immediately before the Bs6 picture is stored in the frame memory 22 of the encoding apparatus of FIG. 8 and the frame memory 49 corresponding to the DPB of the decoding apparatus of FIG. 2. When the B7 picture of the R image is inter-predicted, the P5 picture which is the picture of the R image immediately before the B7 picture is stored in the frame memory 22 and the frame memory 49. When the Bs10 picture of the L image is inter-predicted, the P8 picture which is the picture of the L image immediately before the Bs10 picture is stored in the frame memory 22 and the frame memory 49. When the B11 picture of the R image is inter-predicted, the P9 picture which is the picture of the R image immediately before the B11 picture is stored in the frame memory 22 and the frame memory 49. When the Bs14 picture of the L image is inter-predicted, the P12 picture which is the picture of the L image immediately before the Bs14 picture is stored in the frame memory 22 and the frame memory 49. When the B15 picture of the R image is inter-predicted, the P13 picture which is the picture of the R image immediately before the B15 picture is stored in the in the frame memory 22 and the frame memory 49. Therefore, the prediction error of a predicted image created through inter prediction is reduced, thus encoding efficiency may be improved.

According to the first storage control, with regard to a picture of the L image of the frame sequential in which the GOP has the structure shown in FIG. 4, inter prediction is possible in which a picture of the L image temporally immediately before and after the relevant picture from among the pictures (referable pictures) capable of becoming reference pictures is referenced.

With regard to a picture of the R image, inter prediction is also possible in which a picture of the L image constituting an LR pair can be referenced, in addition to a picture of the R image temporally immediately before and after the relevant picture from among the referable pictures.

Therefore, encoding efficiency can be improved.

[RPLR Command]

FIG. 12 is a diagram illustrating the issuance of an RPLR command at the same time with the issuance of an MMCO command as the first storage control by the storage control unit 71 (FIG. 8).

As described with reference to FIG. 6, in the AVC encoding apparatus, a reference picture number (L0 index, L1 index) assigned to a reference picture used in creating the predicted image of a picture is included in encoded data.

In the AVC decoding apparatus, a picture to which a reference picture number, which coincides with the reference picture number included in encoded data, is assigned is referenced as a reference picture in creating a predicted image.

At the AVC default (preset value), with regard to a reference picture when a P picture is inter-predicted, when a P picture to be inter-predicted is used as a basis, the reference picture number (L0 index) having a smaller value is assigned to a reference picture closer to the P picture in the decoding order.

At the AVC default, with regard to a reference picture when a B picture (including a Bs picture) is inter-predicted, when a B picture to be inter-predicted is used as a basis, the reference picture number (L0 index and L1 index) having a smaller value is assigned to a reference picture closer to the B picture in the POC order.

Meanwhile, in the AVC encoding apparatus, the reference picture number (L0 index, L1 index) which is assigned to a reference picture used in creating the predicted image of the picture is included in encoded data in the invertible encoding unit 16 (FIG. 8). The reference picture number included in the encoded data is encoded to a code having a shorter code length as the value thereof is smaller.

Thus, the reference picture number having a smaller value is assigned to a reference picture which is highly likely to be used in creating the predicted image of the picture, encoding efficiency may be improved.

However, in the frame sequential, the pictures of the L image and the R image are alternately arranged. For this reason, at the AVC default, there may be a case where the reference picture number having a smaller value is not assigned to a reference picture which is highly likely to be used in creating the predicted image of the picture.

That is, as described with reference to FIG. 11, for example, at the time t3, when the P5 picture becomes the current picture in decoding process, the I0, P1, and P4 pictures are stored in the DPB. At the AVC default, the L0 index having a value of 0 is assigned to the P4 picture first closest to the P5 picture in the decoding order. The L0 index having a value of 1 is assigned to the P1 picture second closest to the P5 picture in the decoding order. The L0 index having a value of 2 is assigned to the I0 picture second closest to the P5 picture in the decoding order.

The P5 picture as the current picture in decoding process is the picture of the R image, and from among the I0, P1, and P4 pictures stored in the DPB, a picture which is the picture of the R image at the same viewpoint as and temporally closest to the P5 picture which is the picture of the R image is the P1 picture.

Therefore, with regard to the P5 picture, a prediction error of a predicted image which is created with the P1 picture from among the I0, P1, and P4 pictures stored in the DPB as a reference picture is highly likely to be minimized.

From among the I0, P1, and P4 stored in the DPB, with regard to the I0 and R4 pictures which are the pictures of the L image at a different viewpoint from the P5 picture of the R image, the P4 picture is temporally closer to the P5 picture than the I0 picture. Thus, a prediction error of a predicted image which is created with the P4 picture as the reference picture is highly likely to be smaller than a prediction error of a predicted image which is created with the I0 picture as the reference picture.

With the above, the I0, P1, and P4 pictures stored in the DPB are likely to be used in creating the predicted image of the P5 picture in descending order of the possibility of reduction in the prediction error, that is, in order of the P1, P4, and I0 pictures.

Therefore, when the P5 picture becomes the current picture in decoding process, with regard to the I0, P1, and P4 pictures stored in the DPB, the assignment is made as follows: the L0 index having a minimum value, that is, 0, is assigned to the P1 picture; the L0 index having a second largest value, that is, 1, is assigned to the P4 picture; and the L0 index having a third largest value, that is, 2, is assigned to the I0 picture. In this way, encoding efficiency can be improved compared to a case where only the MMCO command of FIG. 10 is issued.

However, at the AVC default, as described with reference to FIG. 11, as the L0 index, 1 is assigned to the P1 picture, 0 is assigned to the P4 picture, and 2 is assigned to the I0 picture.

Accordingly, in the storage control unit 71 of the encoding apparatus of FIG. 8, when the MMCO command of FIG. 10 is issued, the RPLR command of FIG. 12 is further issued. Thus, the reference picture number having a smaller value can be assigned to a reference picture which is highly likely to be used in creating the predicted image of the picture.

That is, FIG. 12 shows a list of RPLR commands which are issued to assign the reference picture number when the storage control unit 71 issues the MMCO command of FIG. 10 as the first storage control.

The issuance of the RPLR command of FIG. 12 may not be carried out. However, when the MMCO command of FIG. 10 is issued, if the RPLR command of the FIG. 12 is also issued, the reference picture number having a smaller value is assigned to a reference picture which is highly likely to be used in creating the predicted image of the picture, encoding efficiency may be further improved.

In the encoding apparatus of FIG. 8, similarly to the MMCO command, the RPLR command which is issued by the storage control unit 71 is supplied to the frame memory 22 and the invertible encoding unit 16.

In the frame memory 22, the reference picture number is assigned to the reference picture stored in the frame memory 22 in accordance with the RPLR command from the storage control unit 71. In the invertible encoding unit 16, the RPLR command from the storage control unit 71 is included in encoded data.

When the RPLR command issued by the storage control unit 71 is included in encoded data, in the decoding apparatus of FIG. 2 which decodes encoded data, the same operation as the operation in the encoding apparatus of FIG. 8 to assign the reference picture number to the reference pictures stored in the frame memory 22 based on the RPLR command issued by the storage control unit 71 is carried out as an operation to assign the reference picture number to the reference picture stored in the frame memory 49 corresponding to the DPB.

Hereinafter, as in the MMCO command, description will be provided appropriately replacing the operation in the encoding apparatus of FIG. 8 to assign the reference picture number to the reference picture stored in the frame memory 22 based on the RPLR command issued by the storage control unit 71 with the operation to assign the reference picture number to the reference picture stored in (the frame memory 49 corresponding to) the DPB of the decoding apparatus of FIG. 2.

In the list of FIG. 12, the value in the column "POC" represents the remainder which is obtained by dividing the POC of the current picture in encoding process (current picture in decoding process) by 16.

The column "list" represents to which of (the L0 index of) the reference picture which is referenced for L0 prediction and (the L1 index of) the reference picture which is referenced for L1 prediction the reference picture number is assigned based on the RPLR command.

The column "ref_pic_list_reordering" represents an RPLR command and a necessary argument which are issued when the remainder POC corresponds to the value in the column "POC". The column "details" represents the content of processing (operation) based on the RPLR command and the necessary argument in the column "ref_pic_list_reordering".

As shown in the lower part of FIG. 12, the RPLR command can have four values of #COMMAND==0, 1, 2, and 3.

When the RPLR command is 0, 1, or 2 (#COMMAND==0, 1, or 2) (reordering_of_pic_nums_idc=0, 1, or 2), in accordance with the RPLR command and an argument α subsequent to the RPLR command, the AVC decoding apparatus assigns the reference picture number to the reference picture stored in the DPB, which is designated by using the argument α.

When the RPLR command is 3 (#COMMAND==3) (reordering_of_pic_nums_idc=3), the AVC decoding apparatus completes the operation to assign the reference picture number based on the RPLR command.

When one or more RPLR commands (and the arguments α) are consecutively provided, in the initial RPLR command, 0 which is the minimum value from among the values unassigned as the reference picture number at that time is assigned as the reference picture number. In the second RPLR command, 1 which is the minimum value from among the values unassigned as the reference picture number at that time is assigned as the reference picture number.

Hereinafter, unless the RPLR command having a value of 3 appears, that is, insofar as the RPLR commands having a value of 0, 1, or 2 are continued, in each RPLR command, the minimum value from among the values unassigned as the reference picture number at that time is assigned as the reference picture number.

If the RPLR command having a value of 3 appears, the AVC decoding apparatus completes the assignment of the reference picture number based on the RPLR command, and assigns the reference picture number at the AVC default to a reference picture, to which the reference picture number is not yet assigned at that time, from among the reference pictures stored in the DPB.

When the RPLR command is 0 (#COMMAND==0), the AVC decoding apparatus interprets the RPLR command as NAL_REORDERING_ABS_DIFF_PIC_NUM_NEGATIVE, and assigns the minimum value from among the values unassigned as the reference picture number to a short-term reference picture stored in the DPB, which is designated by using the argument α subsequent to the RPLR command, as the reference picture number in accordance with the interpretation.

When the RPLR command is 0, a variable abs_diff_pic_num_minus1 for designating a reference picture to which the reference picture number is assigned is set to the argument α.

A reference picture which has, as the PN, a value obtained by subtracting the variable abs_diff_pic_num_minus1 (=α) from the PN of the reference picture to which the reference picture number is assigned immediately before is designated (specified) as a reference picture (hereinafter, also referred to as an assignment-target picture) to which the reference picture number is assigned in accordance with the RPLR command.

When the initial RPLR command of one or more consecutive RPLR commands (and arguments α) is 0, if it is assumed that the PN of the current picture in decoding process (current picture in encoding process) is expressed by CurrPicNum, an assignment-target picture designated by the argument α subsequent to the RPLR command becomes a picture the PN of which is equivalently expressed by the expression PN=CurrPicNum−(abs_diff_pic_num_minus1+1).

When the RPLR command is 1 (#COMMAND==1), the decoding apparatus interprets the RPLR command as NAL_REORDERING_ABS_DIFF_PIC_NUM_POSITIVE, and assigns the minimum value from among the values unassigned as the reference picture number to a short-term reference picture stored in the DPB, which is designated by using the argument α subsequent to the RPLR command in encoded data, as the reference picture number in accordance with the interpretation.

When the RPLR command is 1, a reference picture which has, as the PN, a value obtained by adding the argument α to the PN of the reference picture to which the reference picture number is assigned immediately before is designated as an assignment-target picture.

When the RPLR command is 2 (#COMMAND==2), the decoding apparatus interprets the RPLR command as NAL_REORDERING_LONG_TERM_PIC_NUM, and assigns the minimum value from among the values unassigned as the reference picture number to a long-term reference picture stored in the DPB, which is designated by using the argument α subsequent to the RPLR command in encoded data, as the reference picture number in accordance with the interpretation.

When the RPLR command is 2, the variable long_term_pic_num for designating a reference picture to which the reference picture number is assigned is set to the argument α.

A reference picture (long-term reference picture) in which the index LongFrameIdx for a long-term reference picture is equal to the variable long_term_pic_num (=α) is designated as an assignment-target picture.

When the RPLR command is 3 (#COMMAND==3), the decoding apparatus interprets the RPLR command as NAL_REORDERING_END, and completes (ends) the operation to assign the reference picture number based on the RPLR command in accordance with the interpretation.

The RPLR command is described in the slice header of encoded data as Reference Picture List Reordering Syntax.

The RPLR command is described subsequent to the description of "Ref_pic_list_reordering_flag_l0=1" or "Ref_pic_list_reordering_flag_l1=1" in the slice header.

With the RPLR command subsequent to the description "Ref_pic_list_reordering_flag_l0=1", the assignment of the L0 index is performed, and when the RPLR command subsequent to the description "Ref_pic_list_reordering_flag_l1=1", the assignment of the L1 index is performed.

In the list of FIG. 12, an RPLR command in which the column "list" is "0" is an RPLR command subsequent to the description "Ref_pic_list_reordering_flag_l0=1", that is, an RPLR command which performs the assignment of the L0 index, and is hereinafter also referred to as an L0 RPLR command.

An RPLR command in which the column "list" is "1" is an RPLR command subsequent to the description "Ref_pic_list_reordering_flag_l1=1", that is, an RPLR command which performs the assignment of the L1 index, and is hereinafter also referred to as an L1 RPLR command.

In the list of FIG. 12, when the remainder POC is 1, that is, when the current picture in decoding process (current picture in encoding process) is the P1 picture, "023" is issued as the RPLR command and the necessary argument. "0" at the first place from the head in "023" represents an L0 RPLR command #COMMAND==0, and "2" at the second place is the argument of the L0 RPLR command #COMMAND==0. "3" at the third place in "023" represents an RPLR command #COMMAND==3.

With the L0 RPLR command #COMMAND==0 and the subsequent argument "2" in "023" which is issued when the current picture in decoding process is the P1 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P1 picture as the current picture in decoding process, from among the reference pictures stored in the DPB as an assignment-target picture, and assigns the minimum value from among the values unassigned as the reference picture number (L0 index) at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P1 picture as the current picture in decoding process is the P13 picture of a GOP one GOP before the GOP of the P1 picture as the current picture in decoding process.

In the column "details" of the list of FIG. 12, for example, "set L0 [0]:P13" (first line) means that 0 is assigned to the P13 picture as the L0 index. For example, "set L1 [0]:P5" (fifth line) means that 0 is assigned to the P5 picture as the L1 index.

Thereafter, the decoding apparatus ends the operation to assign the reference picture number based on the RPLR command in accordance with the RPLR command #COMMAND==3 at the third place in "023".

When the remainder POC is 2, that is, when the current picture in decoding process is the Bs2 picture, "033" is issued as the RPLR command and the necessary argument. "0" at the first place from the head in "033" represents the L0 RPLR command #COMMAND==0, and "3" at the second place is the argument of the L0 RPLR command #COMMAND==0. "3" at the third place in "033" represents the RPLR command #COMMAND==3.

With the L0 RPLR command #COMMAND==0 and the subsequent argument "3" in "033" which is issued when the current picture in decoding process is the Bs2 picture, the variable abs_diff_pic_num_minus1 is set to 3. Thus, the decoding apparatus picks up a reference picture, which has, as the PN, a value obtained by subtracting abs_diff_pic_num_minus1+1 (=4) from CurrPicNum which is the PN of the Bs2 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=4) from CurrPicNum which is the PN of the Bs2 picture as the current picture in decoding process is the I0 picture of the GOP to which the Bs2 picture as the current picture in decoding process belongs.

Thereafter, the decoding apparatus ends the operation to assign the reference picture number based on the RPLR command in accordance with the RPLR command #COMMAND==3 at the third place in "033".

When the remainder POC is 3, that is, when the current picture in decoding process is the B3 picture, "03", "203", and "013" are sequentially issued as the RPLR command and the necessary argument. "0" at the first place from the head in the first "03" from among "03", "203", and "013" represents the L0 RPLR command #COMMAND==0, and "3" at the second place is the argument of the L0 RPLR command #COMMAND==0.

With the L0 RPLR command #COMMAND==0 and the subsequent argument "3" in the first "03" from among "03", "203", and "013" which are issued when the current picture in decoding process is the B3 picture, the variable abs_diff_pic_num_minus1 is set to 3. Thus, the decoding apparatus picks up a reference picture, which has, as the PN, a value obtained by subtracting abs_diff_pic_num_minus1+1 (=4) from CurrPicNum which is the PN of the B3 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=4) from CurrPicNum which is the PN of the B3 picture as the current picture in decoding process is the P1 picture of the GOP to which the B3 picture as the current picture in decoding process belongs.

"2" at the first place from the head in the second "203" from among "03", "203", and "013" which are issued when the current picture in decoding process is the B3 picture represents an L0 RPLR command #COMMAND==2, and "0" at the second place is the argument of the L0 RPLR command #COMMAND==2. "3" at the third place in "203" represents the RPLR command #COMMAND==3.

With the L0 RPLR command #COMMAND==2 and the subsequent argument "0" in the second "203" from among "03", "203", and "013" which are issued when the current picture in decoding process is the B3 picture, the variable long_term_pic_num is set to 0. Thus, the decoding apparatus picks up a long-term reference picture, in which the index LongFrameIdx for a long-term reference picture is equal to the variable long_term_pic_num, from among the reference pictures stored in the DPB as an assignment-target picture, and assigns the minimum value from among the values unassigned as the reference picture number (L0 index) at that time, that is, 1, to the relevant long-term reference picture as the L0 index.

As described below, when the current picture in decoding process is the B3 picture, from among the reference pictures stored in the DPB, the long-term reference picture in which the index LongFrameIdx for a long-term reference picture is equal to the variable long_term_pic_num (=0) is the Bs2 picture of the GOP to which the B3 picture as the current picture in decoding process belongs.

Thereafter, the decoding apparatus ends the operation to assign the reference picture number based on the RPLR command in accordance with the RPLR command #COMMAND==3 at the third place in "203".

If the operation to assign the reference picture number based on the RPLR command ends, the minimum value from among the values unassigned as the reference picture number becomes 0 (is reset to 0) which is the minimum value capable of being assigned as the reference picture number.

"0" at the first place from the head in the third "013" from among "03", "203", and "013" which are issued when the current picture in decoding process is the B3 picture represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the third "013" from among "03", "203", and "013" which are issued when the current picture in decoding process is the B3 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B3 picture as the current picture in decoding process, from among the reference pictures stored in the DPB as an assignment-target picture, and assigns the minimum value from among the values unassigned as the reference picture number (L1 index) at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B3 picture as the current picture in decoding process is the P5 picture of the GOP to which the B3 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 4, that is, when the current picture in decoding process is the P4 picture, "013" is issued as the RPLR command and the necessary argument. "0" at the first place from the head in "013" represents the L0 RPLR command #COMMAND==0, and "1" at the second place is the argument of the L0 RPLR command #COMMAND==0. "3" at the third place in "013" represents the RPLR command #COMMAND==3.

With the L0 RPLR command #COMMAND==0 and the subsequent argument "1" in "013" which is issued when the current picture in decoding process is the P4 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the P4 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=2) from the CurrPicNum which is the PN of the P4 picture as the current picture in decoding process is the I0 picture of the GOP to which the P4 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 5, that is, when the current picture in decoding process is the P5 picture, "013" is issued as the RPLR command and the necessary argument. "0" at the first place from the head in "013" represents the L0 RPLR command #COMMAND==0, and "1" at the second place is the argument of the L0 RPLR command #COMMAND==0. "3" at the third place in "013" represents the RPLR command #COMMAND==3.

With the L0 RPLR command #COMMAND==0 and the subsequent argument "1" in "013" which is issued when the current picture in decoding process is the P5 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the P5 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=2) from CurrPicNum which is the PN of the P5 picture as the current picture in decoding process is the P1 picture of the GOP to which the P5 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 6, that is, when the current picture in decoding process is the Bs6 picture, "043" is issued as the RPLR command and the necessary argument. "0" at the first place from the head in "043" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in "043" which is issued when the current picture in decoding process is the Bs6 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the Bs6 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the Bs6 picture as the current picture in decoding process is the P4 picture of the GOP to which the Bs6 picture as the current picture in decoding process belongs.

Thereafter, the decoding apparatus ends the operation to assign the reference picture number based on the RPLR command in accordance with the RPLR command #COMMAND==3 at the third place in "043".

When the remainder POC is 7, that is, when the current picture in decoding process is the B7 picture, "04", "203", and "013" are sequentially issued as the RPLR command and the necessary argument. "0" at the first place from the head in the first "04" from among "04", "203", and "013" represents the L0 RPLR command #COMMAND==0, and "3" at the second place is the argument of the L0 RPLR command #COMMAND==0.

With the L0 RPLR command #COMMAND==0 and the subsequent argument "4" in the first "04" from among "04", "203", and "013" which are issued when the current picture in decoding process is the B7 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the B7 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the B7 picture as the current picture in decoding process is the P5 picture of the GOP to which the B7 picture as the current picture in decoding process belongs.

"2" at the first place from the head in the second "203" from among "04", "203", and "013" which are issued when the current picture in decoding process is the B7 picture represents an L0 RPLR command #COMMAND==2, and "0" at the second place is the argument of the L0 RPLR command #COMMAND==2. "3" at the third place in "203" represents the RPLR command #COMMAND==3.

With the L0 RPLR command #COMMAND==2 and the subsequent argument "0" in the second "203" from among "04", "203", and "013" which are issued when the current picture in decoding process is the B7 picture, the variable long_term_pic_num is set to 0. Thus, the decoding apparatus picks up a long-term reference picture, in which the index LongFrameIdx for a long-term reference picture is equal to the variable long_term_pic_num, from among the reference pictures stored in the DPB as an assignment-target picture, and assigns the minimum value from among the values unassigned as the reference picture number at that time, that is, 1, to the relevant long-term reference picture as the L0 index.

As described below, when the current picture in decoding process is the B7 picture, from among the reference pictures stored in the DPB, the long-term reference picture in which the index LongFrameIdx for a long-term reference picture is equal to the variable long_term_pic_num (=0) is the Bs6 picture of the GOP to which the B7 picture as the current picture in decoding process belongs.

Thereafter, the decoding apparatus ends the operation to assign the reference picture number based on the RPLR command in accordance with the RPLR command #COMMAND==3 at the third place in "203".

"0" at the first place from the head in the third "013" from among "04", "203", and "013" which are issued when the current picture in decoding process is the B7 picture represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the third "013" from among "04", "203", and "013" which are issued when the current picture in decoding process is the B7 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B7 picture as the current picture in decoding process, from among the reference pictures stored in the DPB as an assignment-target picture, and assigns the minimum value from among the values unassigned as the reference picture number at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B7 picture as the current picture in decoding process is the P9 picture of the GOP to which the B7 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 8, that is, when the current picture in decoding process is the P8 picture, "023" is issued as the RPLR command and the necessary argument. "0" at the first place from the head in "023" represents an L0 RPLR command #COMMAND==0, and "2" at the second place is the argument of the L0 RPLR command #COMMAND==0. "3" at the third place in "023" represents an RPLR command #COMMAND==3.

With the L0 RPLR command #COMMAND==0 and the subsequent argument "2" in "023" which is issued when the current picture in decoding process is the P8 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P8 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P8 picture as the current picture in decoding process is the P4 picture of the GOP to which the P8 picture as the current picture in decoding process belongs.

Thereafter, the decoding apparatus ends the operation to assign the reference picture number based on the RPLR command in accordance with the RPLR command #COMMAND==3 at the third place in "023".

When the remainder POC is 9, that is, when the current picture in decoding process is the P9 picture, "023" is issued as the RPLR command and the necessary argument. "0" at the first place from the head in "023" represents an L0 RPLR command #COMMAND==0, and "2" at the second place is the argument of the L0 RPLR command #COMMAND==0. "3" at the third place in "023" represents an RPLR command #COMMAND==3.

With the L0 RPLR command #COMMAND==0 and the subsequent argument "2" in "023" which is issued when the current picture in decoding process is the P9 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P9 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P9 picture as the current picture in decoding process is the P5 picture of the GOP to which the P9 picture as the current picture in decoding process belongs.

Thereafter, the decoding apparatus ends the operation to assign the reference picture number based on the RPLR command in accordance with the RPLR command #COMMAND==3 at the third place in "023".

When the remainder POC is 10, that is, when the current picture in decoding process is the Bs10 picture, "043" is issued as the RPLR command and the necessary argument. "0" at the first place from the head in "043" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in "043" which is issued when the current picture in decoding process is the Bs10 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the Bs10 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the Bs10 picture as the current picture in decoding process is the P8 picture of the GOP to which the Bs10 picture as the current picture in decoding process belongs.

Thereafter, the decoding apparatus ends the operation to assign the reference picture number based on the RPLR command in accordance with the RPLR command #COMMAND==3 at the third place in "043".

When the remainder POC is 11, that is, when the current picture in decoding process is the B11 picture, "04", "203", and "013" are sequentially issued as the RPLR command and the necessary argument. "0" at the first place from the head in the first "04" from among "04", "203", and "013" represents the L0 RPLR command #COMMAND==0, and "3" at the second place is the argument of the L0 RPLR command #COMMAND==0.

With the L0 RPLR command #COMMAND==0 and the subsequent argument "4" in the first "04" from among "04", "203", and "013" which are issued when the current picture in decoding process is the B11 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the B11 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the B11 picture as the current picture in decoding process is the P9 picture of the GOP to which the B11 picture as the current picture in decoding process belongs.

"2" at the first place from the head in the second "203" from among "04", "203", and "013" which are issued when the current picture in decoding process is the B11 picture represents an L0 RPLR command #COMMAND==2, and "0" at the second place is the argument of the L0 RPLR command #COMMAND==2. "3" at the third place in "203" represents the RPLR command #COMMAND==3.

With the RPLR command #COMMAND==2 and the subsequent argument "0" in the second "203" from among "04", "203", and "013" which are issued when the current picture in decoding process is the B11 picture, the variable long_term_pic_num is set to 0. Thus, the decoding apparatus picks up a long-term reference picture, in which the index LongFrameIdx for a long-term reference picture is equal to the variable long_term_pic_num, from among the reference pictures stored in the DPB as an assignment-target picture, and assigns the minimum value from among the values unassigned as the reference picture number at that time, that is, 1, to the relevant long-term reference picture as the L0 index.

As described below, when the current picture in decoding process is the B11 picture, from among the reference pictures stored in the DPB, the long-term reference picture in which the index LongFrameIdx for a long-term reference picture is equal to the variable long_term_pic_num (=0) is the Bs10 picture of the GOP to which the B11 picture as the current picture in decoding process belongs.

Thereafter, the decoding apparatus ends the operation to assign the reference picture number based on the RPLR command in accordance with the RPLR command #COMMAND==3 at the third place in "203".

"0" at the first place from the head in the third "013" from among "04", "203", and "013" which are issued when the current picture in decoding process is the B11 picture represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the third "013" from among "04", "203", and "013" which are issued when the current picture in decoding process is the B11 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B11 picture as the current picture in decoding process, from among the reference pictures stored in the DPB as an assignment-target picture, and assigns the minimum value from among the values unassigned as the reference picture number at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B11 picture as the current picture in decoding process is the P13 picture of the GOP to which the B11 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 12 or 13, that is, when the current picture in decoding process is the P12 or P13 picture, "023" is issued as the RPLR command and the necessary argument. "0" at the first place from the head in "023" represents an L0 RPLR command #COMMAND==0, and "2" at the second place is the argument of the L0 RPLR command #COMMAND==0. "3" at the third place in "023" represents an RPLR command #COMMAND==3.

With the L0 RPLR command #COMMAND==0 and the subsequent argument "2" in "023" which is issued when the current picture in decoding process is the P12 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P12 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P12 picture as the current picture in decoding process is the P8 picture of the GOP to which the P12 picture as the current picture in decoding process belongs.

Thereafter, the decoding apparatus ends the operation to assign the reference picture number based on the RPLR command in accordance with the RPLR command #COMMAND==3 at the third place in "023".

With the L0 RPLR command #COMMAND==0 and the subsequent argument "2" in "023" which is issued when the current picture in decoding process is the P13 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P13 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P13 picture as the current picture in decoding process is the P9 picture of the GOP to which the P13 picture as the current picture in decoding process belongs.

Thereafter, the decoding apparatus ends the operation to assign the reference picture number based on the RPLR command in accordance with the RPLR command #COMMAND==3 at the third place in "023".

When the remainder POC is 14, that is, when the current picture in decoding process is the Bs14 picture, "043" is issued as the RPLR command and the necessary argument. "0" at the first place from the head in "043" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in "043" which is issued when the current picture in decoding process is the Bs14 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the Bs14 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the Bs14 picture as the current picture in decoding process is the P12 picture of the GOP to which the Bs14 picture as the current picture in decoding process belongs.

Thereafter, the decoding apparatus ends the operation to assign the reference picture number based on the RPLR command in accordance with the RPLR command #COMMAND==3 at the third place in "043".

When the remainder POC is 15, that is, when the current picture in decoding process is the B15 picture, "04", "203", and "013" are sequentially issued as the RPLR command and the necessary argument. "0" at the first place from the head in the first "04" from among "04", "203", and "013" represents the L0 RPLR command #COMMAND==0, and "4" at the second place is the argument of the L0 RPLR command #COMMAND==0.

With the L0 RPLR command #COMMAND==0 and the subsequent argument "4" in the first "04" from among "04", "203", and "013" which are issued when the current picture in decoding process is the B15 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the B15 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the B15 picture as the current picture in decoding process is the P13 picture of the GOP to which the B15 picture as the current picture in decoding process belongs.

"2" at the first place from the head in the second "203" from among "04", "203", and "013" which are issued when the current picture in decoding process is the B15 picture represents an L0 RPLR command #COMMAND==2, and "0" at the second place is the argument of the L0 RPLR command #COMMAND==2. "3" at the third place in "203" represents the RPLR command #COMMAND==3.

With the RPLR command #COMMAND==2 and the subsequent argument "0" in the second "203" from among "04", "203", and "013" which are issued when the current picture in decoding process is the B15 picture, the variable long_term_pic_num is set to 0. Thus, the decoding apparatus picks up a long-term reference picture, in which the index LongFrameIdx for a long-term reference picture is equal to the variable long_term_pic_num, from among the reference pictures stored in the DPB as an assignment-target picture, and assigns the minimum value from among the values unassigned as the reference picture number at that time, that is, 1, to the relevant long-term reference picture as the L0 index.

As described below, when the current picture in decoding process is the B15 picture, from among the reference pictures stored in the DPB, the long-term reference picture in which the index LongFrameIdx for a long-term reference picture is equal to the variable long_term_pic_num (=0) is the Bs14 picture of the GOP to which the B15 picture as the current picture in decoding process belongs.

Thereafter, the decoding apparatus ends the operation to assign the reference picture number based on the RPLR command in accordance with the RPLR command #COMMAND==3 at the third place in "203".

"0" at the first place from the head in the third "013" from among "04", "203", and "013" which are issued when the current picture in decoding process is the B15 picture, represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the third "013" from among "04", "203", and "013" which are issued when the current picture in decoding process is the B15 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B15 picture as the current picture in decoding process, from among the reference pictures stored in the DPB as an assignment-target picture, and assigns the minimum value from among the values unassigned as the reference picture number at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B15 picture as the current picture in decoding process is the P1 (P17) picture of the GOP one GOP after the GOP of the B15 picture as the current picture in decoding process.

Thereafter, the decoding apparatus ends the operation to assign the reference picture number based on the RPLR command in accordance with the RPLR command #COMMAND==3 at the third place in "013".

As described above, with the RPLR command of FIG. 12, when the MMCO command of FIG. 10 is issued, and when the remainder POC is 1, the L0 index of the P13 picture stored in the DPB becomes 0.

When the remainder POC is 2, the L0 index of the I0 picture stored in the DPB becomes 0.

When the remainder POC is 3, the L0 index of the P1 picture stored in the DPB becomes 0, the L0 index of the Bs2 picture stored in the DPB becomes 1, and the L1 index of the P5 picture stored in the DPB becomes 0.

When the remainder POC is 4, the L0 index of the I0 (I16) picture stored in the DPB becomes 0.

When the remainder POC is 5, the L0 index of the P1 picture stored in the DPB becomes 0.

When the remainder POC is 6, the L0 index of the P4 picture stored in the DPB becomes 0.

When the remainder POC is 7, the L0 index of the P5 picture stored in the DPB becomes 0, the L0 index of the Bs6 picture stored in the DPB becomes 1, and the L1 index of the P9 picture stored in the DPB becomes 0.

When the remainder POC is 8, the L0 index of the P4 picture stored in the DPB becomes 0.

When the remainder POC is 9, the L0 index of the P5 picture stored in the DPB becomes 0.

When the remainder POC is 10, the L0 index of the P8 picture stored in the DPB becomes 0.

When the remainder POC is 11, the L0 index of the P9 picture stored in the DPB becomes 0, the L0 index of the Bs10 picture stored in the DPB becomes 1, and the L1 index of the P13 picture stored in the DPB becomes 0.

When the remainder POC is 12, the L0 index of the P8 picture stored in the DPB becomes 0.

When the remainder POC is 13, the L0 index of the P9 picture stored in the DPB becomes 0.

When the remainder POC is 14, the L0 index of the P12 picture stored in the DPB becomes 0.

When the remainder POC is 15, the L0 index of the P13 picture stored in the DPB becomes 0, the L0 index of the Bs14 picture stored in the DPB becomes 1, and the L1 index of the P1 (P17) picture stored in the DPB becomes 0.

[Encoding/Decoding when MMCO Command and RPLR Command are Issued]

FIG. 13 is a diagram illustrating the state of the DPB when the MMCO command of FIG. 10 and the RPLR command of FIG. 12 are issued to encode/decode the frame sequential through AVC.

FIG. 13 shows the display order of the pictures constituting the frame sequential, the encoding/decoding order, the PN, the storage state of the DPB, and the storage state of the display buffer.

The display order of the pictures constituting the frame sequential, the encoding/decoding order, the PN, and the storage state of the display buffer are the same as those in FIGS. 6 and 11, thus description thereof will be omitted.

If it is assumed that, in the encoding apparatus of FIG. 8, the frame sequential is encoded in the encoding order shown in FIG. 13, in the AVC decoding apparatus of FIG. 2, encoded data obtained as a result of encoding is decoded in the decoding order shown in FIG. 13.

It is also assumed that, in the encoding apparatus of FIG. 8, the MMCO command (and the necessary argument) of FIG. 10 and the RPLR command (and the necessary argument) of FIG. 12 are issued, and the MMCO command and the RPLR command are included in encoded data.

In this case, in the AVC decoding apparatus of FIG. 2, when encoded data is decoded, the storage of pictures in the DPB is performed in the same manner as described with reference to FIG. 11.

In the decoding apparatus, the assignment of the reference picture number (L0 index, L1 index) to each of the reference pictures stored in the DPB is performed in accordance with the RPLR command. Thereafter, the reference picture number having the value (preset value) at the AVC default is assigned to a reference picture to which the reference picture number is not assigned.

In FIG. 13, although the assignment of the reference picture number (L0 index, L1 index) to the reference picture is different from FIG. 11, the reference pictures which are stored in the DPB coincides with those in FIG. 11. Thus, in FIG. 13, description of the reference pictures which are stored in the DPB will be appropriately omitted.

Referring to FIG. 13, in the description "L0=integer" and "L1=integer", the underlined description represents the reference picture number (L0 index, L1 index) having a value different from that in FIG. 11.

Referring to FIG. 13, in the description "L0=integer" and "L1=integer", the underlined and italic-type description represents the reference picture number assigned in accordance with the RPLR command, and the underlined but non-italic-type description represents that the assignment of the reference picture number based on the RPLR command is performed, and the reference picture number subsequently assigned at the AVC default is different from that in FIG. 11.

At the time t0, the decoding apparatus picks up the I0 picture of GOP#0 as a current picture in decoding process and decodes the I0 picture.

The I0 picture is a reference picture and, as shown in FIG. 13, the I0 picture after decoding is stored in the DPB.

At the time t1 next to the time t0, the decoding apparatus picks up the P1 picture of GOP#0 as a current picture in decoding process and decodes the P1 picture.

When the P1 picture is decoded, as shown in FIG. 13, the I0 picture is stored in the DPB, and the P1 picture is decoded with reference to the I0 picture stored in the DPB as necessary so as to create the predicted image of L0 prediction.

The remainder POC of the POC of the P1 picture is 1. In this case, as described with reference to FIG. 12, "023" is issued as the RPLR command and the necessary argument, and the reference picture number is assigned to the P13 picture of the GOP one GOP before the GOP of the P1 picture as the current picture in decoding process in accordance with the RPLR command. Meanwhile, when the P1 picture of the first GOP#0 is decoded, the picture of the GOP one GOP before the GOP of the P1 picture as the current picture in decoding process is not stored in the DPB.

For this reason, only for the first GOP#0, when the P1 picture is decoded, exceptionally, the RPLR command "400" is not issued.

Thus, when the P1 picture of GOP#0 is decoded, at the AVC default, the L0 index is assigned to the I0 picture stored in the DPB. That is, similarly to FIG. 11, the L0 index having a value of 0 is assigned to the I0 picture stored in the DPB.

The P1 picture is a reference picture and, as shown in FIG. 13, the P1 picture after decoding is stored in the DPB as a reference picture.

At the time t2 next to the time t1, the decoding apparatus picks up the P4 picture of GOP#0 as a current picture in decoding process and decodes the P4 picture.

When the P4 picture is decoded, as shown in FIG. 13, the I0 and P1 pictures are stored in the DPB, and the P4 picture is decoded with reference to the I0 or P1 picture stored in the DPB as necessary so as to create the predicted image of L0 prediction.

The remainder POC of the POC of the P4 picture is 4. In this case, as described with reference to FIG. 12, "013" is issued as the RPLR command and the necessary argument.

With the RPLR command "013" which is issued when the current picture in decoding process is the P4 picture, as described with reference to FIG. 12, a reference picture which has, as the PN (=CurrPicNum−(abs_diff_pic_num_minus1+1)), a value obtained by subtracting abs_diff_pic_num_minus1+1 (=2) from CurrPicNum which is the PN of the P4 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the P4 picture is 2. Thus, from among the I0 and P1 pictures stored in the DPB, the I0 picture which is a reference picture with PN=2−2=0 is picked up as an assignment-target picture, and the L0 index having a value of 0 is assigned to the I0 picture.

Thereafter, from among the I0 and P1 pictures stored in the DPB, with regard to the P1 picture to which the reference picture number (L0 index) based on the RPLR command is not assigned, at the AVC default, the minimum value from among the values unused as the L0 index at that time, that is, 1 (the L0 index having a value of 0 is assigned to the I0 picture in accordance with the RPLR command), is assigned as the L0 index.

The P4 picture is a reference picture and, as shown in FIG. 13, the P4 picture after decoding is stored in the DPB.

At the time t3 next to the time t2, the decoding apparatus picks up the P5 picture of GOP#0 as a current picture in decoding process and decodes the P5 picture.

When the P5 picture is decoded, as shown in FIG. 13, the I0, P1, and P4 pictures are stored in the DPB, and the P5 picture is decoded with reference to the I0 or P1 and P4 pictures stored in the DPB as necessary so as to create the predicted image of L0 prediction.

The remainder POC of the POC of the P5 picture is 5. In this case, as described with reference to FIG. 12, "013" is issued as the RPLR command and the necessary argument.

With the RPLR command "013" which is issued when the current picture in decoding process is the P5 picture, as described with reference to FIG. 12, a reference picture which has, as the PN (=CurrPicNum−(abs_diff_pic_num_minus1+1)), a value obtained by subtracting abs_diff_pic_num_minus1+1 (=2) from CurrPicNum which is the PN of the P5 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the P5 picture is 3. Thus, from among the I0, P1, and P4 pictures stored in the DPB, the P1 picture which is a reference picture with PN=3−2=1 is picked up as an assignment-target picture, and the L0 index having a value of 0 is assigned to the P1 picture.

Thereafter, from among the I0, P1, and P4 pictures stored in the DPB, with regard to the I0 and P4 pictures to which the reference picture number based on the RPLR command is not assigned, at the AVC default, the L0 index having a value equal to or greater than 1 is assigned.

That is, from among the I0, P1, and P4 pictures stored in the DPB, with regard to the I0 and P4 pictures to which the reference picture number based on the RPLR command is not assigned, as shown in FIG. 13, the assignment is made as follows: the L0 index having a value of 1 is assigned to the P4 picture first closest to the P5 picture as the current picture in decoding process in the decoding order; and the L0 index having a value of 2 is assigned to the I0 picture second closest to the P5 picture in the decoding order.

The P5 picture is a reference picture and, as shown in FIG. 13, the P5 picture after decoding is stored in the DPB.

At the time t4 next to the time t3, the decoding apparatus picks up the Bs2 picture of GOP#0 as a current picture in decoding process and decodes the Bs2 picture.

When the Bs2 picture is decoded, as shown in FIG. 13, the I0, P1, P4, and P5 pictures are stored in the DPB, and the Bs2 picture is decoded with reference to the I0, P1, P4, and P5 pictures stored in the DPB as necessary so as to create the predicted image of L0 prediction or L1 prediction.

The remainder POC of the POC of the Bs2 picture is 2. In this case, as described with reference to FIG. 12, "033" is issued as the RPLR command and the necessary argument.

With the RPLR command "033" which is issued when the current picture in decoding process is the Bs2 picture, as described with reference to FIG. 12, a reference picture which has, as the PN (=CurrPicNum−(abs_diff_pic_num_minus1+1)), a value obtained by subtracting abs_diff_pic_num_minus1+1 (=4) from CurrPicNum which is the PN of the Bs2 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the Bs2 picture is 4. Thus, from among the I0, P1, P4, and P5 pictures stored in the DPB, the I0 picture which is a reference picture with PN=4−4=0 is picked up as an assignment-target picture, and the L0 index having a value of 0 is assigned to the I0 picture.

Thereafter, from the I0, P1, P4, and P5 pictures stored in the DPB, with regard to the P1, P4, and P5 pictures to which the assignment of the L0 index based on the RPLR command is not made, at the AVC default, the L0 index having a value equal to or greater than 1 is assigned.

That is, from among the I0, P1, P4, and P5 pictures stored in the DPB, with regard to the P1, P4, P5 pictures to which the assignment of the L0 index based on the RPLR command is not made, as shown in FIG. 13, the L0 index having a value of 1 is assigned to the P1 picture first closest to the Bs2 picture before the Bs2 picture in the POC order.

From among the I0, P1, P4, and P5 pictures stored in the DPB, with regard to the P1, P4, and P5 pictures to which the assignment of the L0 index based on the RPLR command is not made, as shown in FIG. 13, the assignment is made as follows: the L0 index having a value of 2 is assigned to the P4 picture first closest to the Bs2 picture after the Bs2 picture in the POC order; and the L0 index having a value of 3 is assigned to the P5 picture second closest to the Bs2 picture after the Bs2 picture in the POC order.

With regard to the I0, P1, P4, and P5 pictures stored in the DPB, to which the assignment of the L1 index based on the RPLR command is not made, as in FIG. 11, the assignment is made as follows: the L1 index having a value of 0 is assigned to the P4 picture; the L0 index having a value of 1 is assigned to the P5 picture; the L1 index having a value of 2 is assigned to the P1 picture; and the L1 index having a value of 3 is assigned to the I0 picture.

The Bs2 picture is a reference picture and the Bs2 picture after decoding is stored in the DPB. As a result, as in FIG. 11, the P1, P4, P5, and Bs2 pictures are stored in the DPB.

As described with reference to FIG. 11, the Bs2 picture is set as a long-term reference picture and stored in the DPB. As described with reference to FIG. 10, 0 as the index LongFrameIdx for a long-term reference picture is assigned to the Bs2 picture as the long-term reference picture stored in the DPB in accordance with the MMCO command.

At the time t5 next to the time t4, the decoding apparatus picks up the B3 picture of GOP#0 as a current picture in decoding process and decodes the B3 picture.

When the B3 picture is decoded, as shown in FIG. 13, the P1, P4, P5, and Bs2 pictures are stored in the DPB, and the B3 picture is decoded with reference to the P1, P4, P5, and Bs2 pictures stored in the DPB as necessary so as to create the predicted image of L0 prediction or L1 prediction.

Here, the remainder POC of the POC of the B3 picture is 3. In this case, as described with reference to FIG. 12, "03", "203", and "013" are sequentially issued as the RPLR command and the necessary argument.

With the RPLR command "03" which is issued when the current picture in decoding process is the B3 picture, as described with reference to FIG. 12, a reference picture which has, as the PN (=CurrPicNum−(abs_diff_pic_num_minus1+1)), a value obtained by subtracting abs_diff_pic_num_minus1+1 (=4) from CurrPicNum which is the PN of the B3 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the B3 picture is 5. Thus, from among the P1, P4, P5, and Bs2 pictures stored in the DPB, the P1 picture which is a reference picture with PN=5−4=1 is picked up as an assignment-target picture, and the L0 index having a value of 0 is assigned to the P1 picture.

With the RPLR command "203" which is issued when the current picture in decoding process is the B3 picture, as described with reference to FIG. 12, from among the reference pictures stored in the DPB, a long-term reference picture in which the index LongFrameIdx for a long-term reference picture is equal to the variable long_term_pic_num (=0) is picked up as an assignment-target picture, and the minimum value from among the values unassigned as the L0 index at that time, that is, 1, is assigned to the long-term reference picture as the L0 index.

When the current picture in decoding process is the B3 picture, from the P1, P4, P5, and Bs2 pictures stored in the DPB, the Bs2 picture becomes a long-term reference picture in accordance with the MMCO command described with reference to FIG. 10, and the index LongFrameIdx for a long-term reference picture becomes 0.

Thus, the minimum value from among the values unassigned as the L0 index at that time, that is, 1, is assigned as the L0 index to the Bs2 picture as the long-term reference picture in which the index LongFrameIdx for a long-term reference picture is equal to the variable long_term_pic_num (=0).

With the RPLR command "013" which is issued when the current picture in decoding process is the B3 picture, as described with reference to FIG. 12, a reference picture which has, as the PN (=CurrPicNum−(abs_diff_pic_num_minus1+1)), a value obtained by subtracting abs_diff_pic_num_minus1+1 (=2) from CurrPicNum which is the PN of the B3 picture as the current picture in decoding process is picked up as an assignment-target picture, and the minimum value from among the values unassigned as the L1 index at that time, that is, 0, is assigned to the relevant reference picture as the L1 index.

As shown in FIG. 13, the PN (CurrPicNum) of the B3 picture is 5. Thus, from among the P1, P4, P5, and Bs2 pictures stored in the DPB, the P5 picture which is a reference picture with PN=5−2=3 is picked up as an assignment-target picture, and the L1 index having a value of 0 is assigned to the P5 picture.

Thereafter, from among the P1, P4, P5, and Bs2 pictures stored in the DPB, with regard to the P4 and P5 pictures to which the assignment of the L0 index based on the RPLR command is not made, at the AVC default, the L0 index having a value equal to or greater than 2 is assigned.

That is, from among the P1, P4, P5, and Bs2 pictures stored in the DPB, with regard to the P4 and P5 pictures to which the assignment of the L0 index based on the RPLR command is not made, as shown in FIG. 13, the assignment is made as follows: the L0 index having a value of 2 is assigned to the P4 picture first closest to the B3 picture after the B3 picture in the POC order; and the L0 index having a value 3 is assigned to the P5 picture second closest to the B3 picture after the B3 picture in the POC order.

From among the P1, P4, P5, and Bs2 pictures stored in the DPB, with regard to the P1, P4, and Bs2 pictures to which the assignment of the L1 index based on the RPLR command is not made, at the AVC default, the L1 index having a value equal to or greater than 1 is assigned.

That is, from among the P1, P4, P5, and Bs2 pictures stored in the DPB, specifically, from among the P1, P4, and Bs2 pictures to which the assignment of the L1 index based on the RPLR command is not made, with regard to the P1 and P4 pictures as a short-term reference picture, as shown in FIG. 13, the assignment is made as follows: the L1 index having a value of 1 is assigned to the P4 picture first closest to the B3 picture after the B3 picture in the POC order; and the L1 index having a value of 2 is assigned to the P1 picture first closest to the B3 picture before the B3 picture in the POC order.

Finally, the L1 index having a value of 3 is assigned to the Bs2 picture as the long-term reference picture from among the P1, P4, P5, and Bs2 pictures stored in the DPB, specifically, from among the P1, P4, and Bs2 pictures to which the assignment of the L1 index based on the RPLR command is not made.

The B3 picture is not a reference picture, thus the B3 picture is not stored in the DPB after decoding.

Thus, as shown in FIG. 13, similarly to after the Bs2 picture one picture before the B3 picture in the decoding order has been decoded, the P1, P4, P5, and Bs2 pictures are still stored in the DPB.

At the time t6 next to the time t5, the decoding apparatus picks up the P8 picture of GOP#0 as a current picture in decoding process and decodes the P8 picture.

When the P8 picture is decoded, as shown in FIG. 13, the P1, P4, P5, and Bs2 pictures are stored in the DPB, and the P8 picture is decoded with reference to the P1, P4, P5, and Bs2 pictures stored in the DPB as necessary so as to create the predicted image of L0 prediction.

The remainder POC of the POC of the P8 picture is 8. In this case, as described with reference to FIG. 12, "023" is issued as the RPLR command and the necessary argument.

With the RPLR command "023" which is issued when the current picture in decoding process is the P8 picture, as described with reference to FIG. 12, a reference picture which has, as the PN (=CurrPicNum−(abs_diff_pic_num_minus1+1)), a value obtained by subtracting abs_diff_pic_num_minus1+1 (=3) from CurrPicNum which is the PN of the P8 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the P8 picture is 5. Thus, from among the P1, P4, P5, and Bs2 pictures stored in the DPB, the P4 picture which is a reference picture with PN=5−3=2 is picked up as an assignment-target picture, and the L0 index having a value of 0 is assigned to the P4 picture.

Thereafter, from among the P1, P4, P5, and Bs2 pictures stored in the DPB, with regard to the P1, P5, and Bs2 pictures to which the assignment of the reference picture number based on the RPLR command is not made, at the AVC default, the L0 index having a value equal to or greater than 1 is assigned.

That is, from among the P1, P4, P5, and Bs2 pictures stored in the DPB, specifically, from among the P1, P5, and Bs2 pictures to which the assignment of the L0 index based on the RPLR command is not made, with regard to the P1 and P5 pictures as a short-term reference picture, as shown in FIG. 13, the assignment is made as follows: the L0 index having a value of 1 is assigned to the P5 picture first closest to the P8 picture in the decoding order; and the L0 index having a value of 2 is assigned to the P1 picture second closest to the P8 picture.

Finally, the L0 index having a value of 3 is assigned to the Bs2 picture as a long-term reference picture from among the P1, P4, P5, and Bs2 pictures stored in the DPB, specifically, from among the P1, P5, and Bs2 pictures to which the assignment of the L0 index based on the RPLR command is not made.

The P8 picture is a reference picture and the P8 picture decoding is stored in the DPB.

When the P8 picture is stored in the DPB, as described with reference to FIG. 11, the Bs2 picture as the long-term reference picture stored in the DPB is discarded. As a result, as shown in FIG. 13, the P1, P4, P5, and P8 pictures are stored in the DPB.

At the time t7 next to the time t6, the decoding apparatus picks up the P9 picture of GOP#0 as a current picture in decoding process and decodes the P9 picture.

When the P9 picture is decoded, as shown in FIG. 13, the P1, P4, P5, and P8 pictures are stored in the DPB, and the P9 picture is decoded with reference to the P1, P4, P5, and P8 pictures stored in the DPB as necessary so as to create the predicted image of L0 prediction.

The remainder POC of the POC of the P9 picture is 9. In this case, as described with reference to FIG. 12, "023" is issued as the RPLR command and the necessary argument.

With the RPLR command "023" which is issued when the current picture in decoding process is the P9 picture, as described with reference to FIG. 12, a reference picture which has, as the PN (=CurrPicNum−(abs_diff_pic_num_minus1+1)), a value obtained by subtracting abs_diff_pic_num_minus1+1 (=3) from CurrPicNum which is the PN of the P9 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the P9 picture is 6. Thus, from among the P1, P4, P5, and P8 pictures stored in the DPB, the P5 picture which is a reference picture with PN=6−3=3 is picked up as an assignment-target picture, and the L0 index having a value of 0 is assigned to the P5 picture.

Thereafter, from among the P1, P4, P5, and P8 pictures stored in the DPB, with regard to the P1, P4, and P8 pictures to which the assignment of the reference picture number based on the RPLR command is not made, at the AVC default, the L0 index having a value equal to or greater than 1 is assigned.

That is, from among the P1, P4, P5, and P8 pictures stored in the DPB, with regard to the P1, P4, and P8 pictures to which the assignment of the L0 index based on the RPLR command is not made, as shown in FIG. 13, the assignment is made as follows: the L0 index having a value of 1 is assigned to the P8 picture first closest to the P9 picture in the decoding order; the L0 index having a value of 2 is assigned to the P4 picture second closest to the P9 picture in the decoding order; and the L0 index having a value of 3 is assigned to the P1 picture third closest to the P9 picture in the decoding order.

The P9 picture is a reference picture and, as described with reference to FIG. 11, the P9 picture after decoding is stored in the DPB. As a result, as shown in FIG. 13, the P4, P5, P8, and P9 pictures are stored in the DPB.

At the time t8 next to the time t7, the decoding apparatus picks up the Bs6 picture of GOP#0 as a current picture in decoding process and decodes the Bs6 picture.

When the Bs6 picture is decoded, as shown in FIG. 13, the P4, P5, P8, and P9 pictures are stored in the DPB, and the Bs6 picture is decoded with reference to the P4, P5, P8, and P9 pictures stored in the DPB as necessary so as to create the predicted image of L0 prediction or L1 prediction.

The remainder POC of the POC of the Bs6 picture is 6. In this case, as described with reference to FIG. 12, "043" is issued as the RPLR command and the necessary argument.

With the RPLR command "043" which is issued when the current picture in decoding process is the Bs6 picture, as described with reference to FIG. 12, a reference picture which has, as the PN (=CurrPicNum−(abs_diff_pic_num_minus1+1)), a value obtained by subtracting abs_diff_pic_num_minus1+1 (=5) from CurrPicNum which is the PN of the Bs6 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the Bs6 picture is 7. Thus, from among the P4, P5, P8, and P9 pictures stored in the DPB, the P4 picture which is a reference picture with PN=7−5=2 is picked up as an, assignment-target picture, and the L0 index having a value of 0 is assigned to the P4 picture.

Thereafter, from among the P4, P5, P8, and P9 pictures stored in the DPB, with regard to the P5, P8, and P9 pictures to which the assignment of the L0 index based on the RPLR command is not made, at the AVC default, the L0 index having a value equal to or greater than 1 is assigned.

That is, from among the P4, P5, P8, and P9 pictures stored in the DPB, with regard to the P5, P8, and P9 pictures to which the assignment of the L0 index based on the RPLR command is not made, as shown in FIG. 13, the assignment is made as follows: the L0 index having a value of 1 is assigned to the P5 picture first closest to the Bs6 picture before the Bs6 picture in the POC order; the L0 index having a value of 2 is assigned to the P8 picture first closest to the Bs6 picture after the Bs6 picture in the POC order; and the L0 index having a value of 3 is assigned to the P9 picture second closest to the Bs6 picture after the Bs6 picture in the POC order.

With regard to the P4, P5, P8, and P9 pictures stored in the DPB, to which the assignment of the L1 index based on the RPLR command is not made, at the AVC default, as in FIG. 11, the assignment is made as follows: the L1 index having a value of 0 is assigned to the P8 picture; the L0 index having a value of 1 is assigned to the P9 picture; the L1 index having a value of 2 is assigned to the P5 picture; and the L1 index having a value of 3 is assigned to the P4 picture.

The Bs6 picture is a reference picture and the Bs6 picture after decoding is stored in the DPB. As a result, as in FIG. 11, the P5, P8, P9, and Bs6 pictures are stored in the DPB.

As described with reference to FIG. 11, the Bs6 picture is set as a long-term reference picture and stored in the DPB. With regard to the Bs6 picture as the long-term reference picture stored in the DPB, as described with reference to FIG. 10, 0 is assigned as the index LongFrameIdx for a long-term reference picture in accordance with the MMCO command.

At the time t9 next to the time t8, the decoding apparatus picks up the B7 picture of GOP#0 as a current picture in decoding process and decodes the B7 picture.

When the B7 picture is decoded, as shown in FIG. 13, the P5, P8, P9, and Bs6 pictures are stored in the DPB, and the B7 picture is decoded with reference to the P5, P8, P9, and Bs6 pictures stored in the DPB as necessary so as to create the predicted image of L0 prediction or L1 prediction.

The remainder POC of the POC of the B7 picture is 7. In this case, as described with reference to FIG. 12, "04", "203", and "013" are sequentially issued as the RPLR command and the necessary argument.

With the RPLR command "04" which is issued when the current picture in decoding process is the B7 picture, as described with reference to FIG. 12, a reference picture which has, as the PN (=CurrPicNum−(abs_diff_pic_num_minus1+1)), a value obtained by subtracting abs_diff_pic_num_minus1+1 (=5) from CurrPicNum which is the PN of the B7 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the B7 picture is 8. Thus, from among the P5, P8, P9, and Bs6 pictures stored in the DPB, the P5 picture which is a reference picture with PN=8−5=3 is picked up as an assignment-target picture, and the L0 index having a value of 0 is assigned to the P5 picture.

With the RPLR command "203" which is issued when the current picture in decoding process is the B7 picture, as described with reference to FIG. 12, from among the reference pictures stored in the DPB, a long-term reference picture in which the index LongFrameIdx for a long-term reference picture is equal to the variable long_term_pic_num (=0) is picked up as an assignment-target picture, and the minimum value from among the values unassigned as the L0 index at that time, that is, 1, is assigned to the long-term reference picture as the L0 index.

When the current picture in decoding process is the B7 picture, from among the P5, P8, P9, and Bs6 pictures stored in the DPB, the Bs6 picture becomes a long-term reference picture in accordance with the MMCO command described with reference to FIG. 10, and the index LongFrameIdx for a long-term reference picture becomes 0.

Thus, the minimum value from among the values unassigned as the L0 index at that time, that is, 1, is assigned as the L0 index to the Bs6 picture as the long-term reference picture in which the index LongFrameIdx for a long-term reference picture is equal to the variable long_term_pic_num (=0).

With the RPLR command "013" which is issued when the current picture in decoding process is the B7 picture, as described with reference to FIG. 12, a reference picture which has, as the PN (=CurrPicNum−(abs_diff_pic_num_minus1+1)), a value obtained by subtracting abs_diff_pic_num_minus1+1 (=2) from CurrPicNum which is the PN of the B7 picture as the current picture in decoding process is picked up as an assignment-target picture, and the minimum value from among the values unassigned as the L1 index at that time, that is, 0, is assigned to the relevant reference picture as the L1 index.

As shown in FIG. 13, the PN (CurrPicNum) of the B7 picture is 8. Thus, from among the P5, P8, P9, and Bs6 pictures stored in the DPB, the P9 picture which is a reference picture with PN=8−2=6 is picked up as an assignment-target picture, and the L1 index having a value of 0 is assigned to the P9 picture.

Thereafter, from among the P5, P8, P9, and Bs6 pictures stored in the DPB, with regard to the P8 and P9 pictures to which the assignment of the L0 index based on the RPLR command is not made, at the AVC default, the L0 index having a value equal to or greater than 2 is assigned.

That is, from among the P5, P8, P9, and Bs6 pictures stored in the DPB, with regard to the P8 and P9 pictures to which the assignment of the L0 index based on the RPLR command is not made, as shown in FIG. 13, the assignment is made as follows: the L0 index having a value of 2 is assigned to the P8 picture first closest to the B7 picture after the B7 picture in the POC order; and the L0 index having a value of 3 is assigned to the P9 picture second closest to the B7 picture after the B7 picture in the POC order.

From among the P5, P8, P9, and Bs6 pictures stored in the DPB, with regard to the P5, P8, and Bs6 pictures to which the assignment of the L1 index based on the RPLR command is not made, at the AVC default, the L0 index having a value equal to or greater than 1 is assigned.

That is, from among the P5, P8, P9, and Bs6 pictures stored in the DPB, specifically, from among the P5, P8, and Bs6 pictures to which the assignment of the L1 index based on the RPLR command is not made, with regard to the P5 and P8 pictures as a short-term reference picture, as shown in FIG. 13, the assignment is made as follows: the L1 index having a value of 1 is assigned to the P8 picture first closest to the B7 picture after the B7 picture in the POC order; and the L1 index having a value of 2 is assigned to the P5 picture first closest to the B7 picture before the B7 picture in the POC order.

Finally, the L1 index having a value of 3 is assigned to the Bs6 picture as the long-term reference picture from among the P5, P8, P9, and Bs6 pictures stored in the DPB, specifically, from among the P5, P8, and Bs6 pictures to which the assignment of the L1 index based on the RPLR command is not made.

The B7 picture is not a reference picture, thus the B7 picture is not stored in the DPB after decoding.

Thus, as shown in FIG. 13, similarly to after the Bs6 picture one picture before the B7 picture in the decoding order has been decoded, the P5, P8, P9, and Bs6 pictures are still stored in the DPB.

At the time t10 next to the time t9, the decoding apparatus picks up the P12 picture of GOP#0 as a current picture in decoding process and decodes the P12 picture.

When the P12 picture is decoded, as shown in FIG. 13, the P5, P8, P9, and Bs6 pictures are stored in the DPB, and the P12 picture is decoded with reference to the P5, P8, P9, and Bs6 pictures stored in the DPB as necessary so as to create the predicted image of L0 prediction.

The remainder POC of the POC of the P12 picture is 12. In this case, as described with reference FIG. 12, "023" is issued as the RPLR command and the necessary argument.

With the RPLR command "023" which is issued when the current picture in decoding process is the P12 picture, as described with reference to FIG. 12, a reference picture which has, as the PN (=CurrPicNum−(abs_diff_pic_num_minus1+ 1)), a value obtained by subtracting abs_diff_pic_num_minus1+1 (=3) from CurrPicNum which is the PN of the P12 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the P12 picture is 8. Thus, from among the P5, P8, P9, and Bs6 pictures stored in the DPB, the P8 picture which is a reference picture with PN=8−3=5 is picked up as an assignment-target picture, and the L0 index having a value of 0 is assigned to the P8 picture.

Thereafter, from among the P5, P8, P9, and Bs6 pictures stored in the DPB, with regard to the P5, P9, and Bs6 pictures to which the reference picture number based on the RPLR command is not assigned, at the AVC default, the L0 index having a value equal to or greater than 1 is assigned.

That is, from among the P5, P8, P9, and Bs6 pictures stored in the DPB, specifically, from among the P5, P9, and Bs6 pictures to which the assignment of the L0 index based on the RPLR command is not made, with regard to the P5 and P9 pictures as a short-term reference picture, as shown in FIG. 13, the assignment is made as follows: the L0 index having a value of 1 is assigned to the P9 picture first closest to the P12 picture in the decoding order; and the L0 index having a value of 2 is assigned to the P5 picture second closest to the P12 picture in the decoding order.

Finally, the L0 index having a value of 3 is assigned to the Bs6 picture as the long-term reference picture from among the P5, P8, P9, and Bs6 pictures stored in the DPB, specifically, from among the P5, P9, and Bs6 pictures to which the assignment of the L0 index based on the RPLR command is not made.

The P12 picture is a reference picture and the P12 picture after decoding is stored in the DPB.

When the P12 picture is stored in the DPB, as described with reference to FIG. 11, the Bs6 picture as the long-term reference picture stored in the DPB is discarded. As a result, as shown in FIG. 13, the P5, P8, P9, and P12 pictures are stored in the DPB.

At the time t11 next to the time t10, the decoding apparatus picks up the P13 picture of GOP#0 as a current picture in decoding process and decodes the P13 picture.

When the P13 picture is decoded, as shown in FIG. 13, the P5, P8, P9, and P12 pictures are stored in the DPB, and the P13 picture is decoded with reference to the P5, P8, P9, and P12 pictures stored in the DPB as necessary so as to create the predicted image of L0 prediction.

The remainder POC of the POC of the P13 picture is 13. In this case, as described with reference to FIG. 12, "023" is issued as the RPLR command and the necessary argument.

With the RPLR command "023" which is issued when the current picture in decoding process is the P13 picture, as described with reference to FIG. 12, a reference picture which has, as the PN (=CurrPicNum−(abs_diff_pic_num_minus1+ 1)), a value obtained by subtracting abs_diff_pic_num_minus1+1 (=3) from CurrPicNum which is the PN of the P13 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the P13 picture is 9. Thus, from among the P5, P8, P9, and P12 pictures stored in the DPB, the P9 picture which is a reference picture with PN=9−3=6 is picked up as an assignment-target picture, and the L0 index having a value of 0 is assigned to the P9 picture.

Thereafter, from among the P5, P8, P9, and P12 pictures stored in the DPB, with regard to the P5, P8, and P12 pictures to which the reference picture number based on the RPLR command is not assigned, at the AVC default, the L0 index having a value equal to or greater than 1 is assigned.

That is, from among the P5, P8, P9, and P12 pictures stored in the DPB, with regard to the P5, P8, and P12 pictures to which the assignment of the L0 index based on the RPLR command is not made, as shown in FIG. 13, the assignment is made as follows: the L0 index having a value of 1 is assigned to the P12 picture first closest to the P13 picture in the decoding order; the L0 index having a value of 2 is assigned to the P8 picture second closest to the P13 picture in the decoding order; and the L0 index having a value of 3 is assigned to the P5 picture third closest to the P13 picture in the decoding order.

The P13 picture is a reference picture and, as described with reference to FIG. 11, the P13 picture after decoding is stored in the DPB. As a result, as shown in FIG. 13, the P8, P9, P12, and P13 pictures are stored in the DPB.

At the time t12 next to the time t11, the decoding apparatus picks up the Bs10 picture of GOP#0 as a current picture in decoding process and decodes the Bs10 picture.

When the Bs10 picture is decoded, as shown in FIG. 13, the P8, P9, P12, and P13 pictures are stored in the DPB, and the Bs10 picture is decoded with reference to the P8, P9, P12, and P13 pictures stored in the DPB as necessary so as to create the predicted image of L0 prediction or L1 prediction.

The remainder POC of the POC of the Bs10 picture is 10. In this case, as described with reference to FIG. 12, "043" is issued as the RPLR command and the necessary argument.

With the RPLR command "043" which is issued when the current picture in decoding process is the Bs10 picture, as described with reference to FIG. 12, a reference picture which has, as the PN (=CurrPicNum−(abs_diff_pic_num_minus1+ 1)), a value obtained by subtracting abs_diff_pic_num_minus1+1 (=5) from CurrPicNum which is the PN of the Bs10 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the Bs10 picture is 10. Thus, from among the P8, P9, P12, and P13 pictures stored in the DPB, the P8 picture which is a reference picture with PN=10−5=5 is picked up as an assignment-target picture, and the L0 index having a value of 0 is assigned to the P8 picture.

Thereafter, from among the P8, P9, P12, and P13 pictures stored in the DPB, with regard to the P9, P12, and P13 pictures to which the assignment of the L0 index based on the RPLR command is not made, at the AVC default, the L0 index having a value equal to or greater than 1 is assigned.

That is, from among the P8, P9, P12, and P13 pictures stored in the DPB, with regard to the P9, P12, and P13 pictures to which the assignment of the L0 index based on the RPLR command is not made, as shown in FIG. 13, the assignment is made as follows: the L0 index having a value of 1 is assigned to the P9 picture first closest to the Bs10 picture before the Bs10 picture in the POC order; the L0 index having a value of 2 is assigned to the P12 picture first closest to the Bs10 picture after the Bs10 picture in the POC order; and the L0 index having a value of 3 is assigned to the P13 picture second closest to the Bs10 picture after the Bs10 picture in the POC order.

With regard to the P8, P9, P12, and P13 pictures stored in the DPB, to which the assignment of the L1 index based on the RPLR command is not made, at the AVC default, as in FIG. 11, the assignment is made as follows: the L1 index having a value of 0 is assigned to the P12 picture; the L0 index having a value of 1 is assigned to the P13 picture; the L1 index having a value of 2 is assigned to the P9 picture; and the L1 index having a value of 3 is assigned to the P8 picture.

The Bs10 picture is a reference picture and the Bs10 picture after decoding is stored in the DPB. As a result, as in FIG. 11, the P9, P12, P13, and Bs10 pictures are stored in the DPB.

As described with reference to FIG. 11, the Bs10 picture is set as a long-term reference picture and stored in the DPB. With regard to the Bs10 picture as the long-term reference picture stored in the DPB, as described with reference to FIG. 10, 0 is assigned as the index LongFrameIdx for a long-term reference picture in accordance with the MMCO command.

At the time t13 next to the time t12, the decoding apparatus picks up the B11 picture of GOP#0 as a current picture in decoding process and decodes the B11 picture.

When the B11 picture is decoded, as shown in FIG. 13, the P9, P12, P13, and Bs10 pictures are stored in the DPB, and the B11 picture is decoded with reference to the P9, P12, P13, and Bs10 pictures stored in the DPB as necessary so as to create the predicted image of L0 prediction or L1 prediction.

The remainder POC of the POC of the B11 picture is 11. In this case, as described with reference to FIG. 12, "04", "203", and "013" are sequentially issued as the RPLR command and the necessary argument.

With the RPLR command "04" which is issued when the current picture in decoding process is the B11 picture, as described with reference to FIG. 12, a reference picture which has, as the PN (=CurrPicNum−(abs_diff_pic_num_minus1+1)), a value obtained by subtracting abs_diff_pic_num_minus1+1 (=5) from CurrPicNum which is the PN of the B11 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the B11 picture is 11. Thus, from among the P9, P12, P13, and Bs10 pictures stored in the DPB, the P9 picture which is a reference picture with PN=11−5=6 is picked up as an assignment-target picture, and the L0 index having a value of 0 is assigned to the P9 picture.

With the RPLR command "203" which is issued when the current picture in decoding process is the B11 picture, as described with reference to FIG. 12, from among the reference pictures stored in the DPB, a long-term reference picture in which the index LongFrameIdx for a long-term reference picture is equal to the variable long_term_pic_num (=0) is picked up as an assignment-target picture, and the minimum value from among the values unassigned as the L0 index at that time, that is, 1, is assigned to the long-term reference picture as the L0 index.

When the current picture in decoding process is the B11 picture, from among the P9, P12, P13, and Bs10 pictures stored in the DPB, the Bs10 picture becomes a long-term reference picture in accordance with the MMCO command described with reference to FIG. 10, and the index LongFrameIdx for a long-term reference picture becomes 0.

Thus, with regard to the Bs10 picture as the long-term reference picture in which the index LongFrameIdx for a long-term reference picture is equal to the variable long_term_pic_num (=0), the minimum value from among the values unassigned as the L0 index at that time, that is, 1, is assigned as the L0 index.

With the RPLR command "013" which is issued when the current picture in decoding process is the B11 picture, as described with reference to FIG. 12, a reference picture which has, as the PN (=CurrPicNum−(abs_diff_pic_num_minus1+1)), a value obtained by subtracting abs_diff_pic_num_minus1+1 (=2) from CurrPicNum which is the PN of the B11 picture as the current picture in decoding process is picked up as an assignment-target picture, and the minimum value from among the values unassigned as the L1 index at that time, that is, 0, is assigned to the relevant reference picture as the L1 index.

As shown in FIG. 13, the PN (CurrPicNum) of the B11 picture is 11. Thus, from among the P9, P12, P13, and Bs10 pictures stored in the DPB, the P13 picture which is a reference picture with PN=11−2=9 is picked up as an assignment-target picture, and the L1 index having a value of 0 is assigned to the P13 picture.

Thereafter, from among the P9, P12, P13, and Bs10 pictures stored in the DPB, with regard to the P12 and P13 pictures to which the assignment of the L0 index based on the RPLR command is not made, at the AVC default, the L0 index having a value equal to or greater than 2 is assigned.

That is, from among the P9, P12, P13, and Bs10 pictures stored in the DPB, with regard to the P12 and P13 pictures to which the assignment of the L0 index based on the RPLR command is not made, as shown in FIG. 13, the assignment is made as follows: the L0 index having a value of 2 is assigned to the P12 picture first closest to the B11 picture after the B11 picture in the POC order; and the L0 index having a value of 3 is assigned to the P13 picture second closest to the B11 picture after the B11 picture in the POC order.

From among the P9, P12, P13, and Bs10 pictures stored in DPB, with regard to the P9, P12, and Bs10 pictures to which the assignment of the L1 index based on the RPLR command is not made, at the AVC default, the L0 index having a value equal to or greater than 1 is assigned.

That is, from among the P9, P12, P13, and Bs10 pictures stored in the DPB, specifically, from among the P9, P12, and Bs10 pictures to which the assignment of the L1 index based on the RPLR command is not made, with regard to the P9 and P12 pictures as a short-term reference picture, as shown in FIG. 13, the assignment is made as follows: the L1 index having a value of 1 is assigned to the P12 picture first closest to the B11 picture after the B11 picture in the POC order; and the L1 index having a value of 2 is assigned to the P9 picture first closest to the B11 picture before the B11 picture in the POC order.

From among the P9, P12, P13, and Bs10 pictures stored in the DPB, specifically, from among the P9, P12, and Bs10 pictures to which the assignment of the L1 index based on the RPLR command is not made, with regard to the Bs10 picture as a long-term reference picture, finally, the L1 index having a value of 3 is assigned.

The B11 picture is not a reference picture, thus the B11 picture is not stored in the DPB after decoding.

Thus, as shown in FIG. 13, similarly to after the Bs10 picture one picture before the B11 picture in the decoding order has been decoded, the P9, P12, P13, and Bs10 pictures are still stored in the DPB.

At the time t14 next to the time t13, the decoding apparatus picks up the I16 (I0) picture of GOP#1 as a current picture in decoding process and decodes the I16 picture with no inter prediction.

That is, when the I16 picture is decoded, as shown in FIG. 11, the P9, P12, P13, and Bs10 pictures are stored in the DPB, and the I16 picture is decoded without reference to the P9, P12, P13, and Bs10 pictures stored in the DPB.

The I16 picture is a reference picture and the I16 picture after decoding is stored in the DPB.

When the I16 picture is stored in the DPB, as described with reference to FIG. 11, the Bs10 picture as the long-term reference picture stored in the DPB is discarded. As a result, as shown in FIG. 13, the P9, P12, P13, and I16 pictures are stored in the DPB.

At the time t15 next to the time t14, the decoding apparatus picks up the P17 (P1) picture of GOP#1 as a current picture in decoding process and decodes the P17 picture.

When the P17 picture is decoded, as shown in FIG. 13, the P9, P12, P13, and I16 pictures are stored in the DPB, and the P17 picture is decoded with reference to the P9, P12, P13, and I16 pictures stored in the DPB as necessary so as to create the predicted image of L0 prediction.

The remainder POC of the POC of the P17 picture is 1. In this case, as described with reference to FIG. 12, "023" is issued as the RPLR command and the necessary argument.

With the RPLR command "023" which is issued when the current picture in decoding process is the P17 picture, as described with reference to FIG. 12, a reference picture which has, as the PN (=CurrPicNum−(abs_diff_pic_num_minus1+1)), a value obtained by subtracting abs_diff_pic_num_minus1+1 (=3) from CurrPicNum which is the PN of the P17 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the P17 picture is 12. Thus, from among the P9, P12, P13, and I16 pictures stored in the DPB, the P13 picture which is a reference picture with PN=12−3=9 is picked up as an assignment-target picture, and the L0 index having a value of 0 is assigned to the P13 picture.

Thereafter, from among the P9, P12, P13, and I16 pictures stored in the DPB, with regard to the P9, P12, and I16 pictures to which the reference picture number based on the RPLR command is not assigned, at the AVC default, the L0 index having a value equal to or greater than 1 is assigned.

That is, from among the P9, P12, P13, and I16 pictures stored in the DPB, with regard to the P9, P12, and I16 to which the assignment of the L0 index based on the RPLR command is not made, as shown in FIG. 13, the assignment is made as follows: the L0 index having a value of 1 is assigned to the I16 picture first closest to the P17 picture in the decoding order; the L0 index having a value of 2 is assigned to the P12 picture second closest to the P17 picture in the decoding order; and the L0 index having a value of 3 is assigned to the P9 picture third closest to the P17 picture in the decoding order.

The P17 picture is a reference picture and, as described with reference to FIG. 11, the P17 picture after decoding is stored in the DPB. As a result, as shown in FIG. 13, the P12, P13, I16, and P17 pictures are stored in the DPB.

At the time t16 next to the time t15, the decoding apparatus picks up the Bs14 picture of GOP#0 as a current picture in decoding process and decodes the Bs14 picture.

When the Bs14 picture is decoded, as shown in FIG. 13, the P12, P13, I16, and P17 pictures are stored in the DPB, and the Bs14 picture is decoded with reference to the P12, P13, I16, and P17 pictures stored in the DPB as necessary so as to create the predicted image of L0 prediction or L1 prediction.

The remainder POC of the POC of the Bs14 picture is 14. In this case, as described with reference to FIG. 12, "043" is issued as the RPLR command and the necessary argument.

With the RPLR command "043" which is issued when the current picture in decoding process is the Bs14 picture, as described with reference to FIG. 12, a reference picture which has, as the PN (=CurrPicNum−(abs_diff_pic_num_minus1+1)), a value obtained by subtracting abs_diff_pic_num_minus1+1 (=5) from CurrPicNum which is the PN of the Bs14 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the Bs14 picture is 13. Thus, from among the P12, P13, I16, and P17 pictures stored in the DPB, the P12 picture which is a reference picture with PN=13−5=8 is picked up as an assignment-target picture, and the L0 index having a value of 0 is assigned to the P12 picture.

Thereafter, from among the P12, P13, I16, and P17 pictures stored in the DPB, with regard to the P13, I16, and P17 pictures to which the assignment of the L0 index based on the RPLR command is not made, at the AVC default, the L0 index having a value equal to or greater than 1 is assigned.

That is, from among the P12, P13, I16, and P17 pictures stored in the DPB, with regard to the P13, I16, and P17 pictures to which the assignment of the L0 index based on the RPLR command is not made, as shown in FIG. 13, the assignment is made as follows: the L0 index having a value of 1 is assigned to the P13 picture first closest to the Bs14 picture before the Bs14 picture in the POC order; the L0 index having a value of 2 is assigned to the I16 picture first closest to the Bs14 picture after the Bs14 picture in the POC order; and the L0 index having a value of 3 is assigned to the P17 picture second closest to the Bs14 picture after the Bs14 picture in the POC order.

With regard to the P12, P13, I16, and P17 pictures stored in the DPB, to which the assignment of the L1 index based on the RPLR command is not made, at the AVC default, as in FIG. 11, the assignment is made as follows: the L1 index having a value of 0 is assigned to the I16 picture; the L0 index having a value of 1 is assigned to the P17 picture; the L1 index having a value of 2 is assigned to the P13 picture; and the L1 index having a value of 3 is assigned to the P12 picture.

The Bs14 picture is a reference picture and the Bs14 picture after decoding is stored in the DPB. As a result, as in FIG. 11, the P13, I16, P17, and Bs14 pictures are stored in the DPB.

As described with reference to FIG. 11, the Bs14 picture is set as a long-term reference picture and stored in the DPB. With regard to the Bs14 picture as the long-term reference picture stored in the DPB, as described with reference to FIG. 10, 0 is assigned as the index LongFrameIdx for a long-term reference picture in accordance with the MMCO command.

At the time t17 next to the time t16, the decoding apparatus picks up the B15 picture of GOP#0 as a current picture in decoding process and decodes the B15 picture.

When the B15 picture is decoded, as shown in FIG. 13, the P13, I16, P17, and Bs14 pictures are stored in the DPB, and the B15 picture is decoded with reference to the P13, I16, P17, and Bs14 pictures stored in the DPB as necessary so as to create the predicted image of L0 prediction or L1 prediction.

The remainder POC of the POC of the B15 picture is 15. In this case, as described with reference to FIG. 12, "04", "203", and "013" are sequentially issued as the RPLR command and the necessary argument.

With the RPLR command "04" which is issued when the current picture in decoding process is the B15 picture, as described with reference to FIG. 12, a reference picture which has, as the PN (=CurrPicNum−(abs_diff_pic_num_minus1+1)), a value obtained by subtracting abs_diff_pic_num_minus1+1 (=5) from CurrPicNum which is the PN of the B15 picture as the current picture in decoding process is picked up as an assignment-target picture, and the minimum value from among the values unassigned as the L0 index at that time, that is, 0, is assigned to the relevant reference picture as the L0 index.

As shown in FIG. 13, the PN (CurrPicNum) of the B15 picture is 14. Thus, from among the P13, I16, P17, and Bs14 pictures stored in the DPB, the P13 picture which is a reference picture with PN=14−5=9 is picked up as an assignment-target picture, and the L0 index having a value of 0 is assigned to the P13 picture.

With the RPLR command "203" which is issued when the current picture in decoding process is the B15 picture, as described with reference to FIG. 12, from among the reference pictures stored in the DPB, a long-term reference picture in which the index LongFrameIdx for a long-term reference picture is equal to the variable long_term_pic_num (=0) is picked up as an assignment-target picture, and the minimum value from among the values unassigned as the L0 index at that time, that is, 1, is assigned to the long-term reference picture as the L0 index.

When the current picture in decoding process is the B15 picture, from among the P13, I16, P17, and Bs14 pictures stored in the DPB, the Bs14 picture becomes a long-term reference picture in accordance with the MMCO command described with reference to FIG. 10, and the index LongFrameIdx for a long-term reference picture becomes 0.

Thus, with regard to the Bs14 picture as the long-term reference picture in which the index LongFrameIdx for a long-term reference picture is equal to the variable long_term_pic_num (=0), the minimum value from among the values unassigned as the L0 index at that time, that is, 1, is assigned as the L0 index.

With the RPLR command "013" which is issued when the current picture in decoding process is the B15 picture, as described with reference to FIG. 12, a reference picture which has, as the PN (=CurrPicNum−(abs_diff_pic_num_minus1+1)), a value obtained by subtracting abs_diff_pic_num_minus1+1 (=2) from CurrPicNum which is the PN of the B15 picture as the current picture in decoding process is picked up as an assignment-target picture, and the minimum value from among the values unassigned as the L1 index at that time, that is, 0, is assigned to the relevant reference picture as the L1 index.

As shown in FIG. 13, the PN (CurrPicNum) of the B15 picture is 14. Thus, from among the P13, I16, P17, and Bs14 pictures stored in the DPB, the P17 (P1) picture which is a reference picture with PN=14−2=12 is picked up as an assignment-target picture, and the L1 index having a value of 0 is assigned to the P17 picture.

Thereafter, from among the P13, I16, P17, and Bs14 pictures stored in the DPB, with regard to the I16 and P17 pictures to which the assignment of the L0 index based on the RPLR command is not made, at the AVC default, the L0 index having a value equal to or greater than 2 is assigned.

That is, from among the P13, I16, P17, and Bs14 pictures stored in the DPB, with regard to the I16 and P17 pictures to which the assignment of the L0 index based on the RPLR command is not made, as shown in FIG. 13, the assignment is made as follows: the L0 index having a value of 2 is assigned to the I16 picture first closest to the B15 picture after the B15 picture in the POC order; and the L0 index having a value of 3 is assigned to the P17 picture second closest to the B15 picture after the B15 picture in the POC order.

From among the P13, I16, P17, and Bs14 pictures stored in the DPB, with regard to the P13, I16, and Bs14 pictures to which the assignment of the L1 index based on the RPLR command is not made, at the AVC default, the L0 index having a value equal to or greater than 1 is assigned.

That is, from among the P13, I16, P17, and Bs14 pictures stored in the DPB, specifically, from among the P13, I16, and Bs14 pictures to which the assignment of the L1 index based on the RPLR command is not made, with regard to the P13 and I16 pictures as a short-term reference picture, as shown in FIG. 13, the assignment is made as follows: the L1 index having a value of 1 is assigned to the I16 picture first closest to the B15 picture after the B15 picture in the POC order; and the L1 index having a value of 2 is assigned to the P13 picture first closest to the B15 picture before the B15 picture in the POC order.

From among the P13, I16, P17, and Bs14 pictures stored in the DPB, specifically, from among the P13, I16, and Bs14 pictures to which the assignment of the L1 index based on the RPLR command is not made, with regard to the Bs14 picture as the long-term reference picture, finally, the L1 index having a value of 3 is assigned.

The B15 picture is not a reference picture, thus the B15 picture is not stored in the DPB after decoding.

Thus, as shown in FIG. 13, similarly to after the Bs14 picture one picture before the B15 picture in the decoding order has been decoded, the P13, I16, P17, and Bs14 pictures are still stored in the DPB.

Though not shown in FIG. 13, at the time next to the time t17, the decoding apparatus picks up the P20 (P4) picture of GOP#1 as a current picture in decoding process and decodes the P20 picture.

When the P20 picture is decoded, as shown in FIG. 13, the P13, I16, P17, and Bs14 pictures are stored in the DPB, and the P20 picture is decoded with reference to the P13, I16, P17, and Bs14 pictures stored in the DPB as necessary so as to create the predicted image of L0 prediction.

In this case, the POC of the P20 picture as the current picture in decoding process is 4, and the decoding apparatus assigns the L0 index having a value of 0 to the I16 picture from among the P13, I16, P17, and Bs14 pictures stored in the DPB in accordance with the RPLR command when the POC is 4.

Thereafter, from among the P13, I16, P17, and Bs14 pictures stored in the DPB, with regard to the P13, P17, and Bs14 pictures to which the reference picture number based on the RPLR command is not assigned, at the AVC default, the L0 index having a value equal to or greater than 1 is assigned.

That is, from among the P13, I16, P17, and Bs14 pictures stored in the DPB, specifically, from among the P13, P17, and Bs14 pictures to which the assignment of the L0 index based on the RPLR command is not made, with regard to the P13 and P17 picture as a short-term reference picture, as shown in FIG. 13, the assignment is made as follows: the L0 index having a value of 1 is assigned to the P17 picture first closest to the P20 picture in the decoding order; and the L0 index having a value of 2 is assigned to the P13 picture second closest to the P20 picture.

From among the P13, I16, P17, and Bs14 pictures stored in the DPB, specifically, from among the P13, P17, and Bs14 pictures to which the assignment of the L0 index based on the RPLR command is not made, with regard to the Bs14 picture as the long-term reference picture, finally, the L0 index having a value of 3 is assigned.

As described above, with the RPLR command of FIG. 12, when the MMCO command of FIG. 10 is issued, the assignment of the reference picture number to the reference picture is performed such that the minimum reference picture number, that is, 0, is assigned to a picture, which is a picture of an image at the same viewpoint as the current picture in decoding process from among the L image and the R image and is closest to the current picture in decoding process, from among the pictures which are decoded temporally earlier than the current picture in decoding process and are capable of becoming reference pictures.

With the RPLR command of FIG. 12, when a reference picture which constitutes an LR pair with the current picture in decoding process is stored in the DPB, the reference picture number having a small value is assigned to the relevant reference picture.

Specifically, as described with reference to FIG. 11, for example, at the time t3, when the P5 picture becomes a current picture in decoding process, the I0, P1, and P4 pictures are stored in the DPB.

The P5 picture is a picture of the R image, and from among the I0, P1, and P4 pictures stored in the DPB, a picture which is a picture of the R image at the same viewpoint as and temporally closest to the P5 picture which is the picture of the R image is the P1 picture.

Thus, with regard to the P5 picture, the prediction error of a predicted image which is created with the P1 picture from among the I0, P1, and P4 pictures stored in the DPB as a reference picture is highly likely to be minimized.

From among the I0, P1, and P4 pictures stored in the DPB, with regard to the I0 and P4 pictures which are pictures of the L image at a different viewpoint from the P5 picture of the R image, the P4 picture is temporally closer to the P5 picture than the I0 picture, and constitutes an LR pair with the P5 picture. Thus, the prediction error of a predicted image which is created with the P4 picture as a reference picture is highly likely to be smaller than the prediction error of a predicted image which is created with the I0 picture as a reference picture.

With the above, the I0, P1, and P4 pictures stored in the DPB are highly likely to be used in creating the predicted image of the P5 picture in descending order of the possibility of reduction in the prediction error, that is, in order of the P1, P4, and I0 picture.

Therefore, when the P5 picture becomes a current picture in decoding process, with regard to the I0, P1, and P4 pictures stored in the DPB, the assignment is made as follows: the L0 index having the minimum value, that is, 0, is assigned to the P1 picture; the L0 index having a second largest value, that is, 1, is assigned to the P4 picture; and the L0 index having a third largest value, that is, 2, is assigned to the I0 picture. In this way, a smaller value which is encoded to a code with a smaller code quantity is likely to become a reference picture number representing a reference picture which is referenced when the P5 picture is decoded, thus encoding efficiency may be improved.

However, at the AVC default, as described with reference to FIG. 11, as the L0 index, 1 is assigned to the P1 picture, 0 is assigned to the P4 picture, and 2 is assigned to the I0 picture.

Meanwhile, with the RPLR command of FIG. 12, when the P5 picture becomes a current picture in decoding process (current picture in encoding process), with regard to the I0, P1, and P4 pictures stored in the DPB, the assignment is made as follows: the L0 index having the minimum value, that is, 0, is assigned to the P1 picture; the L0 index having a second largest value, that is, 1, is assigned to the P4 picture; and the L0 index having a third largest value, that is, 2, is assigned to the I0 picture. That is, the L0 index having a smaller value is assigned to a reference picture which is highly likely to reduce the prediction error, thus encoding efficiency may be improved.

As described with reference to FIG. 11, with the MMCO command of FIG. 10, for example, at the time t8, when the Bs6 picture of the L image is inter-predicted, the P4 picture which is the picture of the L image immediately before the Bs6 picture and is highly likely to reduce the prediction error is stored in the DPB. Meanwhile, at the AVC default, 1 which is not the minimum value is assigned to the P4 picture as the L0 index.

Meanwhile, if the RPLR command of FIG. 12 is issued along with the MMCO command of FIG. 10, as described with reference to FIG. 13, when the Bs6 picture is decoded, the minimum value, that is, 0, is assigned as the L0 index to the P4 picture which is highly likely to reduce the prediction error. Thus, the L0 index is highly likely to be encoded to a code with a small code quantity, thus encoding efficiency may be improved.

When the MMCO command and the RPLR command are included in encoded data, in the decoding apparatus of FIG. 2, the invertible decoding unit 42 separates the MMCO command and the RPLR command (including the necessary arguments) included in encoded data from encoded data. The control of the storage of the reference picture in the frame memory 49 corresponding to the DPB, and the assignment of the reference picture number to the reference picture stored in the frame memory 49 corresponding to the DPB are performed in accordance with the MMCO command and the RPLR command.

[Decoding of Encoded Data]

FIG. 14 is a flowchart illustrating processing (decoding processing) for decoding encoded data including the MMCO command FIG. 10 and the RPLR command of FIG. 12 output from the encoding apparatus of FIG. 8 in the decoding apparatus of FIG. 2.

FIG. 15 is a diagram showing the state of the frame memory 49 (FIG. 2) corresponding to the DPB when the processing of FIG. 14 is performed in the decoding apparatus of FIG. 2.

That is, FIG. 15 shows pictures which are stored in the DPB immediately after the steps of FIG. 14 are carried out.

In FIG. 15, the sign including a character "S" and numerals on the left side of four squares indicating the pictures stored in the DPB coincides with the sign attached to each step in the flowchart of FIG. 14. Thus, each of the four squares of FIG. 15 indicate the state of the DPB immediately after the step in the flowchart of FIG. 14 to which the same sign as the sign on the left side of the four squares is attached.

When the processing of the decoding apparatus starts, no picture is stored in the DPB.

In Step S31 of FIG. 14, the decoding apparatus picks up the I0 picture, which is an I picture, as a current picture in decoding process, and carries out decoding of the I0 picture, that is, decoding in the invertible decoding unit 42, inverse quantization in the inverse quantization unit 43, inverse orthogonal transform in the inverse orthogonal transform unit 44, addition to a necessary predicted image in the arithmetic unit 45, and filtering in the deblocking filter 46. Next, the process progresses to Step S32.

In this case, the I0 picture which becomes a current picture in decoding process is the I0 picture of the first GOP which is to be processed in the decoding apparatus. In Step S31, no picture is stored in the DPB. Thus, after Step S31, as shown in FIG. 15, no picture is still stored in the DPB.

In Step S32, the decoding apparatus stores (saves) the I0 picture decoded in Step S31 immediately before in the DPB, and the process progresses to Step S33.

Thus, after Step S32, as shown in FIG. 15, the I0 picture is stored in the DPB.

In Step S33, the decoding apparatus picks up the P1 picture, which is a P picture, as a current picture in decoding process, and assigns the L0 index to a reference picture, to which the L0 index is not assigned, from among the reference pictures stored in the DPB at the AVC default.

In Step S33, decoding of the P1 picture as the current picture in decoding process is carried out with reference to the reference pictures stored in the DPB as necessary. Next, the process progresses to Step S34.

Thus, in Step S33, since no picture is stored in the DPB, after Step S33, as shown in FIG. 15, the I0 picture is still stored in the DPB.

In Step S34, the decoding apparatus stores the P1 picture decoded in Step S33 immediately before in the DPB. Next, the process progresses to Step S35.

Thus, after Step S34, as shown in FIG. 15, the I0 and P1 pictures are stored in the DPB.

In Step S35, the decoding apparatus picks up the P4 picture, which is a P picture, as a current picture in decoding process, and assigns the L0 index to the reference pictures stored in the DPB in accordance with the RPLR command included in encoded data. Thereafter, the decoding apparatus assigns the L0 index to a reference picture, to which the L0 index is not assigned, from among the reference pictures stored in the DPB at the AVC default. Next, the process progresses from Step S35 to Step S36.

Thus, in Step S35, since no picture is stored in the DPB, after Step S35, as shown in FIG. 15, the I0 and P1 pictures are still stored in the DPB.

In Step S36, decoding of the P4 picture as the current picture in decoding process is carried out with reference to the reference pictures stored in the DPB as necessary. Next, the process progresses to Step S37.

Thus, in Step S36, since no picture is stored in the DPB, after Step S36, as shown in FIG. 15, the I0 and P1 pictures are still stored in the DPB.

In Step S37, the decoding apparatus stores the P4 picture decoded in Step S36 immediately before in the DPB. Next, the process progresses to Step S38.

Thus, after Step S37, as shown in FIG. 15, the I0, P1, and P4 pictures are stored in the DPB.

In Step S38, the decoding apparatus picks up the P5 picture, which is a picture next to the P picture decoded immediately before in the decoding order, as a current picture in decoding process, and assigns the L0 index to the reference pictures stored in the DPB in accordance with the RPLR command included in encoded data. Thereafter, the decoding apparatus assigns the L0 index to a reference picture, to which the L0 index is not assigned, from among the reference pictures stored in the DPB at the AVC default. Next, the process progresses from Step S38 to Step S39.

Thus, in Step S38, since no picture is stored in the DPB, after Step S38, as shown in FIG. 15, the I0, P1, and P4 pictures are still stored in the DPB.

In Step S39, decoding of the P5 picture as the current picture in decoding process is carried out with reference to the reference pictures stored in the DPB as necessary. Next, the process progresses to Step S40.

Thus, in Step S39, since no picture is stored in the DPB, after Step S39, as shown in FIG. 15, the I0, P1, and P4 pictures are still stored in the DPB.

In Step S40, the decoding apparatus stores the P5 picture decoded in Step S39 immediately before in the DPB. Next, the process progresses to Step S41.

Thus, after Step S40, as shown in FIG. 15, the I0, P1, P4, and P5 pictures are stored in the DPB.

In Step S41, the decoding apparatus picks up a Bs picture next to the P picture decoded immediately before in the decoding order, for example, the Bs2 picture, as a current picture in decoding process, and assigns the L0 index and the L1 index to the reference pictures stored in the DPB in accordance with the RPLR command included in encoded data. Thereafter, the decoding apparatus assigns the L0 index to a reference picture, to which the L0 index is not assigned, from among the reference pictures stored in the DPB at the AVC default, and also assigns the L1 index to a reference picture, to which the L1 index is not assigned, at the AVC default. Next, the process progresses from Step S41 to Step S42.

Thus, in Step S41, since no picture is stored in the DPB, after Step S41, as shown in FIG. 15, the I0, P1, P4, and P5 pictures are still stored in the DPB.

In Step S42, decoding of the Bs2 picture as the current picture in decoding process is carried out with reference to the reference pictures stored in the DPB as necessary. Next, the process progresses to Step S43.

Thus, in Step S42, since no picture is stored in the DPB, after Step S42, as shown in FIG. 15, the I0, P1, P4, and P5 pictures are still stored in the DPB.

In Step S43, the decoding apparatus sets the Bs picture (in this case, the Bs2 picture) decoded in Step S42 immediately before as a long-term reference picture with the index Long-FrameIdx 0 in accordance with the MMCO command included in encoded data. Next, the process progresses to Step S44.

Thus, in Step S43, since no picture is stored in the DPB, after Step S43, as shown in FIG. 15, the I0, P1, P4, and P5 pictures are still stored in the DPB.

In Step S44, the decoding apparatus stores the Bs2 picture as the long-term reference picture decoded in Step S42 immediately before in the DPB. Next, the process progresses to Step S45.

The DPB has the storage capacity for four pictures, and at present, the four pictures of the I0, P1, P4, and P5 pictures are stored in the DPB. Thus, the Bs2 picture is stored after the oldest I0 picture from among the I0, P1, P4, and P5 pictures stored in the DPB has been released (discarded).

Thus, after Step S44, as shown in FIG. 15, the P1, P4, P5, and Bs2 pictures are stored in the DPB.

In Step S45, the decoding apparatus picks up a B picture next to the Bs picture decoded immediately before in the decoding order, for example, the B3 picture, as a current picture in decoding process, and assigns the L0 index and the L1 index to the reference pictures stored in the DPB in accordance with the RPLR command included in encoded data. Thereafter, the decoding apparatus assigns the L0 index to a reference picture, to which the L0 index is not assigned, from among the reference pictures stored in the DPB at the AVC default, and also assigns the L1 index to a reference picture, to which the L1 index is not assigned, at the AVC default. Next, the process progresses from Step S45 to Step S46.

Thus, in Step S45, since no picture is stored in the DPB, after Step S45, as shown in FIG. 15, the P1, P4, P5, and Bs2 pictures are still stored in the DPB.

In Step S46, decoding of the B3 picture as the current picture in decoding process is carried out with reference to the reference pictures stored in the DPB as necessary. Next, the process progresses to Step S47.

Thus, in Step S46, since no picture is stored in the DPB, after Step S46, as shown in FIG. 15, the P1, P4, P5, and Bs2 pictures are still stored in the DPB.

In Step S47, the decoding apparatus determines whether or not the last picture of the GOP in the decoding order is decoded.

In Step S47, when it is determined that the last picture of the GOP is not yet decoded, the process progresses to Step S48. Then, the decoding apparatus picks up a P picture next to the B picture decoded immediately before in the decoding order, for example, the P8 picture, as a current picture in decoding process, and assigns the L0 index to the reference pictures stored in the DPB in accordance with the RPLR command included in encoded data. Thereafter, the decoding apparatus assigns the L0 index to a reference picture, to which the L0 index is not assigned, from among the reference pictures stored in the DPB at the AVC default. Next, the process progresses from Step S48 to Step S49.

Thus, in Steps S47 and S48, since no picture is stored in the DPB, after any of Step S47 and S48, as shown in FIG. 15, the P1, P4, P5, and Bs2 pictures are still stored in the DPB.

In Step S49, decoding of the P8 picture as the current picture in decoding process is carried out with reference to the reference pictures stored in the DPB as necessary. Next, the process progresses to Step S50.

Thus, in Step S49, since no picture is stored in the DPB, after Step S49, as shown in FIG. 15, the P1, P4, P5, and Bs2 pictures are still stored in the DPB.

In Step S50, the decoding apparatus sets the upper limit value MaxLongTermFrameIdx (Maximum long-term frame index) of the index LongFrameIdx for a long-term reference picture to −1 in accordance with the MMCO command included in encoded data. Next, the process progresses to Step S51.

In Step S50, the upper limit value MaxLongTermFrameIdx is set to −1, such that the Bs picture, which is set as the long-term reference picture immediately before, from among the reference pictures stored in the DPB, for example, the Bs2 picture, is discarded. Thus, after Step S50, as shown in FIG. 15, the P1, P4, and P5 pictures are stored in the DPB.

In Step S51, the decoding apparatus stores the P8 picture decoded in Step S49 immediately before in the DPB.

Thus, after Step S51, as shown in FIG. 15, the P1, P4, P5, and P8 pictures are stored in the DPB.

After Step S51, the process progresses to Step S52. Then, the decoding apparatus picks up a P picture next to the P picture decoded immediately before in the decoding order, for example, the P9 picture, as a current picture in decoding process, and assigns the L0 index to the reference pictures stored in the DPB in accordance with the RPLR command included in encoded data. Thereafter, the decoding apparatus assigns the L0 index to a reference picture, to which the L0 index is not assigned, from among the reference pictures stored in the DPB at the AVC default. Next, the process progresses from Step S52 to Step S53.

Thus, in Step S52, since no picture is stored in the DPB, after Step S52, as shown in FIG. 15, the P1, P4, P5, and P8 pictures are still stored in the DPB.

In Step S53, decoding of the P9 picture as the current picture in decoding process is carried out with reference to the reference pictures stored in the DPB as necessary. Next, the process progresses to Step S54.

Thus, in Step S53, since no picture is stored in the DPB, after Step S53, as shown in FIG. 15, the P1, P4, P5, and P8 pictures are still stored in the DPB.

In Step S54, the decoding apparatus stores the P9 picture decoded in Step S53 immediately before in the DPB.

Thus, after Step S54, as shown in FIG. 15, the P4, P5, P8, and P9 pictures are stored in the DPB.

After Step S54, the process returns to Step S41. Then, the decoding apparatus picks up a Bs picture next to the P picture decoded immediately before, for example, the Bs6 picture, as a current picture in decoding process, and repeats the same processing hereinafter.

In Step S47, when it is determined that the last picture of the GOP is decoded, the process progresses to Step S55. Then, the decoding apparatus picks up the I0 picture, which is an I picture of the next GOP, as a current picture in decoding process and decodes the I0 picture. Next, the process progresses to Step S56.

In Step S56, the decoding apparatus sets the upper limit value MaxLongTermFrameIdx (Maximum long-term frame index) of the index LongFrameIdx for a long-term reference picture to −1 in accordance with the MMCO command included in encoded data. Next, the process progresses to Step S57.

In Step S56, the upper limit value MaxLongTermFrameIdx is set to −1, such that the long-term reference picture stored in the DPB is discarded.

In Step S57, the decoding apparatus stores (saves) the I0 picture decoded in Step S55 immediately before in the DPB. Next, the process progresses to Step S58.

In Step S58, the decoding apparatus picks up the P1 picture, which is a P picture next to the I picture decoded immediately before in the decoding order, as a current picture in decoding process, and assigns the L0 index to the reference pictures stored in the DPB in accordance with the RPLR command included in encoded data. Thereafter, the decoding apparatus assigns the L0 index to a reference picture, to which the L0 index is not assigned, from among the reference pictures stored in the DPB at the AVC default. Next, the process progresses from Step S58 to Step S59.

In Step S59, decoding of the P1 picture as the current picture in decoding process is carried out with reference to the reference pictures stored in the DPB as necessary. Next, the process progresses to Step S60.

In Step S60, the decoding apparatus stores the P1 picture decoded in Step S59 immediately before in the DPB.

After Step S60, the process returns to Step S41. Then, the decoding apparatus picks up a Bs picture next to the P picture decoded immediately before in the decoding order as a current picture in decoding process, and repeats the same processing hereinafter.

[Second Storage Control]

FIG. 16 is a diagram illustrating second storage control which is an example of storage control by the storage control unit 71 (FIG. 8).

In the second storage control, the storage control unit 71 issues an MMCO command which, as described with reference to FIG. 4, with regard to the frame sequential, in which one GOP is constituted, for example, by the 16 pictures of the I0, P1, Bs2, B3, P4, P5, Bs6, B7, P8, P9, Bs10, B11, P12, P13, Bs14, and B15 pictures, when the remainder POC of the POC of a current picture in decoding process (current picture in encoding process) is 0, 4, 8, or 12, releases a Bs picture, the POC of which corresponds to a value (POC−6) obtained by subtracting 6 from the POC of the current picture in decoding process, from among the pictures stored in the DPB and sets the released Bs picture as a non-reference picture.

FIG. 16 shows a list of MMCO commands which are issued as the second storage control by the storage control unit 71.

With regard to the second storage control, similarly to the first storage control, description will be provided appropriately replacing the operation in the encoding apparatus of FIG. 8 to store the reference pictures in the frame memory 22 through the second storage control by the storage control unit 71 with the operation in the decoding apparatus of FIG. 2 to store the reference pictures in (the frame memory 49 corresponding to) the DPB.

In the list of FIG. 16, the columns "POC", "MMCO command", and "details" represent the same contents as in FIG. 10.

Referring to FIG. 16, when the remainder POC is 0, 4, 8, or 12, the MMCO command as the second storage control is issued.

With regard to second storage control, the condition that the remainder POC is 0, 4, 8, or 12 becomes the condition for determination in Step S12 of FIG. 9 under which the storage control is performed.

As described with reference to FIG. 4, with regard to the frame sequential in which one GOP is constituted by the 16 pictures of the I0, P1, Bs2, B3, P4, P5, Bs6, B7, P8, P9, Bs10, B11, P12, P13, Bs14, and B15 pictures, the condition that the remainder POC is 0, 4, 8, or 12 means that the current picture in encoding process (current picture in decoding process) is the I0, P4, P8, or P12 picture.

When the remainder POC is one of 0, 4, 8, and 12, the storage control unit 71 issues "100" as the MMCO command (and the necessary argument).

"1" at the first place from the head in "100" represents an MMCO command #COMMAND==1, and "0" at the second place is the argument of the MMCO command #COMMAND==1. "0" at the third place in "100" represents an MMCO command #COMMAND==0.

With the MMCO command #COMMAND==1 at the first place in "100" and the subsequent argument "0", as described with reference to FIG. 10, a reference picture (short-term reference picture) designated by the argument is released (becomes a non-reference picture).

That is, in the decoding apparatus, a variable difference_of_pic_nums_minus1 for designating a reference picture to be released from the DPB is set to 0 which is the argument, a reference picture which has, as the PN, a value obtained by the variable difference_of_pic_nums_minus1+1 from the PN of the current picture in decoding process is released from the DPB.

Thereafter, the decoding apparatus ends the operation for the DPB through the adaptive memory control process in accordance with the MMCO command #COMMAND==0 at the third place in "100".

According to the list of FIG. 16, as described above, when the remainder POC is 0, 4, 8, or 12, "100" is issued as the MMCO command and the necessary argument.

The condition that the remainder POC is 0, 4, 8, or 12 means that the current picture in decoding process is the I0, P4, P8, or P12 picture in one GOP. Thus, after the I0, P4, P8, and P12 pictures have become a current picture in decoding process and have been decoded, a reference picture stored in the DPB, which is designated by the variable difference_of_pic_nums_minus1 is released.

If it is assumed that the PN of the current picture in decoding process (current picture in encoding process) is expressed by CurrPicNum, a picture the PN of which is expressed by the expression PN=CurrPicNum−(difference_of_pic_nums_minus1+1) becomes a reference picture (hereinafter, also referred to as a release-target picture) which is designated by the variable difference_of_pic_nums_minus1.

With the argument "0" subsequent to the MMCO command #COMMAND==1 at the first place in "100", the variable difference_of_pic_nums_minus1 is set to 0. Thus, a reference picture the PN of which is expressed by the expression PN=CurrPicNum−1 becomes a release-target picture.

The PN is as shown in FIG. 6 (FIGS. 11 and 13). When the I16 (I0) picture (a picture with remainder POC=0) of GOP#j becomes a current picture in decoding process, as shown in FIG. 6, since CurrPicNum which is the PN of the I16 picture is 11, the Bs10 picture with PN=11−1=10 of GOP#j−1 one GOP before GOP#j becomes a release-target picture and is released.

When the P20 (P4) picture (a picture with remainder POC=4) of GOP#j becomes a current picture in decoding process, CurrPicNum which is the PN of the P20 picture is 14, the Bs14 picture with PN=14−1=13 of GOP#j−1 one GOP before GOP#j becomes a release-target picture and is released.

When the P8 picture (a picture with remainder POC=8) of GOP#j becomes a current picture in decoding process, as shown in FIG. 6, since CurrPicNum which is the PN of the P8 picture is 5, the Bs2 picture with PN=5−1=4 of GOP#j becomes a release-target picture and is released.

When the P12 picture (a picture with remainder POC=12) of GOP#j becomes a current picture in decoding process, as shown in FIG. 6, since CurrPicNum which is the PN of the P12 picture is 8, the Bs6 picture with PN=8−1=7 of GOP#j becomes a release-target picture and is released.

As described above, according to the list of FIG. 16, when the I0 (I16), P4 (P20), P8, and P12 pictures are decoded, the Bs10, Bs14, Bs2, and Bs6 pictures stored in the DPB respectively become a release-target picture and are released.

The POC of the I16 (I0) picture is 16, and when the I16 (I0) picture becomes a current picture in decoding process, the POC of the Bs10 picture as a release-target picture is 10 (=16−6).

The POC of the P20 (P4) picture is 20, and when the P20 (P4) picture becomes a current picture in decoding process, the POC of the Bs14 picture as a release-target picture is 14 (=20−6).

The POC of the P8 picture is 8, and when the P8 picture becomes a current picture in decoding process, the POC of the Bs2 picture as a release-target picture is 2 (=8−6).

The POC of the P12 picture is 12, and when the P12 picture becomes a current picture in decoding process, the POC of the Bs6 picture as a release-target picture is 6 (=12−6).

Thus, according to the list of FIG. 16, when the remainder POC of the POC of the current picture in decoding process (current picture in encoding process) is 0, 4, 8, or 12, a Bs picture the POC of which corresponds to the value (POC−6) obtained by subtracting 6 from the POC of the current picture in decoding process is released.

[Encoding/Decoding when MMCO Command is Issued]

FIG. 17 is a diagram illustrating the state of the DPB when the MMCO command and the necessary argument of FIG. 16 are issued to encode/decode the frame sequential through AVC.

FIG. 17 shows the display order of the pictures constituting the frame sequential, the encoding/decoding order, the PN, the storage state of the DPB, and the storage state of the display buffer.

The display order of the pictures constituting the frame sequential, the encoding/decoding order, the PN, and the storage state of the display buffer are the same as those in FIG. 6, thus description thereof will be omitted.

If it is assumed that, in the encoding apparatus of FIG. 8, the frame sequential is encoded in the encoding order of FIG. 17, encoded data obtained as a result of encoding is decoded in the decoding order of FIG. 17 in the AVC decoding apparatus of FIG. 2.

It is also assumed that the encoding apparatus of FIG. 8 issues the MMCO command (and the necessary argument) of FIG. 16, and the MMCO command is included in encoded data.

However, it is assumed that no RPLR command is included in encoded data.

In this case, in the AVC decoding apparatus of FIG. 2, in decoding encoded data, the DPB is managed through the adaptive memory control process when a picture with the MMCO command issued is decoded, and is managed through the sliding window memory control process when a picture with no MMCO command issued is decoded.

In the decoding apparatus, the values (preset values) at the AVC default are assigned to the reference pictures stored in the DPB, as the reference picture number (L0 index) for L0 prediction and the reference picture number (L1 index) for the L1 prediction.

At the time t0, the decoding apparatus picks up the I0 picture of GOP#0 as a current picture in decoding process and decodes the I0 picture.

The I0 picture is a reference picture and, as shown in FIG. 17, the I0 picture after decoding is stored in the DPB.

The POC of the I0 picture is 0 and hence the remainder POC is 0. Thus, according to the second storage control of FIG. 16, the MMCO command (and the necessary argument) "100" is issued. As a result, a reference picture with the PN of CurrPicNum−1 stored in the DPB is released. Meanwhile, when the I0 picture of the first GOP#0 is decoded, the reference picture with the PN of CurrPicNum−1 is not yet stored in the DPB.

For this reason, only for the first GOP#0, exceptionally, when the I0 picture is decoded, the release of the reference picture is not carried out (is unable to be carried out).

At the time t1 next to the time t0, the decoding apparatus picks up the P1 picture of GOP#0 as a current picture in decoding process and decodes the P1 picture.

When the P1 picture is decoded, as shown in FIG. 17, the I0 picture is stored in the DPB, and the P1 picture is decoded with reference to the I0 picture stored in the DPB as necessary so as to create the predicted image of L0 prediction.

At the AVC default, when the P1 picture is decoded, as shown in FIG. 17, the L0 index having a value of 0 is assigned to the I0 picture stored in the DPB.

The P1 picture is a reference picture and, as shown in FIG. 17, the P1 picture after decoding is stored in the DPB as a reference picture.

At the time t2 next to the time t1, the decoding apparatus picks up the P4 picture of GOP#0 as a current picture in decoding process and decodes the P4 picture.

When the P4 picture is decoded, as shown in FIG. 17, the I0 and P1 pictures are stored in the DPB, and the P4 picture is decoded with reference to the I0 and P1 pictures stored in the DPB as necessary so as to create the predicted image of L0 prediction.

At the AVC default, as shown in FIG. 17, when the P4 picture is decoded, with regard to the I0 and P1 pictures stored in the DPB, the assignment is made as follows: the L0 index having a value of 0 is assigned to the P1 picture first closest to the P4 picture in the decoding order; and the L0 index having a value of 1 is assigned to the I0 picture second closest to the P4 picture in the decoding order.

The P4 picture is a reference picture and, as shown in FIG. 17, the P4 picture after decoding is stored in the DPB.

The POC of the P4 picture is 4 and hence the remainder POC is 4. Thus, according to the second storage control of FIG. 16, the MMCO command "100" is issued. As a result, a reference picture with the PN of CurrPicNum−1 stored in the DPB is released. Meanwhile, when the P4 picture of the first GOP#0 is decoded, the reference picture with the PN of CurrPicNum−1 is not yet stored in the DPB.

For this reason, only for the first GOP#0, exceptionally, when P4 picture is decoded, the release of the reference picture is not carried out.

At the time t3 next to the time t2, the decoding apparatus picks up the P5 picture of GOP#0 as a current picture in decoding process and decodes the P5 picture.

When the P5 picture is decoded, as shown in FIG. 17, the I0, P1, and P4 pictures are stored in the DPB, and the P5 picture is decoded with reference to the I0, P1, and P4 pictures stored in the DPB as necessary so as to create the predicted image of L0 prediction.

At the AVC default, as shown in FIG. 17, when the P5 picture is decoded, with regard to the I0, P1, and P4 pictures stored in the DPB, the assignment is made as follows: the L0 index having a value of 0 is assigned to the P4 picture first closest to the P5 picture in the decoding order; the L0 index having a value of 1 is assigned to the P1 picture second closest to the P5 picture in the decoding order; and the L0 index having a value of 2 is assigned to the I0 picture third closest to the P5 picture in the decoding order.

The P5 picture is a reference picture and, as shown in FIG. 17, the P5 picture after decoding is stored in the DPB.

At the time t4 next to the time t3, the decoding apparatus picks up the Bs2 picture of GOP#0 as a current picture in decoding process and decodes the Bs2 picture.

When the Bs2 picture is decoded, as shown in FIG. 17, the I0, P1, P4, and P5 pictures are stored in the DPB, and the Bs2 picture is decoded with reference to the I0 or P1, P4, and P5 pictures stored in the DPB as necessary so as to create the predicted image of L0 prediction or L1 prediction.

At the AVC default, when the Bs2 picture is decoded, with regard to the I0, P1, P4, and P5 pictures stored in the DPB, as shown in FIG. 17, the assignment is made as follows: the L0 index having a value of 0 is assigned to the P1 picture first closest to the Bs2 picture before the Bs2 picture in the POC order; and the L0 index having a value of 1 is assigned to the I0 picture second closest to the Bs2 picture before the Bs2 picture in the POC order.

At the AVC default, with regard to the I0, P1, P4, and P5 pictures stored in the DPB, as shown in FIG. 17, the assignment is made as follows: the L0 index having a value of 2 is assigned to the P4 picture first closest to the Bs2 picture after the Bs2 picture in the POC order; and the L0 index having a value of 3 is assigned to the P5 picture second closest to the Bs2 picture after the Bs2 picture in the POC order.

At the AVC default, with regard to the I0, P1, P4, and P5 pictures stored in the DPB, as shown in FIG. 17, the assignment is made as follows: the L1 index having a value of 0 is assigned to the P4 picture first closest to the Bs2 picture after the Bs2 picture in the POC order; and the L0 index having a value of 1 is assigned to the P5 picture second closest to the Bs2 picture after the Bs2 picture in the POC order.

At the AVC default, with regard to the I0, P1, P4, and P5 pictures stored in the DPB, as shown in FIG. 17, the assignment is made as follows: the L1 index having a value of 2 is assigned to the P1 picture first closest to the Bs2 picture before the Bs2 picture in the POC order; and the L1 index having a value of 3 is assigned to the I0 picture second closest to the Bs2 picture before the Bs2 picture in the POC order.

The Bs2 picture is a reference picture and the Bs2 picture after decoding is stored in the DPB.

When the Bs2 picture is stored in the DPB, the four pictures of the I0, P1, P4, and P5 pictures are stored in the DPB as much as the storage capacity allows. For this reason, in the decoding apparatus, the oldest I0 picture from among the I0, P1, P4, and P5 pictures stored in the DPB is released through the sliding window memory control process.

Thereafter, the Bs2 picture after decoding is stored in the DPB, and as a result, as shown in FIG. 17, the P1, P4, P5, and Bs2 pictures are stored in the DPB.

At the time t5 next to the time t4, the decoding apparatus picks up the B3 picture of GOP#0 as a current picture in decoding process and decodes the B3 picture.

When the B3 picture is decoded, as shown in FIG. 17, the P1, P4, P5, and Bs2 pictures are stored in the DPB, and the B3 picture is decoded with reference to the P1, P4, P5, and Bs2 pictures stored in the DPB as necessary so as to create the predicted image of L0 prediction or L1 prediction.

At the AVC default, when the B3 picture is decoded, the P1, P4, P5, and Bs2 pictures stored in the DPB are all a short-term reference picture. With regard to the P1, P4, P5, and Bs2 pictures, as shown in FIG. 17, the assignment is made as follows: the L0 index having a value of 0 is assigned to the Bs2 picture first closest to the B3 picture before the B3 picture in the POC order; the L0 index having a value of 1 is assigned to the P1 picture second closest to the B3 picture before the B3 picture in the POC order; the L0 index having a value of 2 is assigned to the P4 picture first closest to the B3 picture after the B3 picture in the POC order; and the L0 index having a value of 3 is assigned to the P5 picture second closest to the B3 picture after the B3 picture in the POC order.

At the AVC default, with regard to the P1, P4, P5, and Bs2 pictures as the short-term reference picture stored in the DPB, as shown in FIG. 17, the assignment is made as follows: the L1 index having a value of 0 is assigned to the P4 picture first closest to the B3 picture after the B3 picture in the POC order; the L1 index having a value of 1 is assigned to the P5 picture second closest to the B3 picture after the B3 picture in the POC order; the L1 index having a value of 2 is assigned to the Bs2 picture first closest to the B3 picture before the B3 picture in the POC order; and the L1 index having a value of 3 is assigned to the P1 picture second closest to the B3 picture before the B3 picture in the POC order.

The B3 picture is not a reference picture, thus the B3 picture is not stored in the DPB after decoding.

Thus, as shown in FIG. 17, similarly to after the Bs2 picture one picture before the B3 picture in the decoding order has been decoded, the P1, P4, P5, and Bs2 pictures are still stored in the DPB.

At the time t6 next to the time t5, the decoding apparatus picks up the P8 picture of GOP#0 as a current picture in decoding process and decodes the P8 picture.

When the P8 picture is decoded, as shown in FIG. 17, the P1, P4, P5, and Bs2 pictures are stored in the DPB, and the P8 picture is decoded with reference to the P1 or P4, P5, and Bs2 pictures stored in the DPB as necessary so as to create the predicted image of L0 prediction.

At the AVC default, when the P8 picture is decoded, with regard to the P1, P4, P5, and Bs2 pictures as the short-term reference picture stored in the DPB, as shown in FIG. 17, the assignment is made as follows: the L0 index having a value of 0 is assigned to the Bs2 picture first closest to the P8 picture in the decoding order; the L0 index having a value of 1 is assigned to the P5 picture second closest to the P8 picture in the decoding order; the L0 index having a value of 2 is assigned to the P4 picture third closest to the P8 picture in the decoding order; and the L0 index having a value of 3 is assigned to the P1 picture fourth closest to the P8 picture in the decoding order.

The POC of the P8 picture is 8 and hence the remainder POC is 8. Thus, according to the second storage control of FIG. 16, the MMCO command "100" is issued. As a result, from among the P1, P4, P5, and Bs2 pictures stored in the DPB, a reference picture with the PN of CurrPicNum−1 is released through the adaptive memory control process.

That is, in this case, since the current picture in decoding process is the P8 picture, and CurrPicNum which is the PN of the P8 picture is 5, the Bs2 picture with the PN of 4 (=5−1) is released.

The P8 picture is a reference picture, and the P8 picture after decoding is stored in the DPB after the Bs2 picture is released.

As a result, as shown in FIG. 17, the P1, P4, P5, and P8 pictures are stored in the DPB.

At the time t7 next to the time t6, the decoding apparatus picks up the P9 picture of GOP#0 as a current picture in decoding process and decodes the P9 picture.

When the P9 picture is decoded, as shown in FIG. 17, the P1, P4, P5, and P8 pictures are stored in the DPB, and the P9 picture is decoded with reference to the P1, P4, P5, and P8 pictures stored in the DPB as necessary so as to create the predicted image of L0 prediction.

At the AVC default, when the P9 picture is decoded, with regard to the P1, P4, P5, and P8 pictures as the short-term reference picture stored in the DPB, as shown in FIG. 17, the assignment is made as follows: the L0 index having a value of 0 is assigned to the P8 picture first closest to the P9 picture in the decoding order; the L0 index having a value of 1 is assigned to the P5 picture second closest to the P9 picture in the decoding order; the L0 index having a value of 2 is assigned to the P4 picture third closest to the P9 picture in the decoding order; and the L0 index having a value of 3 is assigned to the P1 picture fourth closest to the P9 picture in the decoding order.

The P9 picture is a reference picture and the P9 picture after decoding is stored in the DPB.

When the P9 picture is stored in the DPB, the four pictures of the P1, P4, P5, and P8 pictures are stored in the DPB as much as the storage capacity allows. For this reason, in the decoding apparatus, the oldest P1 picture from among the P1, P4, P5, and P8 pictures stored in the DPB is released through the sliding window memory control process.

Thereafter, the P9 picture after decoding is stored in the DPB, and as a result, as shown in FIG. 17, the P4, P5, P8, and P9 pictures are stored in the DPB.

At the time t8 next to the time t7, the decoding apparatus picks up the Bs6 picture of GOP#0 as a current picture in decoding process and decodes the Bs6 picture.

When the Bs6 picture is decoded, as shown in FIG. 17, the P4, P5, P8, and P9 pictures are stored in the DPB, and the Bs6 picture is decoded with reference to the P4, P5, P8, and P9 pictures stored in the DPB as necessary so as to create the predicted image of L0 prediction or L1 prediction.

Referring to FIG. 17, when the Bs6 picture of the L image is decoded at the time t8, the P4 picture which is the picture of the L image and is closest to and temporally earlier than the Bs6 picture in the display order is stored in the DPB.

Thus, in the case of forward prediction as L0 prediction of the Bs6 picture, the P4 picture stored in the DPB can be referenced, thus encoding efficiency can be improved compared to a case where the P4 picture is unable to be referenced, as described in FIGS. 6 and 7.

When the Bs6 picture is decoded, at the AVC default, with regard to the P4, P5, P8, and P9 pictures as a short-term reference picture stored in the DPB, as shown in FIG. 17, the assignment is made as follows: the L0 index having a value of 0 is assigned to the P5 picture first closest to the Bs6 picture before the Bs6 picture in the POC order; the L0 index having a value of 1 is assigned to the P4 picture second closest to the B3 picture before the Bs6 picture in the POC order; the L0 index having a value of 2 is assigned to the P8 picture first closest to the B3 picture after the Bs6 picture in the POC order; and the L0 index having a value of 3 is assigned to the P9 picture second closest to the Bs6 picture after the Bs6 picture in the POC order.

At the AVC default, with regard to the P4, P5, P8, and P9 pictures as a short-term reference picture stored in the DPB, as shown in FIG. 17, the assignment is made as follows: the L1 index having a value of 0 is assigned to the P8 picture first closest to the B3 picture after the Bs6 picture in the POC order; the L1 index having a value of 1 is assigned to the P9 picture second closest to the Bs6 picture after the Bs6 picture in the POC order; the L1 index having a value of 2 is assigned to the P5 picture first closest to the Bs6 picture before the Bs6 picture in the POC order; and the L1 index having a value of 3 is assigned to the P4 picture second closest to the B3 picture before the Bs6 picture in the POC order.

The Bs6 picture is a reference picture and the Bs6 picture after decoding is stored in the DPB.

When the Bs6 picture is stored in the DPB, the four pictures of the P4, P5, P8, and P9 pictures are stored in the DPB as much as the storage capacity allows. For this reason, in the decoding apparatus, the oldest P4 picture from among the P4, P5, P8, and P9 pictures stored in the DPB is released through the sliding window memory control process.

Thereafter, the Bs6 picture after decoding is stored in the DPB, and as a result, as shown in FIG. 17, the P5, P8, P9, and Bs6 pictures are stored in the DPB.

At the time t9 next to the time t8, the decoding apparatus picks up the B7 picture of GOP#0 as a current picture in decoding process and decodes the B7 picture.

When the B7 picture is decoded, as shown in FIG. 17, the P5, P8, P9, and Bs6 pictures are stored in the DPB, and the B7 picture is decoded with reference to the P5, P8, P9, and Bs6 pictures stored in the DPB as necessary so as to create the predicted image of L0 prediction or L1 prediction.

Referring to FIG. 17, when the B7 picture of the R image is decoded at the time t9, the P5 picture which is the picture of the R image and is closest to and temporally earlier than the B7 picture in the display order is stored in the DPB.

Thus, in the case of forward prediction as L0 prediction of the B7 picture, the P5 picture stored in the DPB can be referenced, thus encoding efficiency can be improved compared to a case where the P5 picture is unable to be referenced, as described in FIGS. 6 and 7.

At the AVC default, when the B7 picture is decoded, with regard to the P5, P8, P9, and Bs6 pictures as the short-term reference picture stored in the DPB, as shown in FIG. 17, the assignment is made as follows: the L0 index having a value of 0 is assigned to the Bs6 picture first closest to the B7 picture before the B7 picture in the POC order; the L0 index having a value of 1 is assigned to the P5 picture second closest to the B7 picture before the B7 picture in the POC order; the L0 index having a value of 2 is assigned to the P8 picture first closest to the B7 picture after the B7 picture in the POC order; and the L0 index having a value of 3 is assigned to the P9 picture second closest to the B7 picture after the B7 picture in the POC order.

At the AVC default, with regard to the P5, P8, P9, and Bs6 pictures stored in the DPB, as shown in FIG. 17, the assignment is made as follows: the L1 index having a value of 0 is assigned to the P8 picture first closest to the B7 picture after the B7 picture in the POC order; the L0 index having a value of 1 is assigned to the P9 picture second closest to the B7 picture after the B7 picture in the POC order; the L1 index having a value of 2 is assigned to the Bs6 picture first closest to the B7 picture before the B7 picture in the POC order; and the L1 index having a value of 3 is assigned to the P5 picture second closest to the B7 picture before the B7 picture in the POC order.

The B7 picture is not a reference picture, thus the B7 picture is not stored in the DPB after decoding.

Thus, as shown in FIG. 17, similarly to after the Bs6 picture one picture before the B7 picture in the decoding order has been decoded, the P5, P8, P9, and Bs6 pictures are still stored in the DPB.

At the time t10 next to the time t9, the decoding apparatus picks up the P12 picture of GOP#0 as a current picture in decoding process and decodes the P12 picture.

When the P12 picture is decoded, as shown in FIG. 17, the P5, P8, P9, and Bs6 pictures are stored in the DPB, and the P12 picture is decoded with reference to the P5, P8, P9, and Bs6 pictures stored in the DPB as necessary so as to create the predicted image of L0 prediction.

In FIG. 17, description of the assignment of the reference picture number (L0 index, L1 index) at the AVC default will be hereinafter omitted.

The POC of the P12 picture is 12 and hence the remainder POC is 12. Thus, according to the second storage control of FIG. 16, the MMCO command "100" is issued. As a result, from among the P5, P8, P9, and Bs6 pictures stored in the DPB, a reference picture with the PN of CurrPicNum−1 is released through the adaptive memory control process.

That is, in this case, since the current picture in decoding process is the P12 picture, and CurrPicNum which is the PN of the P12 picture is 8, the Bs6 picture with the PN of 7 (=8−1) is released.

The P12 picture is a reference picture and the P12 picture after decoding is stored in the DPB after the Bs6 picture has been released.

As a result, as shown in FIG. 17, the P5, P8, P9, and P12 pictures are stored in the DPB.

At the time t11 next to the time t10, the decoding apparatus picks up the P13 picture of GOP#0 as a current picture in decoding process and decodes the P13 picture.

When the P13 picture is decoded, as shown in FIG. 17, the P5, P8, P9, and P12 pictures are stored in the DPB, and the P13 picture is decoded with reference to the P5, P8, P9, and P12 pictures stored in the DPB as necessary so as to create the predicted image of L0 prediction.

The P13 picture is a reference picture and the P13 picture after decoding is stored in the DPB.

When the P13 picture is stored in the DPB, the four pictures of the P5, P8, P9, and P12 pictures are stored in the DPB as much as the storage capacity allows. For this reason, in the decoding apparatus, the oldest P5 picture from among the P5, P8, P9, and P12 pictures stored in the DPB is released through the sliding window memory control process.

Thereafter, the P13 picture after decoding is stored in the DPB, and as a result, as shown in FIG. 17, the P8, P9, P12, and P13 pictures are stored in the DPB.

At the time t12 next to the time t11, the decoding apparatus picks up the Bs10 picture of GOP#0 as a current picture in decoding process and decodes the Bs10 picture.

When the Bs10 picture is decoded, as shown in FIG. 17, the P8, P9, P12, and P13 pictures are stored in the DPB, and the Bs10 picture is decoded with reference to the P8, P9, P12, and P13 pictures stored in the DPB as necessary so as to create the predicted image of L0 prediction or L1 prediction.

Referring to FIG. 17, when the Bs10 picture of the L image is decoded at the time t12, the P8 picture which is the picture of the L image and is closest to and temporally earlier than the Bs10 picture in the display order is stored in the DPB.

Thus, in the case of forward prediction as L0 prediction of the Bs10 picture, the P8 picture stored in the DPB can be referenced, thus encoding efficiency can be improved compared to a case where the P8 picture is unable to be referenced, as described in FIGS. 6 and 7.

The Bs10 picture is a reference picture and the Bs10 picture after decoding is stored in the DPB.

When the Bs10 picture is stored in the DPB, the four pictures of the P8, P9, P12, and P13 pictures are stored in the DPB as much as the storage capacity allows. For this reason, in the decoding apparatus, the oldest P8 picture from among the P8, P9, P12, and P13 pictures stored in the DPB is released through the sliding window memory control process.

Thereafter, the Bs10 picture after decoding is stored in the DPB, and as a result, as shown in FIG. 17, the P9, P12, P13, and Bs10 pictures are stored in the DPB.

At the time t13 next to the time t12, the decoding apparatus picks up the B11 picture of GOP#0 as a current picture in decoding process and decodes the B11 picture.

When the B11 picture is decoded, as shown in FIG. 17, the P9, P12, P13, and Bs10 pictures are stored in the DPB, and the B11 picture is decoded with reference to the P9, P12, P13, and Bs10 pictures stored in the DPB as necessary so as to create the predicted image of L0 prediction or L1 prediction.

Referring to FIG. 17, when the B11 picture of the R image is decoded at the time t13, the P9 picture which is the picture of the R image and is closest to and temporally earlier than the B11 picture in the display order is stored in the DPB.

Thus, in the case of forward prediction as L0 prediction of the B11 picture, the P9 picture stored in the DPB can be referenced, thus encoding efficiency can be improved compared to a case where the P9 picture is unable to be referenced, as described in FIGS. 6 and 7.

The B11 picture is not a reference picture, thus the B11 picture is not stored in the DPB after decoding.

Thus, as shown in FIG. 17, similarly to after the Bs10 picture one picture before the B11 picture in the decoding order has been decoded, the P9, P12, P13, and Bs10 pictures are still stored in the DPB.

At the time t14 next to the time t13, the decoding apparatus picks up the I16 (I0) picture of GOP#1 as a current picture in decoding process and decodes the I16 picture with no inter prediction.

That is, when the I16 picture is decoded, as shown in FIG. 17, the P9, P12, P13, and Bs10 pictures are stored in the DPB, and the I16 picture is decoded without reference to the P9, P12, P13, and Bs10 pictures stored in the DPB.

The POC of the I16 picture is 0 and hence the remainder POC is 0. Thus, according to the second storage control of FIG. 16, the MMCO command "100" is issued. As a result, from among the P9, P12, P13, and Bs10 pictures stored in the DPB, a reference picture with the PN of CurrPicNum−1 is released through the adaptive memory control process.

That is, in this case, since the current picture in decoding process is the I16 picture, and CurrPicNum which is the PN of the I16 picture is 11, the Bs10 picture with the PN of 10 (=11−1) is released.

The I16 picture is a reference picture, and the I16 picture after decoding is stored in the DPB after the Bs10 picture has been released.

As a result, as shown in FIG. 17, the P9, P12, P13, and I16 pictures are stored in the DPB.

At the time t15 next to the time t14, the decoding apparatus picks up the P17 (P1) picture of GOP#1 as a current picture in decoding process and decodes the P17 picture.

When the P17 picture is decoded, as shown in FIG. 17, the P9, P12, P13, and I16 pictures are stored in the DPB, and the P17 picture is decoded with reference to the P9, P12, P13, and I16 pictures stored in the DPB as necessary so as to create the predicted image of L0 prediction.

The P17 picture is a reference picture and the P17 picture after decoding is stored in the DPB.

When the P17 picture is stored in the DPB, the four pictures of the P9, P12, P13, and I16 pictures are stored in the DPB as much as the storage capacity allows. For this reason, in the decoding apparatus, the oldest P9 picture from among the P9, P12, P13, and I16 pictures stored in the DPB is released through the sliding window memory control process.

Thereafter, the P17 picture after decoding is stored in the DPB, and as a result, as shown in FIG. 17, the P12, P13, I16, and P17 pictures are stored in the DPB.

At the time t16 next to the time t15, the decoding apparatus picks up the Bs14 picture of GOP#0 as a current picture in decoding process and decodes the Bs14 picture.

When the Bs14 picture is decoded, as shown in FIG. 17, the P12, P13, I16, and P17 pictures are stored in the DPB, and the Bs14 picture is decoded with reference to the P12, P13, I16, and P17 pictures stored in the DPB as necessary so as to create the predicted image of L0 prediction or L1 prediction.

Referring to FIG. 17, when the Bs14 picture of the L image is decoded at the time t16, the P12 picture which is the picture of the L image and is closest to and temporally earlier than Bs14 picture in the display order is stored in the DPB.

Thus, in the case of forward prediction as L0 prediction of the Bs14 picture, the P12 picture stored in the DPB can be referenced, thus encoding efficiency can be improved compared to a case where the P12 picture is unable to be referenced, as described in FIGS. 6 and 7.

The Bs14 picture is a reference picture and the Bs14 picture after decoding is stored in the DPB.

When the Bs14 picture is stored in the DPB, the four pictures of the P12, P13, I16, and P17 pictures are stored in the DPB as much as the storage capacity allows. For this reason, in the decoding apparatus, the oldest P12 picture from among the P12, P13, I16, and P17 pictures stored in the DPB is released through the sliding window memory control process.

Thereafter, the Bs14 picture after decoding is stored in the DPB, and as a result, as shown in FIG. 17, the P13, I16, P17, and Bs14 pictures are stored in the DPB.

At the time t17 next to the time t16, the decoding apparatus picks up the B15 picture of GOP#0 as a current picture in decoding process and decodes the B15 picture.

When the B15 picture is decoded, as shown in FIG. 17, the P13, I16, P17, and Bs14 pictures are stored in the DPB, and the B15 picture is decoded with reference to the P13, I16, P17, and Bs14 pictures stored in the DPB as necessary so as to create the predicted image of L0 prediction or L1 prediction.

Referring to FIG. 17, when the B15 picture of the R image is decoded at the time t17, the P13 picture which is the picture of the R image and is closest to and temporally earlier than the B15 picture in the display order is stored in the DPB.

Thus, in the case of forward prediction as L0 prediction of the B15 picture, the P13 picture stored in the DPB can be referenced, thus encoding efficiency can be improved compared to a case where the P13 picture is unable to be referenced, as described in FIGS. 6 and 7.

The B15 picture is not a reference picture, thus the B15 picture is not stored in the DPB after decoding.

Thus, as shown in FIG. 17, similarly to after the Bs14 picture one picture before the B15 picture in the decoding order has been decoded, the P13, I16, P17, and Bs14 pictures are still stored in the DPB.

Though not shown in FIG. 17, at the time next to the time t17, the decoding apparatus picks up the P20 (P4) picture of GOP#1 as a current picture in decoding process and decodes the P20 picture.

With regard to the P20 picture, the remainder POC is 4. Thus, according to the second storage control of FIG. 16, the MMCO command "100" is issued after the P20 picture has been decoded. As a result, from among the P13, I16, P17, and Bs14 pictures stored in the DPB, a reference picture with the PN of CurrPicNum−1 is released through the adaptive memory control process.

That is, in this case, since the current picture in decoding process is the P20 picture, and CurrPicNum which is the PN of the P20 picture is 14, the Bs14 picture with the PN of 13 (=14−1) is released.

As described above, according to the second storage control, similarly to the first storage control, in the decoding apparatus, from among the pictures which are decoded temporally earlier than the current picture in decoding process and are capable of becoming reference pictures, a picture which is a picture of an image at the same viewpoint as the current picture in decoding process from among the L image and the R image and is closest to the current picture in decoding process in the display order is stored in the DPB. That is, in the encoding apparatus, from among the pictures which are encoded temporally earlier than the current picture in encoding process and are capable of becoming reference pictures, a picture which is a picture of an image at the same viewpoint as the current picture in encoding process from among the L image and the R image and is closest to the current picture in encoding process in the display order is stored in the frame memory 22. Therefore, encoding efficiency can be improved.

Specifically, when the Bs6 picture of the L image is inter-predicted, the P4 picture which is the picture of the L image immediately before the Bs6 picture is stored in the frame memory 22 of the encoding apparatus of FIG. 8 and the frame memory 49 corresponding to the DPB of the decoding apparatus of FIG. 2. When the B7 picture of the R image is inter-predicted, the P5 picture which is the picture of the R image immediately before the B7 picture is stored in the frame memory 22 and the frame memory 49. When the Bs10 picture of the L image is inter-predicted, the P8 picture which is the picture of the L image immediately before the Bs10 picture is stored in the frame memory 22 and the frame memory 49. When the B11 picture of the R image is inter-predicted, the P9 picture which is the picture of the R image immediately before the B11 picture is stored in the frame memory 22 and the frame memory 49. When the Bs14 picture of the L image is inter-predicted, the P12 picture which is the picture of the L image immediately before the Bs14 picture is stored in the frame memory 22 and the frame memory 49. When the B15 picture of the R image is inter-predicted, the P13 picture which is the picture of the R image immediately before the B15 picture is stored in the frame memory 22 and the frame memory 49. Therefore, the prediction error of a predicted image created through inter prediction is reduced, thus encoding efficiency may be improved.

According to the second storage control, similarly to the first storage control, with regard to a picture of the L image of the frame sequential in which the GOP has the structure shown in FIG. 4, inter prediction is possible in which a picture of the L image temporally immediately before and after the relevant picture from among the pictures (referable pictures) capable of becoming reference pictures is referenced.

With regard to a picture of the R image, inter prediction is also possible in which a picture of the L image constituting an LR pair can be referenced, in addition to a picture of the R image temporally immediately before and after the relevant picture from among the referable pictures.

Therefore, encoding efficiency can be improved.

[RPLR Command]

FIG. 18 is a diagram illustrating the issuance of the RPLR command at the same time with the issuance of the MMCO command as the second storage control by the storage control unit 71 (FIG. 8).

As described with reference to FIG. 12, in the frame sequential, the pictures of the L image and the R image are alternately arranged. Thus, there is a case where, at the AVC default, the reference picture number having a smaller value which is encoded to a code with a smaller code quantity is not assigned to a reference picture which is highly likely to be used in creating the predicted image of the picture.

In the storage control unit 71 of the encoding apparatus of FIG. 8, when the MMCO command of the FIG. 16 is issued, the RPLR command of FIG. 18 can be further issued.

Thus, as in a case where the RPLR command of FIG. 12 is issued along with the MMCO command of FIG. 10, the reference picture number having a smaller value can be assigned to a reference picture which is highly likely to be used in creating the predicted image of the picture.

FIG. 18 shows a list of RPLR commands which are issued for assignment of the reference picture number when the storage control unit 71 issues the MMCO command of FIG. 16 as the second storage control.

The issuance of the RPLR command of FIG. 18 may not be carried out. Meanwhile, when the MMCO command of FIG. 16 is issued, if the RPLR command of the FIG. 18 is also issued, the reference picture number having a smaller value which is encoded to a code with a smaller code quantity is assigned to a reference picture which is highly likely to be used in creating the predicted image of the picture. Therefore, encoding efficiency can be further improved.

With regard to the RPLR command of FIG. 18, similarly to the RPLR command of FIG. 12, description will be provided appropriately replacing the operation in the encoding apparatus of FIG. 8 to assign the reference picture number to the reference picture stored in the frame memory 22 according to the RPLR command issued by the storage control unit 71 with the operation in the decoding apparatus of FIG. 2 to assign the reference picture number to the reference picture stored in (the frame memory 49 corresponding to) the DPB.

In the list of FIG. 18, the columns "POC", "list", "ref_pic_list_reordering", and "details" represent the same contents as in FIG. 12.

In the list of FIG. 18, when the remainder POC is 1, that is, when the current picture in decoding process (current picture in encoding process) is the P1 picture, "023" is issued as the RPLR command and the necessary argument. "0" at the first place from the head in "023" represents an L0 RPLR command #COMMAND==0, and "2" at the second place is the argument of the L0 RPLR command #COMMAND==0. "3" at the third place in "023" represents an RPLR command #COMMAND==3.

With the L0 RPLR command #COMMAND==0 and the subsequent argument "2" in "023" which is issued when the current picture in decoding process is the P1 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P1 picture as the current picture in decoding process, from among the reference pictures stored in the DPB as an assignment-target picture, and assigns the minimum value from among the values unassigned as the reference picture number (L0 index) at that time, that is, 0, to the reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P1 picture as the current picture in decoding process is the P13 picture of the GOP one GOP before the GOP of the P1 picture as the current picture in decoding process.

Thereafter, the decoding apparatus ends the operation to assign the reference picture number based on the RPLR command in accordance with the RPLR command #COMMAND==3 at the third place in "023".

When the remainder POC is 2, that is, when the current picture in decoding process is the Bs2 picture, "033" is issued as the RPLR command and the necessary argument. "0" at the first place from the head in "033" represents the L0 RPLR command #COMMAND==0, and "3" at the second place is the argument of the L0 RPLR command #COMMAND==0. "3" at the third place in "033" represents the RPLR command #COMMAND==3.

With the L0 RPLR command #COMMAND==0 and the subsequent argument "3" in "033" which is issued when the current picture in decoding process is the Bs2 picture, the variable abs_diff_pic_num_minus1 is set to 3. Thus, the decoding apparatus picks up a reference picture, which has, as the PN, a value obtained by subtracting abs_diff_pic_num_minus1+1 (=4) from CurrPicNum which is the PN of the Bs2 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=4) from CurrPicNum which is the PN of the Bs2 picture as the current picture in decoding process is the I0 picture of the GOP to which the Bs2 picture as the current picture in decoding process belongs.

Thereafter, the decoding apparatus ends the operation to assign the reference picture number based on the RPLR command in accordance with the RPLR command #COMMAND==3 at the third place in "033".

When the remainder POC is 3, that is, when the current picture in decoding process is the B3 picture, "033" and "013" are sequentially issued as the RPLR command and the necessary argument. "0" at the first place from the head in the first "033" from among "033" and "013" represents the L0 RPLR command #COMMAND==0, and "3" at the second place is the argument of the L0 RPLR command #COMMAND==0. "3" at the third place in "033" represents the RPLR command #COMMAND==3.

With the L0 RPLR command #COMMAND==0 and the subsequent argument "3" in the first "033" from among "033" and "013" which are issued when the current picture in decoding process is the B3 picture, the variable abs_diff_pic_num_minus1 is set to 3. Thus, the decoding apparatus picks up a reference picture, which has, as the PN, a value obtained by subtracting abs_diff_pic_num_minus1+1 (=4) from CurrPicNum which is the PN of the B3 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=4) from CurrPicNum which is the PN of the B3 picture as the current picture in decoding process is the P1 picture of the GOP to which the B3 picture as the current picture in decoding process belongs.

Thereafter, the decoding apparatus ends the operation to assign the reference picture number based on the RPLR command in accordance with the RPLR command #COMMAND==3 at the third place in "033".

"0" at the first place from the head in the second "013" from among "033" and "013" which are issued when the current picture in decoding process is the B3 picture represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the second "013" from among "033" and "013" which are issued when the current picture in decoding process is the B3 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B3 picture as the current picture in decoding process, from among the reference pictures stored in the DPB as an assignment-target picture, and assigns the minimum value from among the values unassigned as the reference picture number (L1 index) at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B3 picture as the current picture in decoding process is the P5 picture of the GOP to which the B3 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 4, that is, when the current picture in decoding process is the P4 picture, "013" is issued as the RPLR command and the necessary argument. "0" at the first place from the head in "013" represents the L0 RPLR command #COMMAND==0, and "1" at the second place is the argument of the L0 RPLR command #COMMAND==0. "3" at the third place in "013" represents the RPLR command #COMMAND==3.

With the L0 RPLR command #COMMAND==0 and the subsequent argument "1" in "013" which is issued when the current picture in decoding process is the P4 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the P4 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=2) from CurrPicNum which is the PN of the P4 picture as the current picture in decoding process is the I0 picture of the GOP to which the P4 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 5, that is, when the current picture in decoding process is the P5 picture, "013" is issued as the RPLR command and the necessary argument. "0" at the first place from the head in "013" represents the L0 RPLR command #COMMAND==0, and "1" at the second place is the argument of the L0 RPLR command #COMMAND==0. "3" at the third place in "013" represents the RPLR command #COMMAND==3.

With the L0 RPLR command #COMMAND==0 and the subsequent argument "1" in "013" which is issued when the current picture in decoding process is the P5 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the P5 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=2) from CurrPicNum which is the PN of the P5 picture as the current picture in decoding process is the P1 picture of the GOP to which the P5 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 6, that is, when the current picture in decoding process is the Bs6 picture, "043" is issued as the RPLR command and the necessary argument. "0" at the first place from the head in "043" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in "043" which is issued when the current picture in decoding process is the Bs6 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the Bs6 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, a value obtained by subtracting abs_diff_pic_num_minus1+1 (=5) from CurrPicNum which is the PN of the Bs6 picture as the current picture in decoding process is the P4 picture of the GOP to which the Bs6 picture as the current picture in decoding process belongs.

Thereafter, the decoding apparatus ends the operation to assign the reference picture number based on the RPLR command in accordance with the RPLR command #COMMAND==3 at the third place in "043".

When the remainder POC is 7, that is, when the current picture in decoding process is the B7 picture, "043" and "013" are sequentially issued as the RPLR command and the necessary argument. "0" at the first place from the head in the first "043" from among "043" and "013" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in the first "043" from among "043" and "013" which are issued when the current picture in decoding process is the B7 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the B7 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the B7 picture as the current picture in decoding process is the P5 picture of the GOP to which the B7 picture as the current picture in decoding process belongs.

Thereafter, the decoding apparatus ends the operation to assign the reference picture number based on the RPLR command in accordance with the RPLR command #COMMAND==3 at the third place in "043".

"0" at the first place from the head in the second "013" from among "043" and "013" which are issued when the current picture in decoding process is the B7 picture represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the second "013" from among "043" and "013" which are issued when the current picture in decoding process is the B7 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B7 picture as the current picture in decoding process, from among the reference pictures stored in the DPB as an assignment-target picture, and assigns the minimum value from among the values unassigned as the reference picture number at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B7 picture as the current picture in decoding process is the P9 picture of the GOP to which the B7 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 8 or 9, that is, when the current picture in decoding process is the P8 or P9 picture, "023" is issued as the RPLR command and the necessary argument. "0" at the first place from the head in "023" represents an L0 RPLR command #COMMAND==0, and "2" at the second place is the argument of the L0 RPLR command #COMMAND==0. "3" at the third place in "023" represents an RPLR command #COMMAND==3.

With the L0 RPLR command #COMMAND==0 and the subsequent argument "2" in "023" which is issued when the current picture in decoding process is the P8 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P8 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P8 picture as the current picture in decoding process is the P4 picture of the GOP to which the P8 picture as the current picture in decoding process belongs.

Thereafter, the decoding apparatus ends the operation to assign the reference picture number based on the RPLR command in accordance with the RPLR command #COMMAND==3 at the third place in "023".

With the L0 RPLR command #COMMAND==0 and the subsequent argument "2" in "023" which is issued when the current picture in decoding process is the P9 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P9 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P9 picture as the current picture in decoding process is the P5 picture of the GOP to which the P9 picture as the current picture in decoding process belongs.

Thereafter, the decoding apparatus ends the operation to assign the reference picture number based on the RPLR command in accordance with the RPLR command #COMMAND==3 at the third place in "023".

When the remainder POC is 10, that is, when the current picture in decoding process is the Bs10 picture, "043" is issued as the RPLR command and the necessary argument. "0" at the first place from the head in "043" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in "043" which is issued when the current picture in decoding process is the Bs10 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the Bs10 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the Bs10 picture as the current picture in decoding process is the P8 picture of the GOP to which the Bs10 picture as the current picture in decoding process belongs.

Thereafter, the decoding apparatus ends the operation to assign the reference picture number based on the RPLR command in accordance with the RPLR command #COMMAND==3 at the third place in "043".

When the remainder POC is 11, that is, when the current picture in decoding process is the B11 picture, "043" and "013" are sequentially issued as the RPLR command and the necessary argument. "0" at the first place from the head in the first "033" from among "043" and "013" represents the L0 RPLR command #COMMAND==0, and "3" at the second place is the argument of the L0 RPLR command #COMMAND==0. "3" at the third place in "043" represents the RPLR command #COMMAND==3.

With the L0 RPLR command #COMMAND==0 and the subsequent argument "4" in the first "043" from among "043" and "013" which are issued when the current picture in decoding process is the B11 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the B11 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the B11 picture as the current picture in decoding process is the P9 picture of the GOP to which the B11 picture as the current picture in decoding process belongs.

Thereafter, the decoding apparatus ends the operation to assign the reference picture number based on the RPLR command in accordance with the RPLR command #COMMAND==3 at the third place in "043".

"0" at the first place from the head in the second "013" from among "043" and "013" which are issued when the current picture in decoding process is the B11 picture represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the second "013" from among "043" and "013" which are issued when the current picture in decoding process is the B11 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B11 picture as the current picture in decoding process, from among the reference pictures stored in the DPB as an assignment-target picture, and assigns the minimum value from among the values unassigned as the reference picture number at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B11 picture as the current picture in decoding process is the P13 picture of the GOP to which the B11 picture as the current picture in decoding process belongs.

Thereafter, the decoding apparatus ends the operation to assign the reference picture number based on the RPLR command in accordance with the RPLR command #COMMAND==3 at the third place in "013".

When the remainder POC is 12 or 13, that is, when the current picture in decoding process is the P12 or P13 picture, "023" is issued as the RPLR command and the necessary argument. "0" at the first place from the head in "023" represents an L0 RPLR command #COMMAND==0, and "2" at the second place is the argument of the L0 RPLR command #COMMAND==0. "3" at the third place in "023" represents an RPLR command #COMMAND==3.

With the L0 RPLR command #COMMAND==0 and the subsequent argument "2" in "023" which is issued when the current picture in decoding process is the P12 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P12 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P12 picture as the current picture in decoding process is the P8 picture of the GOP to which the P12 picture as the current picture in decoding process belongs.

Thereafter, the decoding apparatus ends the operation to assign the reference picture number based on the RPLR command in accordance with the RPLR command #COMMAND==3 at the third place in "023".

With the L0 RPLR command #COMMAND==0 and the subsequent argument "2" in "023" which is issued when the current picture in decoding process is the P13 picture, the variable abs_diff_pic_num_minus1 is set to 2. Thus, the decoding apparatus picks up a reference picture, which has, as the PN, a value obtained by subtracting abs_diff_pic_num_minus1+1 (=3) from CurrPicNum which is the PN of the P13 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=3) from CurrPicNum which is the PN of the P13 picture as the current picture in decoding process is the P9 picture of the GOP to which the P13 picture as the current picture in decoding process belongs.

Thereafter, the decoding apparatus ends the operation to assign the reference picture number based on the RPLR command in accordance with the RPLR command #COMMAND==3 at the third place in "023".

When the remainder POC is 14, that is, when the current picture in decoding process is the Bs14 picture, "043" is issued as the RPLR command and the necessary argument. "0" at the first place from the head in "043" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in "043" which is issued when the current picture in decoding process is the Bs14 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the Bs14 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the Bs14 picture as the current picture in decoding process is the P12 picture of the GOP to which the Bs14 picture as the current picture in decoding process belongs.

Thereafter, the decoding apparatus ends the operation to assign the reference picture number based on the RPLR command in accordance with the RPLR command #COMMAND==3 at the third place in "043".

When the remainder POC is 15, that is, when the current picture in decoding process is the B15 picture, "043" and "013" are sequentially issued as the RPLR command and the necessary argument. "0" at the first place from the head in the first "043" from among "043" and "013" represents the L0 RPLR command #COMMAND==0, and "4" at the second place is the argument of the L0 RPLR command #COMMAND==0. "3" at the third place in "043" represents the RPLR command #COMMAND==3.

With the L0 RPLR command #COMMAND==0 and the subsequent argument "4" in the first "043" from among "043"

and "013" which are issued when the current picture in decoding process is the B15 picture, the variable abs_diff_pic_num_minus1 is set to 4. Thus, the decoding apparatus picks up a reference picture, which has, as the PN, a value obtained by subtracting abs_diff_pic_num_minus1+1 (=5) from CurrPicNum which is the PN of the B15 picture as the current picture in decoding process, from among the reference pictures stored in the DPB as an assignment-target picture, and assigns the minimum value from among the values unassigned as the reference picture number at that time, that is, 0, to the relevant reference picture as the L0 index.

As described below, from among the reference pictures stored in the DPB, the reference picture which has, as the PN, the value obtained by subtracting abs_diff_pic_num_minus1+1 (=5) from CurrPicNum which is the PN of the B15 picture as the current picture in decoding process is the P13 picture of the GOP to which the B15 picture as the current picture in decoding process belongs.

Thereafter, the decoding apparatus ends the operation to assign the reference picture number based on the RPLR command in accordance with the RPLR command #COMMAND==3 at the third place in "043".

"0" at the first place from the head in the second "013" from among "043" and "013" which are issued when the current picture in decoding process is the B15 picture represents an L1 RPLR command #COMMAND==0, and "1" at the second place is the argument of the L1 RPLR command #COMMAND==0. "3" at the third place in "013" represents the RPLR command #COMMAND==3.

With the L1 RPLR command #COMMAND==0 and the subsequent argument "1" in the second "013" from among "043" and "013" which are issued when the current picture in decoding process is the B15 picture, the variable abs_diff_pic_num_minus1 is set to 1. Thus, the decoding apparatus picks up a reference picture, which has, as the PN, a value obtained by subtracting abs_diff_pic_num_minus1+1 (=2) from CurrPicNum which is the PN of the B15 picture as the current picture in decoding process, from among the reference pictures stored in the DPB as an assignment-target picture, and assigns the minimum value from among the values unassigned as the reference picture number at that time, that is, 0, to the reference picture as the L1 index.

As described below, from among the reference pictures stored in the DPB, the reference picture which has, as the PN, the value obtained by subtracting abs_diff_pic_num_minus1+1 (=2) from CurrPicNum which is the PN of the B15 picture as the current picture in decoding process is the P1 (P17) picture of the GOP one GOP after the GOP of the B15 picture as the current picture in decoding process.

Thereafter, the decoding apparatus ends the operation to assign the reference picture number based on the RPLR command in accordance with the RPLR command #COMMAND==3 at the third place in "013".

As described above, with the RPLR command of FIG. 18, when the MMCO command of FIG. 16 is issued, and when the remainder POC is 1, the L0 index of the P13 picture stored in the DPB becomes 0.

When the remainder POC is 2, the L0 index of the I0 picture stored in the DPB becomes 0.

When the remainder POC is 3, the L0 index of the P1 picture stored in the DPB becomes 0, and the L1 index of the P5 picture stored in the DPB becomes 0.

When the remainder POC is 4, the L0 index of the I0 picture stored in the DPB becomes 0.

When the remainder POC is 5, the L0 index of the P1 picture stored in the DPB becomes 0.

When the remainder POC is 6, the L0 index of the P4 picture stored in the DPB becomes 0.

When the remainder POC is 7, the L0 index of the P5 picture stored in the DPB becomes 0, and the L1 index of the P9 picture stored in the DPB becomes 0.

When the remainder POC is 8, the L0 index of the P4 picture stored in the DPB becomes 0.

When the remainder POC is 9, the L0 index of the P5 picture stored in the DPB becomes 0.

When the remainder POC is 10, the L0 index of the P8 picture stored in the DPB becomes 0.

When the remainder POC is 11, the L0 index of the P9 picture stored in the DPB becomes 0, and the L1 index of the P13 picture stored in the DPB becomes 0.

When the remainder POC is 12, the L0 index of the P8 picture stored in the DPB becomes 0.

When the remainder POC is 13, the L0 index of the P9 picture stored in the DPB becomes 0.

When the remainder POC is 14, the L0 index of the P12 picture stored in the DPB becomes 0.

When the remainder POC is 15, the L0 index of the P13 picture stored in the DPB becomes 0, and the L1 index of the P1 (P17) picture stored in the DPB becomes 0.

[Encoding/Decoding when MMCO Command and RPLR Command are Issued]

Figure 19:
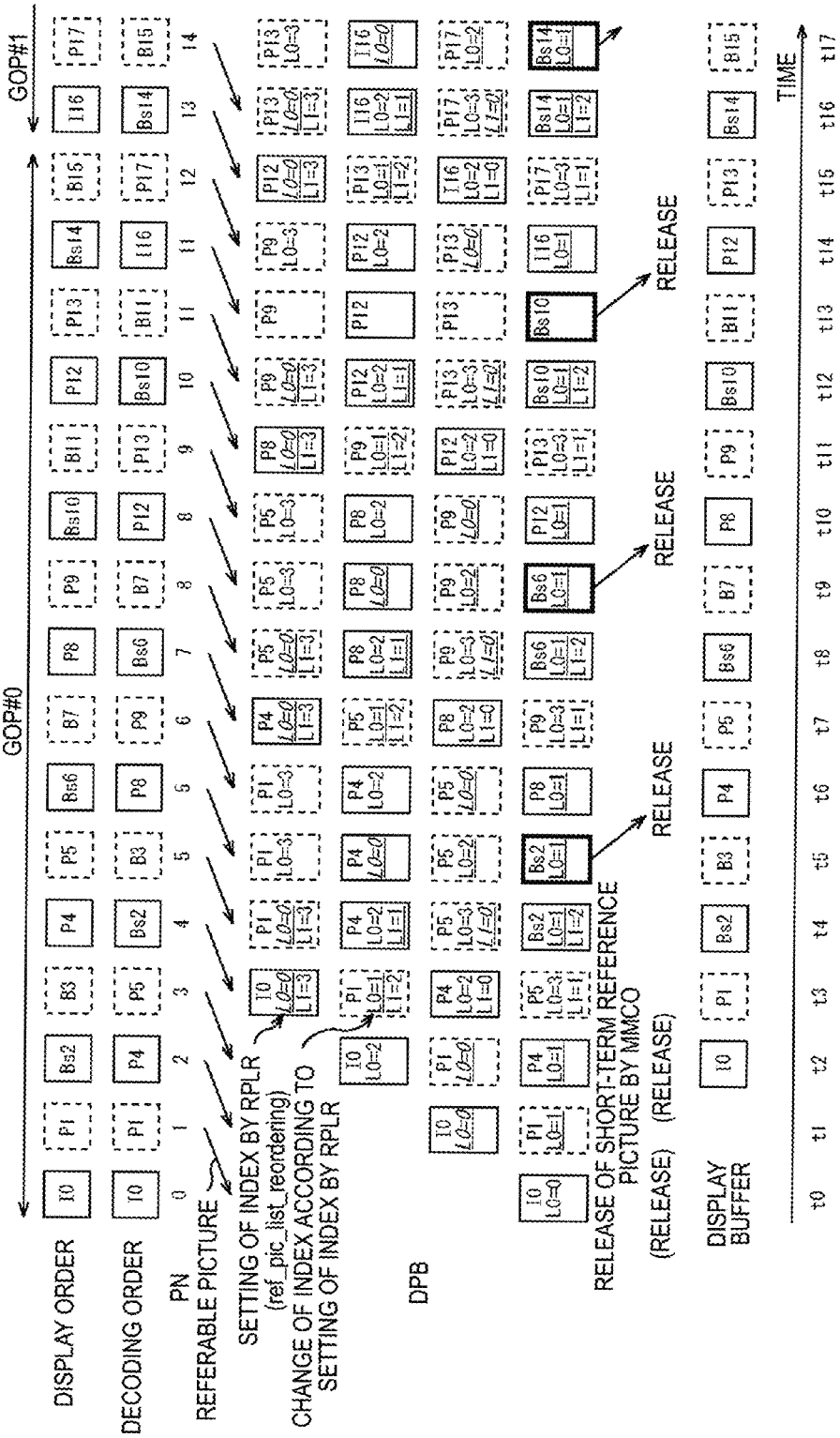
FIG. 19 is a diagram illustrating the state of a DPB when an MMCO command and an RPLR command are issued, and a frame sequential is encoded/decoded through AVC.

FIG. 19 is a diagram illustrating the state of the DPB when the MMCO command and the necessary argument of FIG. 16 are issued to encode/decode the frame sequential through AVC.

FIG. 19 shows the display order of the pictures constituting the frame sequential, the encoding/decoding order, the PN, and the storage state of the DPB, and the storage state of the display buffer.

The display order of the pictures constituting the frame sequential, the encoding/decoding order, the PN, and the storage state of the display buffer are the same as those in FIG. 6, thus description thereof will be omitted.

If it is assumed that, in the encoding apparatus of FIG. 8, the frame sequential is encoded in the encoding order of FIG. 19, encoded data obtained as a result of encoding is decoded in the decoding order of FIG. 19 in the AVC decoding apparatus of FIG. 2.

It is also assumed that, in the encoding apparatus of FIG. 8, the MMCO command (and the necessary argument) of FIG. 16 and the RPLR command (and the necessary argument) of FIG. 18 are issued, and the MMCO command and the RPLR command are included in encoded data.

In this case, in the AVC decoding apparatus of FIG. 2, when encoded data is decoded, the storage of the pictures in the DPB is carried out in the same manner as described with reference to FIG. 17.

In the decoding apparatus, the assignment of the reference picture number (L0 index, L1 index) to the reference pictures stored in the DPB is carried out in accordance with the RPLR command. Thereafter, the reference picture number having the value (preset value) at the AVC default is assigned to the reference pictures to which the reference picture number is not assigned.

Thus, in FIG. 19, the assignment of the reference picture number (L0 index, L1 index) to the reference pictures is different from FIG. 17, but the reference pictures which are stored in the DPB coincide with those in FIG. 17. So, in FIG. 19, description of the reference pictures which are stored in the DPB will be appropriately omitted.

Referring to FIG. 19, in the description "L0=integer" and "L1=integer" the underlined description represents the reference picture number (L0 index, L1 index) having a value different from that in FIG. 17.

Referring to FIG. 19, in the description "L0=integer" and "L1=integer", the underlined and italic-type description represents the reference picture number assigned in accordance with the RPLR command, and the underlined but non-italic-type description represents that the assignment of the reference picture number based on the RPLR command is performed, and the reference picture number subsequently assigned at the AVC default is different from that in FIG. 17.

At the time t0, the decoding apparatus picks up the I0 picture of GOP#0 as a current picture in decoding process and decodes the I0 picture.

The I0 picture is a reference picture and, as shown in FIG. 19, the I0 picture after decoding is stored in the DPB.

At the time t1 next to the time t0, the decoding apparatus picks up the P1 picture of GOP#0 as a current picture in decoding process and decodes the P1 picture.

When the P1 picture is decoded, as shown in FIG. 19, the I0 picture is stored in the DPB, and the P1 picture is decoded with reference to the I0 picture stored in the DPB as necessary so as to create the predicted image of L0 prediction.

The remainder POC of the POC of the P1 picture is 1. In this case, as described with reference to FIG. 18, "023" is issued as the RPLR command and the necessary argument. The assignment of the reference picture number to the P13 picture of the GOP one GOP before the GOP of the P1 picture as the current picture in decoding process is carried out in accordance with the RPLR command. Meanwhile, when the P1 picture of the first GOP#0 is decoded, the picture of the GOP one GOP before the GOP of the P1 picture as the current picture in decoding process is not yet stored in the DPB.

For this reason, only for the first GOP#0, exceptionally, when the P1 picture is decoded, the RPLR command "100" is not issued (or even when the RPLR command is issued, the assignment of the reference picture number based on the RPLR command is not carried out).

Thus, when the P1 picture of GOP#0 is decoded, with regard to the I0 picture stored in the DPB, at the AVC default, the L0 index is assigned. That is, as in FIG. 17, the L0 index having a value of 0 is assigned to the I0 picture stored in the DPB.

The P1 picture is a reference picture and, as shown in FIG. 19, the P1 picture after decoding is stored in the DPB as a reference picture.

At the time t2 next to the time t1, the decoding apparatus picks up the P4 picture of GOP#0 as a current picture in decoding process and decodes the P4 picture.

When the P4 picture is decoded, as shown in FIG. 19, the I0 and P1 pictures are stored in the DPB, and the P4 picture is decoded with reference to the I0 or P1 picture stored in the DPB as necessary so as to create the predicted image of L0 prediction.

The remainder POC of the POC of the P4 picture is 4. In this case, as described with reference to FIG. 18, "013" is issued as the RPLR command and the necessary argument.

With the RPLR command "013" which is issued when the current picture in decoding process is the P4 picture, as described with reference to FIG. 18, the I0 picture which is a reference picture having, as the PN, a value obtained by subtracting abs_diff_pic_num_minus1+1 (=2) from CurrPicNum (=2) which is the PN of the P4 picture as the current picture in decoding process, that is, 0, is picked up as an assignment-target picture, and the minimum value from among the values unassigned as the L0 index at that time, that is, 0, is assigned to the I0 picture as the L0 index.

Thereafter, from among the I0 and P1 pictures stored in the DPB, with regard to the P1 picture to which the reference picture number based on the RPLR command is not assigned, at the AVC default, the minimum value from among the values unused as the L0 index at that time, that is, 1 (the L0 index having a value of 0 is assigned to the I0 picture in accordance with the RPLR command), is assigned as the L0 index.

The P4 picture is a reference picture and, as shown in FIG. 19, the P4 picture after decoding is stored in the DPB.

At the time t3 next to the time t2, the decoding apparatus picks up the P5 picture of GOP#0 as a current picture in decoding process and decodes the P5 picture.

When the P5 picture is decoded, as shown in FIG. 19, the I0, P1, and P4 pictures are stored in the DPB, and the P5 picture is decoded with reference to the I0 or P1 and P4 pictures stored in the DPB as necessary so as to create the predicted image of L0 prediction.

The remainder POC of the POC of the P5 picture is 5. In this case, as described with reference to FIG. 18, "013" is issued as the RPLR command and the necessary argument.

With the RPLR command "013" which is issued when the current picture in decoding process is the P5 picture, as described with reference to FIG. 18, the P1 picture which has, as the PN, a value obtained by subtracting abs_diff_pic_num_minus1+1 (=2) from CurrPicNum (=3) which is the PN of the P5 picture as the current picture in decoding process, that is, 1, is picked up as an assignment-target picture, and the minimum value from among the values unassigned as the L0 index at that time, that is, 0, is assigned to the P1 picture as the L0 index.

Thereafter, from among the I0, P1, and P4 pictures stored in the DPB, with regard to the I0 and P4 pictures to which the reference picture number based on the RPLR command is not assigned, at the AVC default, the L0 index having a value equal to or greater than 1 is assigned.

That is, from among the I0, P1, and P4 pictures stored in the DPB, with regard to the I0 and P4 pictures to which the reference picture number based on the RPLR command is not assigned, as shown in FIG. 19, the assignment is made as follows: the L0 index having a value of 1 is assigned to the P4 picture first closest to the P5 picture as the current picture in decoding process in the decoding order; and the L0 index having a value of 2 is assigned to the I0 picture second closest to the P5 picture in the decoding order.

The P5 picture is a reference picture and, as shown in FIG. 19, the P5 picture after decoding is stored in the DPB.

At the time t4 next to the time t3, the decoding apparatus picks up the Bs2 picture of GOP#0 as a current picture in decoding process and decodes the Bs2 picture.

When the Bs2 picture is decoded, as shown in FIG. 19, the I0, P1, P4, and P5 pictures are stored in the DPB, and the Bs2 picture is decoded with reference to the I0, P1, P4, and P5 pictures stored in the DPB as necessary so as to create the predicted image of L0 prediction or L1 prediction.

The remainder POC of the POC of the Bs2 picture is 2. In this case, as described with reference to FIG. 18, "033" is issued as the RPLR command and the necessary argument.

With the RPLR command "033" which is issued when the current picture in decoding process is the Bs2 picture, as described with reference to FIG. 18, the I0 picture which has, as the PN, a value obtained by subtracting abs_diff_pic_num_minus1+1 (=4) from CurrPicNum (=4) which is the PN of the Bs2 picture as the current picture in decoding process, that is, 0, is picked up as an assignment-target picture, and the minimum value from among the values unassigned as the L0 index at that time, that is, 0, is assigned to the I0 picture as the L0 index.

Thereafter, from among the I0, P1, P4, and P5 pictures stored in the DPB, with regard to the P1, P4, and P5 pictures to which the assignment of the L0 index based on the RPLR command is not made, at the AVC default, the L0 index having a value equal to or greater than 1 is assigned.

That is, from among the I0, P1, P4, and P5 pictures stored in the DPB, with regard to the P1, P4, and P5 pictures to which the assignment of the L0 index based on the RPLR command is not made, as shown in FIG. 19, the assignment is made as follows: the L0 index having a value of 1 is assigned to the P1 picture first closest to the Bs2 picture before the Bs2 picture in the POC order; the L0 index having a value of 2 is assigned to the P4 picture first closest to the Bs2 picture after the Bs2 picture in the POC order; and the L0 index having a value of 3 is assigned to the P5 picture second closest to the Bs2 picture after the Bs2 picture in the POC order.

With regard to the I0, P1, P4, and P5 pictures stored in the DPB, to which the assignment of the L1 index based on the RPLR command is not made, at the AVC default, the assignment is made as follows: the L1 index having a value of 0 is assigned to the P4 picture; the L1 index having a value of 1 is assigned to the P5 picture; the L1 index having a value of 2 is assigned to the P1 picture; and the L1 index having a value of 3 is assigned to the I0 picture.

The Bs2 picture is a reference picture and the Bs2 picture after decoding is stored in the DPB. As a result, as in FIG. 17, the P1, P4, P5, and Bs2 pictures are stored in the DPB.

At the time t5 next to the time t4, the decoding apparatus picks up the B3 picture of GOP#0 as a current picture in decoding process and decodes the B3 picture.

When the B3 picture is decoded, as shown in FIG. 19, the P1, P4, P5, and Bs2 pictures are stored in the DPB, and the B3 picture is decoded with reference to the P1, P4, P5, and Bs2 pictures stored in the DPB as necessary so as to create the predicted image of L0 prediction or L1 prediction.

The remainder POC of the POC of the B3 picture is 3. In this case, as described with reference to FIG. 18, "033" and "013" are sequentially issued as the RPLR command and the necessary argument.

With the RPLR command "033" which is issued when the current picture in decoding process is the B3 picture, as described with reference to FIG. 18, the P1 picture which has, as the PN, a value obtained by subtracting abs_diff_pic_num_minus1+1 (=4) from CurrPicNum(=5) which is the PN of the B3 picture as the current picture in decoding process, that is, 1, is picked up as an assignment-target picture, and the minimum value from among the values unassigned as the L0 index at that time, that is, 0, is assigned to the P1 picture as the L0 index.

With the RPLR command "013" which is issued when the current picture in decoding process is the B3 picture, as described with reference to FIG. 18, the P5 picture which has, as the PN, a value obtained by subtracting abs_diff_pic_num_minus1+1 (=2) from CurrPicNum(=5) which is the PN of the B3 picture as the current picture in decoding process, that is, 3, is picked up as an assignment-target picture, and the minimum value from among the values unassigned as the L1 index at that time, that is, 0, is assigned to the P5 picture as the L1 index.

Thereafter, from among the P1, P4, P5, and Bs2 pictures stored in the DPB, with regard to the P4, P5, and Bs2 pictures to which the assignment of the L0 index based on the RPLR command is not made, at the AVC default, the L0 index having a value equal to or greater than 1 is assigned.

That is, from among the P1, P4, P5, and Bs2 pictures stored in the DPB, with regard to the P4, P5, and Bs2 pictures to which the assignment of the L0 index based on the RPLR command is not made, as shown in FIG. 19, the assignment is made as follows: the L0 index having a value of 1 is assigned to the Bs2 picture first closest to the B3 picture before the B3 picture in the POC order; the L0 index having a value of 2 is assigned to the P4 picture first closest to the B3 picture after the B3 picture in the POC order; and the L0 index having a value of 3 is assigned to the P5 picture second closest to the B3 picture after the B3 picture in the POC order.

From among the P1, P4, P5, and Bs2 pictures stored in the DPB, with regard to the P1, P4, and Bs2 pictures to which the assignment of the L1 index based on the RPLR command is not made, at the AVC default, the L1 index having a value equal to or greater than 1 is assigned.

That is, from among the P1, P4, P5, and Bs2 pictures stored in the DPB, with regard to the P1, P4, and Bs2 pictures to which the assignment of the L1 index based on the RPLR command is not made, as shown in FIG. 19, the assignment is made as follows: the L1 index having a value of 1 is assigned to the P4 picture first closest to the B3 picture after the B3 picture in the POC order; the L1 index having a value of 2 is assigned to the Bs2 picture first closest to the B3 picture before the B3 picture in the POC order; and the L1 index having a value of 3 is assigned to the P1 picture second closest to the B3 picture before the B3 picture in the POC order.

The B3 picture is not a reference picture, thus the B3 picture is not stored in the DPB after decoding.

Thus, as shown in FIG. 19, similarly to after the Bs2 picture one picture before the B3 picture in the decoding order has been decoded, the P1, P4, P5, and Bs2 pictures are still stored in the DPB.

At the time t6 next to the time t5, the decoding apparatus picks up the P8 picture of GOP#0 as a current picture in decoding process and decodes the P8 picture.

When the P8 picture is decoded, as shown in FIG. 19, the P1, P4, P5, and Bs2 pictures are stored in the DPB, and the P8 picture is decoded with reference to the P1, P4, P5, and Bs2 pictures stored in the DPB as necessary so as to create the predicted image of L0 prediction.

The remainder POC of the POC of the P8 picture is 8. In this case, as described with reference to FIG. 18, "023" is issued as the RPLR command and the necessary argument.

With the RPLR command "023" which is issued when the current picture in decoding process is the P8 picture, as described with reference to FIG. 18, the P4 picture which has, as the PN, a value obtained by subtracting abs_diff_pic_num_minus1+1 (=3) from CurrPicNum (=5) which is the PN of the P8 picture as the current picture in decoding process, that is, 2, is picked up as an assignment-target picture, and the minimum value from among the values unassigned as the L0 index at that time, that is, 0, is assigned to the P4 picture as the L0 index.

Thereafter, from among the P1, P4, P5, and Bs2 pictures stored in the DPB, with regard to the P1, P5, and Bs2 pictures to which the reference picture number based on the RPLR command is not assigned, at the AVC default, the L0 index having a value equal to or greater than 1 is assigned.

That is, from among the P1, P4, P5, and Bs2 pictures stored in the DPB, with regard to the P1, P5, and Bs2 pictures to which the assignment of the L0 index based on the RPLR command is not made, as shown in FIG. 19, the assignment is made as follows: the L0 index having a value of 1 is assigned to the Bs2 picture first closest to the P8 picture in the decoding order; the L0 index having a value of 2 is assigned to the P5 picture second closest to the P8 picture in the decoding order;

and the L0 index having a value of 3 is assigned to the P1 picture third closest to the P8 picture in the decoding order.

The P8 picture is a reference picture and the P8 picture after decoding is stored in the DPB.

When the P8 picture is stored in the DPB, as described with reference to FIG. 17, the Bs2 picture stored in the DPB is released. As a result, as shown in FIG. 19, the P1, P4, P5, and P8 pictures are stored in the DPB.

At the time t7 next to the time t6, the decoding apparatus picks up the P9 picture of GOP#0 as a current picture in decoding process and decodes the P9 picture.

When the P9 picture is decoded, as shown in FIG. 19, the P1, P4, P5, and P8 pictures are stored in the DPB, and the P9 picture is decoded with reference to the P1, P4, P5, and P8 pictures stored in the DPB as necessary so as to create the predicted image of L0 prediction.

The remainder POC of the POC of the P9 picture is 9. In this case, as described with reference to FIG. 18, "023" is issued as the RPLR command and the necessary argument.

With the RPLR command "023" which is issued when the current picture in decoding process is the P9 picture, as described with reference to FIG. 18, the P5 picture which has, as the PN, a value obtained by subtracting abs_diff_pic_num_minus1+1 (=3) from CurrPicNum (=6) which is the PN of the P9 picture as the current picture in decoding process, that is, 3, is picked up as an assignment-target picture, and the minimum value from among the values unassigned as the L0 index at that time, that is, 0, is assigned to the P5 picture as the L0 index.

Thereafter, from among the P1, P4, P5, and P8 stored in the DPB, with regard to the P1, P4, and P8 pictures to which the reference picture number based on the RPLR command is not assigned, at the AVC default, the L0 index having a value equal to or greater than 1 is assigned.

That is, from among the P1, P4, P5, and P8 pictures stored in the DPB, with regard to the P1, P4, and P8 pictures to which the assignment of the L0 index based on the RPLR command is not made, as shown in FIG. 19, the assignment is made as follows: the L0 index having a value of 1 is assigned to the P8 picture first closest to the P9 picture in the decoding order; the L0 index having a value of 2 is assigned to the P4 picture second closest to the P9 picture in the decoding order; and the L0 index having a value of 3 is assigned to the P1 picture third closest to the P9 picture in the decoding order.

The P9 picture is a reference picture and, as described with reference to FIG. 17, the P9 picture after decoding is stored in the DPB. As a result, as shown in FIG. 19, the P4, P5, P8, and P9 pictures are stored in the DPB.

At the time t8 next to the time t7, the decoding apparatus picks up the Bs6 picture of GOP#0 as a current picture in decoding process and decodes the Bs6 picture.

When the Bs6 picture is decoded, as shown in FIG. 19, the P4, P5, P8, and P9 pictures are stored in the DPB, and the Bs6 picture is decoded with reference to the P4, P5, P8, and P9 pictures stored in the DPB as necessary so as to create the predicted image of L0 prediction or L1 prediction.

The remainder POC of the POC of the Bs6 picture is 6. In this case, as described with reference to FIG. 18, "043" is issued as the RPLR command and the necessary argument.

With the RPLR command "043" which is issued when the current picture in decoding process is the Bs6 picture, as described with reference to FIG. 18, the P4 picture which has, as the PN, a value by subtracting abs_diff_pic_num_minus1+1 (=5) from CurrPicNum (=7) which is the PN of the Bs6 picture as the current picture in decoding process, that is, 2, is picked up as an assignment-target picture, and the minimum value from among the values unassigned as the L0 index at that time, that is, 0, is assigned to the P4 picture as the L0 index.

Thereafter, from among the P4, P5, P8, and P9 pictures stored in the DPB, with regard to the P5, P8, and P9 pictures to which the assignment of the L0 index based on the RPLR command is not made, at the AVC default, the L0 index having a value equal to or greater than 1 is assigned.

That is, from among the P4, P5, P8, and P9 pictures stored in the DPB, with regard to the P5, P8, and P9 pictures to which the assignment of the L0 index based on the RPLR command is not made, as shown in FIG. 19, the assignment is made as follows: the L0 index having a value of 1 is assigned to the P5 picture first closest to the Bs6 picture before the Bs6 picture in the POC order; the L0 index having a value of 2 is assigned to the P8 picture first closest to the Bs6 picture after the Bs6 picture in the POC order; and the L0 index having a value of 3 is assigned to the P9 picture second closest to the Bs6 picture after the Bs6 picture in the POC order.

With regard to the P4, P5, P8, and P9 pictures stored in the DPB, to which the assignment of the L1 index based on the RPLR command is not made, at the AVC default, the assignment is made as follows: the L1 index having a value of 0 is assigned to the P8 picture; the L1 index having a value of 1 is assigned to the P9 picture; the L1 index having a value of 2 is assigned to the P5 picture; and the L1 index having a value of 3 is assigned to the P4 picture.

The Bs6 picture is a reference picture and the Bs6 picture after decoding is stored in the DPB. As a result, as in FIG. 17, the P5, P8, P9, and Bs6 pictures are stored in the DPB.

At the time t9 next to the time t8, the decoding apparatus picks up the B7 picture of GOP#0 as a current picture in decoding process and decodes the B7 picture.

When the B7 picture is decoded, as shown in FIG. 19, the P5, P8, P9, and Bs6 pictures are stored in the DPB, and the B7 picture is decoded with reference to the P5, P8, P9, and Bs6 pictures stored in the DPB as necessary so as to create the predicted image of L0 prediction or L1 prediction.

The remainder POC of the POC of the B7 picture is 7. In this case, as described with reference to FIG. 18, "043" and "013" are sequentially issued as the RPLR command and the necessary argument.

With the RPLR command "043" which is issued when the current picture in decoding process is the B7 picture, as described with reference to FIG. 18, the P5 picture which has, as the PN, a value obtained by subtracting abs_diff_pic_num_minus1+1 (=5) from CurrPicNum (=8) which is the PN of the B7 picture as the current picture in decoding process, that is, 3, is picked up as an assignment-target picture, and the minimum value from among the values unassigned as the L0 index at that time, that is, 0, is assigned to the P5 picture as the L0 index.

With the RPLR command "013" which is issued when the current picture in decoding process is the B7 picture, as described with reference to FIG. 18, the P9 picture which has, as the PN, a value obtained by subtracting abs_diff_pic_num_minus1+1 (=2) from CurrPicNum (=8) which is the PN of the B7 picture as the current picture in decoding process, that is, 6, is picked up as an assignment-target picture, and the minimum value from among the values unassigned as the L1 index at that time, that is, 0, is assigned to the P9 picture as the L1 index.

Thereafter, from among the P5, P8, P9, and Bs6 pictures stored in the DPB, with regard to the P8, P9, and Bs6 pictures to which the assignment of the L0 index based on the RPLR command is not made, at the AVC default, the L0 index having a value equal to or greater than 1 is assigned.

That is, from among the P5, P8, P9, and Bs6 pictures stored in the DPB, with regard to the P8, P9, and Bs6 pictures to which the assignment of the L0 index based on the RPLR command is not made, as shown in FIG. 19, the assignment is made as follows: the L0 index having a value of 1 is assigned to the Bs6 picture first closest to the B7 picture before the B7 picture in the POC order; the L0 index having a value of 2 is assigned to the P8 picture first closest to the B7 picture after the B7 picture in the POC order; and the L0 index having a value of 3 is assigned to the P9 picture second closest to the B7 picture after the B7 picture in the POC order.

From among the P5, P8, P9, and Bs6 pictures stored in the DPB, with regard to the P5, P8, and Bs6 pictures to which the assignment of the L1 index based on the RPLR command is not made, at the AVC default, the L1 index having a value equal to or greater than 1 is assigned.

That is, from among the P5, P8, P9, and Bs6 pictures stored in the DPB, with regard to the P5, P8, and Bs6 pictures to which the assignment of the L1 index based on the RPLR command is not made, as shown in FIG. 19, the assignment is made as follows: the L1 index having a value of 1 is assigned to the P8 picture first closest to the B7 picture after the B7 picture in the POC order; the L1 index having a value of 2 is assigned to the Bs6 picture first closest to the B7 picture before the B7 picture in the POC order; and the L1 index having a value of 3 is assigned to the P5 picture second closest to the B7 picture before the B7 picture in the POC order.

The B7 picture is not a reference picture, thus the B7 picture is not stored in the DPB after decoding.

Thus, as shown in FIG. 19, similarly to after the Bs6 picture one picture before the B7 picture in the decoding order has been decoded, the P5, P8, P9, and Bs6 pictures are still stored in the DPB.

At the time t10 next to the time t9, the decoding apparatus picks up the P12 picture of GOP#0 as a current picture in decoding process and decodes the P12 picture.

When the P12 picture is decoded, as shown in FIG. 19, the P5, P8, P9, and Bs6 pictures are stored in the DPB, and the P12 picture is decoded with reference to the P5, P8, P9, and Bs6 pictures stored in the DPB as necessary so as to create the predicted image of L0 prediction.

The remainder POC of the POC of the P12 picture is 12. In this case, as described with reference to FIG. 18, "023" is issued as the RPLR command and the necessary argument.

With the RPLR command "023" which is issued when the current picture in decoding process is the P12 picture, as described with reference to FIG. 18, the P8 picture which has, as the PN, a value obtained by subtracting abs_diff_pic_num_minus1+1 (=3) from CurrPicNum (=8) which is the PN of the P12 picture as the current picture in decoding process, that is, 5, is picked up as an assignment-target picture, and the minimum value from among the values unassigned as the L0 index at that time, that is, 0, is assigned to the P8 picture as the L0 index.

Thereafter, from among the P5, P8, P9, and Bs6 pictures stored in the DPB, with regard to the P5, P9, and Bs6 pictures to which the reference picture number based on the RPLR command is not assigned, at the AVC default, the L0 index having a value equal to or greater than 1 is assigned.

That is, from among the P5, P8, P9, and Bs6 pictures stored in the DPB, with regard to P5, P9, and Bs6 pictures to which the assignment of the L0 index based on the RPLR command is not made, as shown in FIG. 19, the assignment is made as follows: the L0 index having a value of 1 is assigned to the Bs6 picture first closest to the P12 picture in the decoding order; the L0 index having a value of 2 is assigned to the P9 picture second closest to the P12 picture in the decoding order; and the L0 index having a value of 3 is assigned to the P5 picture third closest to the P12 picture in the decoding order.

The P12 picture is a reference picture and the P12 picture after decoding is stored in the DPB.

When the P12 picture is stored in the DPB, as described with reference to FIG. 17, the Bs6 picture stored in the DPB is released. As a result, as shown in FIG. 19, the P5, P8, P9, and P12 pictures are stored in the DPB.

At the time t11 next to the time t10, the decoding apparatus picks up the P13 picture of GOP#0 as a current picture in decoding process and decodes the P13 picture.

When the P13 picture is decoded, as shown in FIG. 19, the P5, P8, P9, and P12 pictures are stored in the DPB, and the P13 picture is decoded with reference to the P5, P8, P9, and P12 pictures stored in the DPB as necessary so as to create the predicted image of L0 prediction.

The remainder POC of the POC of the P13 picture is 13. In this case, as described with reference to FIG. 18, "023" is issued as the RPLR command and the necessary argument.

With the RPLR command "023" which is issued when the current picture in decoding process is the P13 picture, as described with reference to FIG. 18, the P9 picture which has, as the PN, a value obtained by subtracting abs_diff_pic_num_minus1+1 (=3) from CurrPicNum (=9) which is the PN of the P13 picture as the current picture in decoding process, that is, 6, is picked up as an assignment-target picture, and the minimum value from among the values unassigned as the L0 index at that time, that is, 0, is assigned to the P9 picture as the L0 index.

Thereafter, from among the P5, P8, P9, and P12 pictures stored in the DPB, with regard to the P5, P8, and P12 pictures to which the reference picture number based on the RPLR command is not assigned, at the AVC default, the L0 index having a value equal to or greater than 1 is assigned.

That is, from among the P5, P8, P9, and P12 pictures stored in the DPB, with regard to the P5, P8, and P12 pictures to which the assignment of the L0 index based on the RPLR command is not made, as shown in FIG. 19, the assignment is made as follows: the L0 index having a value of 1 is assigned to the P12 picture first closest to the P13 picture in the decoding order; the L0 index having a value of 2 is assigned to the P8 picture second closest to the P13 picture in the decoding order; and the L0 index having a value of 3 is assigned to the P5 picture third closest to the P13 picture in the decoding order.

The P13 picture is a reference picture and, as described with reference to FIG. 17, the P13 picture after decoding is stored in the DPB. As a result, as shown in FIG. 19, the P8, P9, P12, and P13 pictures are stored in the DPB.

At the time t12 next to the time t11, the decoding apparatus picks up the Bs10 picture of GOP#0 as a current picture in decoding process and decodes the Bs10 picture.

When the Bs10 picture is decoded, as shown in FIG. 19, the P8, P9, P12, and P13 pictures are stored in the DPB, and the Bs10 picture is decoded with reference to the P8, P9, P12, and P13 pictures stored in the DPB as necessary so as to create the predicted image of L0 prediction or L1 prediction.

The remainder POC of the POC of the Bs10 picture is 10. In this case, as described with reference to FIG. 18, "043" is issued as the RPLR command and the necessary argument.

With the RPLR command "043" which is issued when the current picture in decoding process is the Bs10 picture, as described with reference to FIG. 18, the P8 picture which has, as the PN, a value obtained by subtracting abs_diff_pic_num_minus1+1 (=5) from CurrPicNum (=10) which is the PN of the Bs10 picture as the current picture in decoding process, that is, 5, is picked up as an assignment-target picture, and the minimum value from among the values unassigned as the L0 index at that time, that is, 0, is assigned to the P8 picture as the L0 index.

Thereafter, from among the P8, P9, P12, and P13 pictures stored in the DPB, with regard to the P9, P12, and P13 pictures to which the assignment of the L0 index based on the RPLR command is not made, at the AVC default, the L0 index having a value equal to or greater than 1 is assigned.

That is, from among the P8, P9, P12, and P13 pictures stored in the DPB, with regard to the P9, P12, and P13 pictures to which the assignment of the L0 index based on the RPLR command is not made, as shown in FIG. 19, the assignment is made as follows: the L0 index having a value of 1 is assigned to the P9 picture first closest to the Bs10 picture before the Bs10 picture in the POC order; the L0 index having a value of 2 is assigned to the P12 picture first closest to the Bs10 picture after the Bs10 picture in the POC order; and the L0 index having a value of 3 is assigned to the P13 picture second closest to the Bs10 picture after the Bs10 picture in the POC order.

With regard to the P8, P9, P12, and P13 pictures stored in the DPB, to which the assignment of the L1 index based on the RPLR command is not made, at the AVC default, the assignment is made as follows: the L1 index having a value of 0 is assigned to the P12 picture; the L1 index having a value of 1 is assigned to the P13 picture; the L1 index having a value of 2 is assigned to the P9 picture; and the L1 index having a value of 3 is assigned to the P8 picture.

The Bs10 picture is a reference picture and the Bs10 picture after decoding is stored in the DPB. As a result, as in FIG. 17, the P9, P12, P13, and Bs10 pictures are stored in the DPB.

At the time t13 next to the time t12, the decoding apparatus picks up the B11 picture of GOP#0 as a current picture in decoding process and decodes the B11 picture.

When the B11 picture is decoded, as shown in FIG. 19, the P9, P12, P13, and Bs10 pictures are stored in the DPB, and the B11 picture is decoded with reference to the P9, P12, P13, and Bs10 pictures stored in the DPB as necessary so as to create the predicted image of L0 prediction or L1 prediction.

The remainder POC of the POC of the B11 picture is 11. In this case, as described with reference to FIG. 18, "043" and "013" are sequentially issued as the RPLR command and the necessary argument.

With the RPLR command "043" which is issued when the current picture in decoding process is the B11 picture, as described with reference to FIG. 18, the P9 picture which has, as the PN, a value obtained by subtracting abs_diff_pic_num_minus1+1 (=5) from CurrPicNum (=11) which is the PN of the B11 picture as the current picture in decoding process, that is, 6, is picked up as an assignment-target picture, and the minimum value from among the values unassigned as the L0 index at that time, that is, 0, is assigned to the P9 picture as the L0 index.

With the RPLR command "013" which is issued when the current picture in decoding process is the B11 picture, as described with reference to FIG. 18, the P13 picture which has, as the PN, a value obtained by subtracting abs_diff_pic_num_minus1+1 (=2) from CurrPicNum (=11) which is the PN of the B11 picture as the current picture in decoding process, that is, 9, is picked up as an assignment-target picture, and the minimum value from among the values unassigned as the L1 index at that time, that is, 0, is assigned to the P13 picture as the L1 index.

Thereafter, from among the P9, P12, P13, and Bs10 pictures stored in the DPB, with regard to the P12, P13, and Bs10 pictures to which the assignment of the L0 index based on the RPLR command is not made, at the AVC default, the L0 index having a value equal to or greater than 1 is assigned.

That is, from among the P9, P12, P13, and Bs10 pictures stored in the DPB, with regard to the P12, P13, and Bs10 pictures to which the assignment of the L0 index based on the RPLR command is not made, as shown in FIG. 19, the assignment is made as follows: the L0 index having a value of 1 is assigned to the Bs10 picture first closest to the B11 picture before the B11 picture in the POC order; the L0 index having a value of 2 is assigned to the P12 picture first closest to the B11 picture after the B11 picture in the POC order; and the L0 index having a value of 3 is assigned to the P13 picture second closest to the B11 picture after the B11 picture in the POC order.

From among the P9, P12, P13, and Bs10 pictures stored in the DPB, with regard to the P9, P12, and Bs10 pictures to which the assignment of the L1 index based on the RPLR command is not made, at the AVC default, the L1 index having a value equal to or greater than 1 is assigned.

That is, from among the P9, P12, P13, and Bs10 pictures stored in the DPB, with regard to the P9, P12, and Bs10 pictures to which the assignment of the L1 index based on the RPLR command is not made, as shown in FIG. 19, the assignment is made as follows: the L1 index having a value of 1 is assigned to the P12 picture first closest to the B11 picture after the B11 picture in the POC order; the L1 index having a value of 2 is assigned to the Bs10 picture first closest to the B11 picture before the B11 picture in the POC order; and the L1 index having a value of 3 is assigned to the P9 picture second closest to the B11 picture before the B11 picture in the POC order.

The B11 picture is not a reference picture, thus the B11 picture is not stored in the DPB after decoding.

Thus, as shown in FIG. 19, similarly to after the Bs10 picture one picture before the B11 picture in the decoding order has been decoded, the P9, P12, P13, and Bs10 pictures are still stored in the DPB.

At the time t14 next to the time t13, the decoding apparatus picks up the I16 (I0) picture of GOP#1 as a current picture in decoding process and decodes the I16 picture with no inter prediction.

That is, when the I16 picture is decoded, as shown in FIG. 17, the P9, P12, P13, and Bs10 pictures are stored in the DPB, and the I16 picture is decoded without reference to the P9, P12, P13, and Bs10 pictures stored in the DPB.

The I16 picture is a reference picture and the I16 picture after decoding is stored in the DPB.

When the I16 picture is stored in the DPB, as described with reference to FIG. 17, the Bs10 picture as a long-term reference picture stored in the DPB is released. As a result, as shown in FIG. 19, the P9, P12, P13, and I16 pictures are stored in the DPB.

At the time t15 next to the time t14, the decoding apparatus picks up the P17 (P1) picture of GOP#1 as a current picture in decoding process and decodes the P17 picture.

When the P17 picture is decoded, as shown in FIG. 19, the P9, P12, P13, and I16 pictures are stored in the DPB, and the P17 picture is decoded with reference to the P9, P12, P13, and I16 pictures stored in the DPB as necessary so as to create the predicted image of L0 prediction.

The remainder POC of the POC of the P17 picture is 1. In this case, as described with reference to FIG. 18, "023" is issued as the RPLR command and the necessary argument.

With the RPLR command "023" which is issued when the current picture in decoding process is the P17 picture, as described with reference to FIG. 18, the P13 picture which has, as the PN, a value obtained by subtracting abs_diff_ pic_num_minus1+1 (=3) from CurrPicNum (=12) which is the PN of the P17 picture as the current picture in decoding process, that is, 9, is picked up as an assignment-target picture, and the minimum value from among the values unassigned as the L0 index at that time, that is, 0, is assigned to the P13 picture as the L0 index.

Thereafter, from among the P9, P12, P13, and I16 pictures stored in the DPB, with regard to the P9, P12, and I16 pictures to which the reference picture number based on the RPLR command is not assigned, at the AVC default, the L0 index having a value equal to or greater than 1 is assigned.

That is, from among the P9, P12, P13, and I16 pictures stored in the DPB, with regard to the P9, P12, and I16 pictures to which the assignment of the L0 index based on the RPLR command is not made, as shown in FIG. 19, the assignment is made as follows: L0 index having a value of 1 is assigned to the I16 picture first closest to the P17 picture in the decoding order; the L0 index having a value of 2 is assigned to the P12 picture second closest to the P17 picture in the decoding order; and the L0 index having a value of 3 is assigned to the P9 picture third closest to the P17 picture in the decoding order.

The P17 picture is a reference picture and, as described with reference to FIG. 17, the P17 picture after decoding is stored in the DPB. As a result, as shown in FIG. 19, the P12, P13, I16, and P17 pictures are stored in the DPB.

At the time t16 next to the time t15, the decoding apparatus picks up the Bs14 picture of GOP#0 as a current picture in decoding process and decodes the Bs14 picture.

When the Bs14 picture is decoded, as shown in FIG. 19, the P12, P13, I16, and P17 pictures are stored in the DPB, and the Bs14 picture is decoded with reference to the P12, P13, I16, and P17 pictures stored in the DPB as necessary so as to create the predicted image of L0 prediction or L1 prediction.

The remainder POC of the POC of the Bs14 picture is 14. In this case, as described with reference to FIG. 18, "043" is issued as the RPLR command and the necessary argument.

With the RPLR command "043" which is issued when the current picture in decoding process is the Bs14 picture, as described with reference to FIG. 18, the P12 picture which has, as the PN, a value obtained by subtracting abs_diff_pic_num_minus1+1 (=5) from CurrPicNum (=13) which is the PN of the Bs14 picture as the current picture in decoding process, that is, 8, is picked up as an assignment-target picture, and the minimum value from among the values unassigned as the L0 index at that time, that is, 0, is assigned to the P12 picture as the L0 index.

Thereafter, from among the P12, P13, I16, and P17 pictures stored in the DPB, with regard to the P13, I16, and P17 pictures to which the assignment of the L0 index based on the RPLR command is not made, at the AVC default, the L0 index having a value equal to or greater than 1 is assigned.

That is, from among the P12, P13, I16, and P17 pictures stored in the DPB, with regard to the P13, I16, and P17 pictures to which the assignment of the L0 index based on the RPLR command is not made, as shown in FIG. 19, the assignment is made as follows: the L0 index having a value of 1 is assigned to the P13 picture first closest to the Bs14 picture before the Bs14 picture in the POC order; the L0 index having a value of 2 is assigned to the I16 picture first closest to the Bs14 picture after the Bs14 picture in the POC order; and the L0 index having a value of 3 is assigned to the P17 picture second closest to the Bs14 picture after the Bs14 picture in the POC order.

With regard to the P12, P13, I16, and P17 pictures stored in the DPB, to which the assignment of the L1 index based on the RPLR command is not made, at the AVC default, the assignment is made as follows: the L1 index having a value of 0 is assigned to the I16 picture; the L1 index having a value of 1 is assigned to the P17 picture; the L1 index having a value of 2 is assigned to the P13 picture; and the L1 index having a value of 3 is assigned to the P12 picture.

The Bs14 picture is a reference picture and the Bs14 picture after decoding is stored in the DPB. As a result, as in FIG. 17, the P13, I16, P17, and Bs14 pictures are stored in the DPB.

At the time t17 next to the time t16, the decoding apparatus picks up the B15 picture of GOP#0 as a current picture in decoding process and decodes the B15 picture.

When the B15 picture is decoded, as shown in FIG. 19, the P13, I16, P17, and Bs14 pictures are stored in the DPB, and the B15 picture is decoded with reference to the P13, I16, P17, and Bs14 pictures stored in the DPB as necessary so as to create the predicted image of L0 prediction or L1 prediction.

The remainder POC of the POC of the B15 picture is 15. In this case, as described with reference to FIG. 18, "043" and "013" are sequentially issued as the RPLR command and the necessary argument.

With the RPLR command "043" which is issued when the current picture in decoding process is the B15 picture, as described with reference to FIG. 18, the P13 picture which has, as the PN, a value obtained by subtracting abs_diff_pic_num_minus1+1 (=5) from CurrPicNum (=14) which is the PN of the B15 picture as the current picture in decoding process, that is, 9, is picked up as an assignment-target picture, and the minimum value from among the values unassigned as the L0 index at that time, that is, 0, is assigned to the P13 picture as the L0 index.

With the RPLR command "013" which is issued when the current picture in decoding process is the B15 picture, as described with reference to FIG. 18, the P17 picture which has, as the PN, a value obtained by subtracting abs_diff_pic_num_minus1+1 (=2) from CurrPicNum which is the PN (=14) of the B15 picture as the current picture in decoding process, that is, 12, is picked up as an assignment-target picture, and the minimum value from among the values unassigned as the L1 index at that time, that is, 0, is assigned to the P17 picture as the L1 index.

Thereafter, from among the P13, I16, P17, and Bs14 pictures stored in the DPB, with regard to the I16, P17, and Bs14 pictures to which the assignment of the L0 index based on the RPLR command is not made, at the AVC default, the L0 index having a value equal to or greater than 1 is assigned.

That is, from among the P13, I16, P17, and Bs14 pictures stored in the DPB, with regard to the I16, P17, and Bs14 pictures to which the assignment of the L0 index based on the RPLR command is not made, as shown in FIG. 19, the assignment is made as follows: the L0 index having a value of 1 is assigned to the Bs14 picture first closest to the B15 picture before the B15 picture in the POC order; the L0 index having a value of 2 is assigned to the I16 picture first closest to the B15 picture after the B15 picture in the POC order; and the L0 index having a value of 3 is assigned to the P17 picture second closest to the B15 picture after the B15 picture in the POC order.

From among the P13, I16, P17, and Bs14 pictures stored in the DPB, with regard to the P13, I16, and Bs14 pictures to which the assignment of the L1 index based on the RPLR command is not made, at the AVC default, the L1 index having a value equal to or greater than 1 is assigned.

That is, from among the P13, I16, P17, and Bs14 pictures stored in the DPB, with regard to the P13, I16, and Bs14 pictures to which the assignment of the L1 index based on the RPLR command is not made, as shown in FIG. 19, the assignment is made as follows: the L1 index having a value of 1 is assigned to the I16 picture first closest to the B15 picture after the B15 picture in the POC order; the L1 index having a value of 2 is assigned to the Bs14 picture first closest to the B15 picture before the B15 picture in the POC order; and the L1 index having a value of 3 is assigned to the P13 picture second closest to the B15 picture before the B15 picture in the POC order.

The B15 picture is not a reference picture, thus the B15 picture is not stored in the DPB after decoding.

Thus, as shown in FIG. 19, similarly to after the Bs14 picture one picture before the B15 picture in the decoding order has been decoded, the P13, I16, P17, and Bs14 pictures are still stored in the DPB.

Though not shown in FIG. 19, at the time next to the time t17, the decoding apparatus picks up the P20 (P4) picture of GOP#1 as a current picture in decoding process and decodes the P20 picture.

When the P12 picture is decoded, as shown in FIG. 19, the P13, I16, P17, and Bs14 pictures are stored in the DPB, and the P20 picture is decoded with reference to the P13, I16, P17, and Bs14 pictures stored in the DPB as necessary so as to create the predicted image of L0 prediction.

In this case, the decoding apparatus assigns the L0 index having a value of 0 to the I16 picture from among the P13, I16, P17, and Bs14 pictures stored in the DPB in accordance with the RPLR command with POC=4 of FIG. 18.

Thereafter, from among the P13, I16, P17, and Bs14 pictures stored in the DPB, with regard to the P13, P17, and Bs14 pictures to which the reference picture number based on the RPLR command is not assigned, at the AVC default, the L0 index having a value equal to or greater than 1 is assigned.

That is, from among the P13, I16, P17, and Bs14 pictures stored in the DPB, with regard to the P13, P17, and Bs14 pictures to which the assignment of the L0 index based on the RPLR command is not made, as shown in FIG. 19, the assignment is made as follows: the L0 index having a value of 1 is assigned to the Bs14 picture first closest to the P20 picture in the decoding order; the L0 index having a value of 2 is assigned to the P17 picture second closest to the P20 picture in the decoding order; and the L0 index having a value of 3 is assigned to the P13 picture third closest to the P20 picture in the decoding order.

As described above, with the RPLR command of FIG. 18, when the MMCO command of FIG. 16 is issued, the assignment of the reference picture number to the reference picture is carried out such that the minimum reference picture number, that is, 0, is assigned to a picture which is a picture of an image at the same viewpoint as the current picture in decoding process from among the L image and the R image and is closest to the current picture in decoding process in the display order, from among the pictures which are decoded temporally earlier than the current picture in decoding process and are capable of becoming reference pictures.

Specifically, as described with reference to FIG. 17, for example, at the time t3, when the P5 picture becomes a current picture in decoding process, the I0, P1, and P4 pictures are stored in the DPB.

The P5 picture is the picture of the R image, and from among the I0, P1, and P4 pictures stored in the DPB, a picture which is a picture of the R image at the same viewpoint as and temporally closest to the P5 picture which is the picture of the R image is the P1 picture.

Thus, with regard to the P5 picture, from among the I0, P1, and P4 pictures stored in the DPB, the prediction error of a predicted image with the P1 picture as a reference picture is highly likely to be minimized.

From among the I0, P1, and P4 pictures stored in the DPB, with regard to the I0 and P4 pictures which are the pictures of the L image at a different viewpoint from the P5 picture of the R image, the P4 picture is temporally closer to the P5 picture than the I0 picture and constitutes an LR pair with the P5 picture. Thus, a prediction error of a predicted image which is created with the P4 picture as the reference picture is highly likely to be smaller than a prediction error of a predicted image which is created with the I0 picture as the reference picture.

With the above, the I0, P1, and P4 pictures stored in the DPB are highly likely to be used in creating the predicted image of the P5 image in descending order of the possibility of reduction in the prediction error, that is, in order of the P1, P4, and I0 pictures.

Therefore, when the P5 picture becomes the current picture in decoding process, with regard to the I0, P1, and P4 pictures stored in the DPB, the assignment is made as follows: the L0 index having the minimum value, that is, 0, is assigned to the P1 picture; the L0 index having a second largest value, that is, 1, is assigned to the P4 picture; and the L0 index having a third largest value, that is, 2, is assigned to the I0 picture. In this way, a smaller value which is encoded to a code with a smaller code quantity is likely to become a reference picture number representing a reference picture which is referenced when the P5 picture is decoded, thus encoding efficiency may be improved.

However, at the AVC default, as described with reference to FIG. 17, as the L0 index, 1 is assigned to the P1 picture, 0 is assigned to the P4 picture, and 2 is assigned to the I0 picture.

Meanwhile, with the RPLR command of FIG. 18, when the P5 picture becomes a current picture in decoding process (current picture in encoding process), with regard to the I0, P1, and P4 pictures stored in the DPB, the assignment is made as follows: the L0 index having the minimum value, that is, 0, is assigned to the P1 picture; the L0 index having a second largest value, that is, 1, is assigned to the P4 picture; and the L0 index having a third largest value, that is, 2, is assigned to the I0 picture. That is, the minimum value, that is, 0, is assigned to the P1 picture which is highly likely to reduce the prediction error, as the L0 index, thus encoding efficiency may be improved.

As described with reference to FIG. 17, with the MMCO command of FIG. 16, for example, at the time t8, when the Bs6 picture of the L image is inter-predicted, the P4 picture which is the picture of the L image immediately before the Bs6 picture and is highly likely to reduce the prediction error is stored in the DPB. Meanwhile, at the AVC default, 1 which is not the minimum value is assigned to the P4 picture as the L0 index.

Meanwhile, if the RPLR command of FIG. 18 is issued along with the MMCO command of FIG. 16, as described with reference to FIG. 19, when the Bs6 picture is decoded, the minimum value, that is, 0, is assigned as the L0 index to the P4 picture which is highly likely to reduce the prediction error. Thus, the L0 index is highly likely to be encoded to a code with a small code quantity, thus encoding efficiency may be improved.

[Description of Computer to which the Invention is Applied]

Next, a sequence of processing described above may be performed by hardware or software. When a sequence of processing is performed by software, a program constituting software is installed on a general-use computer or the like.

FIG. 20 shows a configuration example of an embodiment of a computer on which a program for executing a sequence of processing described above is installed.

The program may be recorded in advance in a hard disk 105 or a ROM 103 serving as an internal recording medium in the computer.

The program may be stored (recorded) in a removable recording medium 111. Such a removable recording medium 111 can be provided as so-called packaged software. Examples of the removable recording medium 111 include a flexible disk, a CD-ROM (Compact Disc Read Only Memory), an MO (Magneto Optical) disc, a DVD (Digital Versatile Disc), a magnetic disk, a semiconductor memory, and the like.

The program may be downloaded to the computer through a communication network or a broadcasting network and installed in the internal hard disk 105, instead of being installed from the above-described removable recording medium 111 onto the computer. That is, the program may be transferred, for example, from a download site to the computer through an artificial satellite for digital satellite broadcasting in a wireless manner, or may be transferred to the computer through a network, such as a LAN (Local Area Network) or Internet, in a wired manner.

The computer has a CPU (Central Processing Unit) 102 therein. An input/output interface 110 is connected to the CPU 102 through a bus 101.

If the user operates an input unit 107 and an instruction is input through the input/output interface 110, the CPU 102 runs the program stored in the ROM (Read Only Memory) 103 in accordance with the instruction. Alternatively, the CPU 102 loads and runs the program stored in the hard disk 105 on the RAM (Random Access Memory) 104.

With the above, the CPU 102 performs the processing of the above-described flowchart or the processing executed by the configuration of the above-described block diagram. The CPU 102 outputs the processing result as necessary, for example, from an output unit 106 through the input/output interface 110, or transmits the processing result from the communication unit 108 and records the processing result in the hard disk 105.

The input unit 107 includes a keyboard, a mouse, a microphone, or the like. The output unit 106 includes an LCD (Liquid Crystal Display), a speaker, or the like.

In this specification, the processing executed by the computer in accordance with the program may not be performed in a time-series manner in accordance with the order described in the flowchart. That is, the processing executed by the computer in accordance with the program includes processing executed in parallel or individually (for example, parallel processing or processing by objects).

The program may be processed by a single computer (processor), or may be processed in a distributed manner by multiple computers. The program may also be transferred to a remote computer and executed.

The embodiment of the invention is not limited to the above-described embodiment, but various changes may be made without departing from the scope and spirit of the invention.

That is, the invention may be applied to an encoding apparatus in which a decoded image obtained by encoding pictures and performing local decoding is stored as a reference picture which is referenced in creating a predicted image for use in temporally later predictive encoding, in addition to the AVC encoding apparatus.

Although in this embodiment, encoding and decoding are carried out for the frame sequential in which the pictures of the L image and the R image serving as the first and second images having a disparity constituting the 3D image are alternately arranged, for encoding and decoding, a frame sequential may be used in which the pictures of first and second images having a disparity other than the 3D image, that is, the pictures of arbitrary first and second images at different viewpoints are alternately arranged.

The structure of GOP is not limited to the structure described with reference to FIG. 4 or the like.

Although in this embodiment, max_dec_frame_buffering is set to 4 and num_ref_frames is set to 3, max_dec_frame_buffering and num_ref_frames are not limited to these values.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a storage means configured to store a plurality of decoded images, wherein the plurality of decoded images are obtained by:
encoding pictures constituting a frame sequential, in which pictures of a first image and a second image each having a disparity are alternately arranged, and by
performing local decoding in which a reference picture is referenced when a predicted image is created for use in temporally later predictive encoding; and
a storage control means configured to control storage of the plurality of decoded images in the storage means at least in part by discarding a decoded image from the storage means,
wherein the discarding causes a first decoded image to be stored in the storage means during subsequent decoding of a current picture in a decoding process, and
wherein the first decoded image is:
encoded temporally earlier than the current picture,
capable of becoming a reference picture,
a picture of an image at a same viewpoint as the current picture from among the first image and the second image, and
closest to the current picture in a display order.

2. The apparatus according to claim 1, wherein:
the storage control means performs the storage control by issuing a command to control storage of a picture in a buffer provided in a decoder for decoding encoded data of the frame sequential such that, from among pictures which are decoded temporally earlier than a current picture in a decoding process, and are capable of becoming reference pictures, a picture of an image at the same viewpoint as the current picture in the decoding process from among the first image and the second image and is closest to the current picture in the decoding process in the display order is stored in the buffer.

3. The apparatus according to claim 2, wherein:
the pictures constituting the frame sequential are encoded through H.264/AVC; and
the storage control means performs the storage control by issuing an MMCO (Memory Management Control Operation) command to control the storage of a picture in a DPB (Decoded Picture Buffer) provided in the decoder for decoding encoded data of the frame sequential through the H.264/AVC, such that, from among the pictures which are decoded temporally earlier than the current picture to be encoded in the decoding process and are capable of becoming reference pictures, a picture of an image at the same viewpoint as the current picture in the decoding process from among the first image and the second image and is closest to the current picture in the decoding process in the display order is stored in the DPB.

4. The apparatus according to claim 3, wherein:
the storage control means further issues an RPLR (Reference Picture List Reordering) command to control the assignment of a reference picture number to a reference picture such that, from among the pictures which are decoded temporally earlier than the current picture in the decoding process and are capable of becoming reference pictures, a minimum reference picture number 0 is assigned to a picture of an image at the same viewpoint as the current picture in the decoding process from among the first image and the second image and is closest to the current picture in the decoding process in the display order.

5. The apparatus according to claim 4, wherein:
the pictures constituting the frame sequential are encoded as an I picture, a P picture, a B picture, or a Bs picture which is a B picture that becomes a reference picture; and
the storage control means issues an MMCO command which, when a Bs picture of one image of the first image and the second image in the frame sequential is decoded, defines the Bs picture as a long-term reference picture and, when an I or P picture of the one image is decoded, releases a Bs picture, which becomes a long-term reference picture immediately before and defines the Bs picture as a non-reference picture.

6. The apparatus according to claim 4, wherein:
the pictures constituting the frame sequential are encoded as an I picture, a P picture, a B picture, or a Bs picture which is a B picture that becomes a reference picture,
one GOP (Group Of Pictures) includes 16 pictures of I, P, Bs, B, P, P, Bs, B, P, P, Bs, B, P, P, Bs, B pictures in the display order; and
when a remainder, obtained by dividing a POC (Picture Order Count) of the current picture in the decoding process by 16, is 0, 4, 8, or 12, the storage control means issues an MMCO command to release a Bs picture whose POC corresponds to a value obtained by subtracting 6 from the POC of the current picture in the decoding process, from among the pictures stored in the DPB and to define the Bs picture as a non-reference picture.

7. An image processing method comprising the steps of:
storing a plurality of decoded images which are obtained by:
encoding pictures constituting a frame sequential, in which pictures of a first image and a second image each having a disparity are alternately arranged, and by
performing local decoding in a storage means as a reference picture which is referenced when a predicted image is created for use in temporally later predictive encoding; and
performing storage control to control storage of the plurality of decoded images in the storage means at least in part by discarding a decoded image from the storage means,
wherein the discarding causes a first decoded image to be stored in the storage means during subsequent decoding of a current picture in a decoding process, and
wherein the first decoded image is:
encoded temporally earlier than the current picture,
capable of becoming a reference picture,
a picture of an image at a same viewpoint as the current picture from among the first image and the second image, and
closest to the current picture in a display order.

8. An image processing apparatus comprising:
a storage section configured to store a plurality of decoded images, which are obtained by:
encoding pictures constituting a frame sequential, in which pictures of a first image and a second image each having a disparity are alternately arranged, and by
performing local decoding in which a reference picture is referenced when a predicted image is created for use in temporally later predictive encoding; and
a storage control section configured to control storage of the plurality of decoded images in the storage section at least in part by discarding a decoded image from the storage means,
wherein the discarding causes a first decoded image to be stored in the storage section during subsequent decoding of a current picture in a decoding process, and
wherein the first decoded image is:
encoded temporally earlier than the current picture,
capable of becoming a reference picture,
a picture of an image at a same viewpoint as the current picture from among the first image and the second image, and
closest to the current picture in a display order.

* * * * *